(12) United States Patent
Namiki et al.

(10) Patent No.: US 10,541,817 B2
(45) Date of Patent: Jan. 21, 2020

(54) DATA GENERATION APPARATUS, DATA RECORDING SYSTEM, AND PROGRAM PRODUCT

(71) Applicants: Hitoshi Namiki, Kanagawa (JP);
Hiroshi Kobayashi, Kanagawa (JP);
Ryouji Yamamoto, Kanagawa (JP);
Eiichiro Yoshida, Kanagawa (JP);
Masuyoshi Yachida, Kanagawa (JP);
Yuki Takaya, Kanagawa (JP)

(72) Inventors: Hitoshi Namiki, Kanagawa (JP);
Hiroshi Kobayashi, Kanagawa (JP);
Ryouji Yamamoto, Kanagawa (JP);
Eiichiro Yoshida, Kanagawa (JP);
Masuyoshi Yachida, Kanagawa (JP);
Yuki Takaya, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 406 days.

(21) Appl. No.: 15/447,334

(22) Filed: Mar. 2, 2017

(65) Prior Publication Data
US 2017/0264442 A1  Sep. 14, 2017

(30) Foreign Application Priority Data

Mar. 14, 2016 (JP) .................................. 2016-049491
Jul. 29, 2016 (JP) .................................. 2016-150750

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01)

(58) Field of Classification Search
CPC ...... H04L 9/3247; H04L 9/085; H04L 9/0643
(Continued)

(56) References Cited

U.S. PATENT DOCUMENTS 7,194,620 B1 * 3/2007 Hayes .................. H04L 9/3247
713/157
7,970,934 B1 * 6/2011 Patel ..................... H04L 41/147
709/244
(Continued)

FOREIGN PATENT DOCUMENTS

JP          2015-088855          5/2015

*Primary Examiner* — David J Pearson
*Assistant Examiner* — Badrinarayanan Champakesan
(74) *Attorney, Agent, or Firm* — IPUSA, PLLC

(57) ABSTRACT

A data generation apparatus includes a processor that executes a process including obtaining target data sequentially from time-series data, the target data including n (n being an integer greater than or equal to 2) data items in a predetermined section of the time-series data, calculating parameter information satisfying a (k−1) order polynomial based on the target data, the (k−1) order polynomial including k random values, k being an integer greater than or equal to 1 and less than n, associating the target data to the parameter information, outputting the target data and the parameter information associated to the target data, attaching a signature to secret information based on a secret distributed protocol. The secret information is calculable by using k pairs of data including the target data and the parameter information associated to the target data, and outputting the secret information attached with the signature.

12 Claims, 38 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 8,793,499 B2* | 7/2014 | Loughry | ................. | G06F 21/64 713/170 |
| 9,160,530 B2* | 10/2015 | Brown | ................. | H04L 9/3066 |
| 9,231,766 B2* | 1/2016 | Murao | ................. | G06F 21/645 |
| 2003/0059844 A1* | 3/2003 | Heal | ................. | G01N 33/6803 435/7.1 |
| 2004/0163043 A1* | 8/2004 | Baudin | ................. | G06F 16/313 715/234 |
| 2006/0230140 A1* | 10/2006 | Aoyama | ................. | G06N 3/08 709/224 |
| 2008/0208890 A1* | 8/2008 | Milam | ............... | G05B 19/4183 |
| 2014/0064580 A1* | 3/2014 | Madabhushi | ......... | G06T 7/0012 382/128 |
| 2014/0214762 A1* | 7/2014 | Haas | ....................... | G06F 16/27 707/625 |
| 2015/0199010 A1* | 7/2015 | Coleman | .............. | A61B 5/0006 345/156 |
| 2015/0236856 A1* | 8/2015 | Moore | ................. | H04L 9/3236 713/176 |
| 2015/0333911 A1* | 11/2015 | Monden | ................. | G06F 21/32 713/156 |
| 2015/0339572 A1* | 11/2015 | Achin | ..................... | G06N 5/02 706/46 |
| 2016/0323100 A1* | 11/2016 | Tsai | ...................... | H04L 9/0833 |
| 2017/0264442 A1* | 9/2017 | Namiki | .................. | H04L 9/085 |
| 2018/0039677 A1* | 2/2018 | Choi | ................... | G06F 16/2477 |
| 2018/0314876 A1* | 11/2018 | Rubin | .................... | C12M 41/46 |
| 2019/0113973 A1* | 4/2019 | Coleman | ................ | G16H 40/67 |

\* cited by examiner

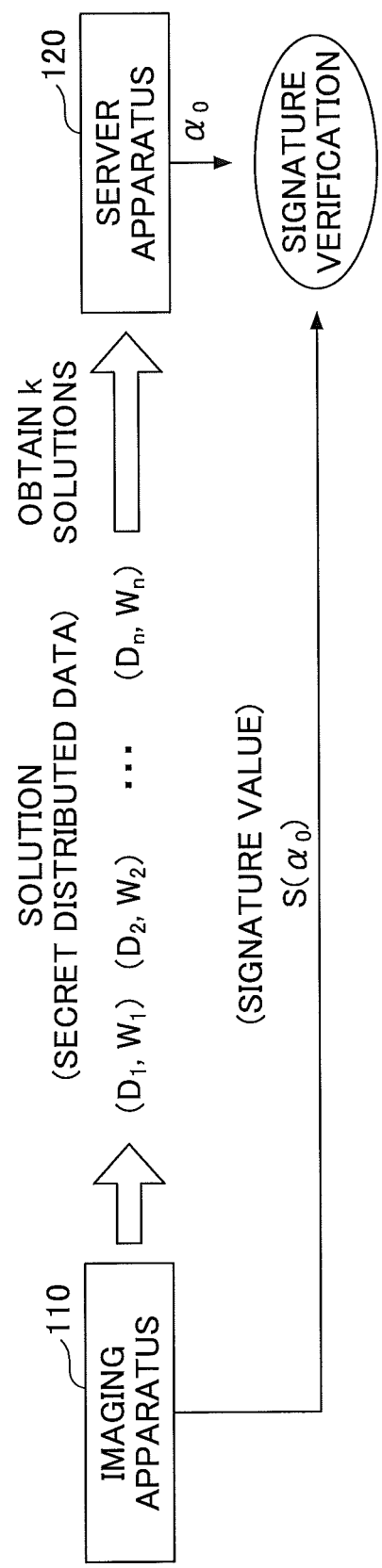

FIG.12

| SETTING PARAMETER TYPE | SETTING CONTENT |
|---|---|
| BUFFER INFORMATION | INFORMATION PERTAINING TO BUFFER UNIT (E.G., PACKET SIZE, NUMBER OF FRAMES) |
| STREAM PACKET GENERATION INFORMATION | INFORMATION PERTAINING TO PROTOCOL (E.G., RTP, UDP) |
| COMPRESSION TYPE INFORMATION | INFORMATION PERTAINING TO COMPRESSION TYPE (E.G., H.264, MPEG) |
| HASH INFORMATION | INFORMATION PERTAINING TO HASH ALGORITHM (E.G., SHA1, SHA256) |
| SIGNATURE INFORMATION | INFORMATION PERTAINING TO SIGNATURE ALGORITHM (E.G., RSA SIGNATURE, ElGamal SIGNATURE) |
| THRESHOLD INFORMATION | INFORMATION PERTAINING TO THRESHOLD (E.G., n, k) |

FIG.13

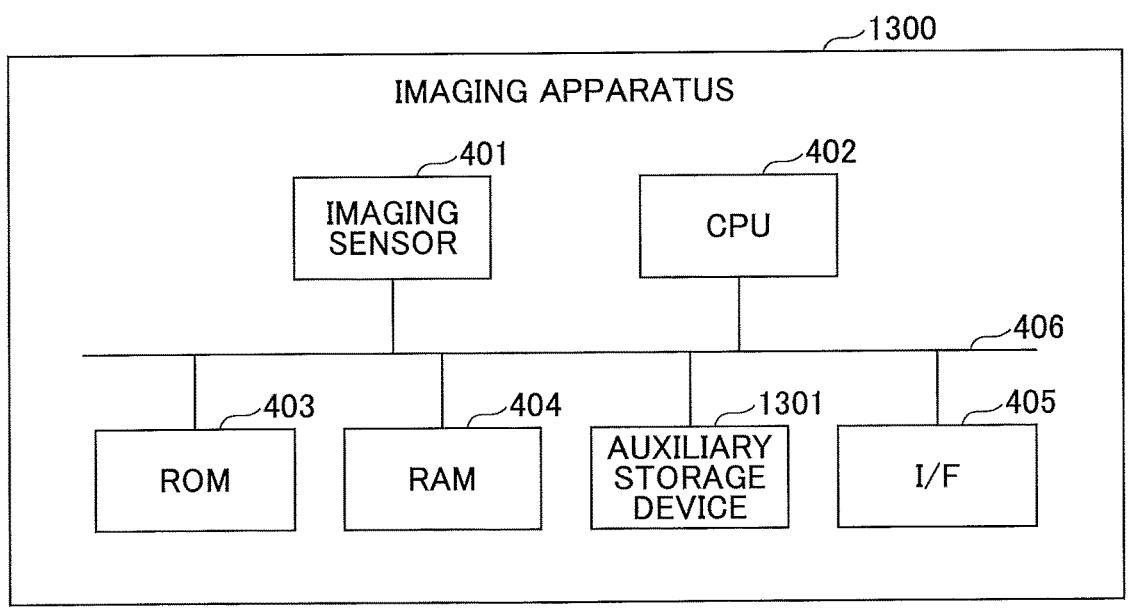

DATA GENERATION APPARATUS, DATA RECORDING SYSTEM, AND PROGRAM PRODUCT

BACKGROUND OF THE INVENTION

1. Field of the Invention

The present invention relates to a data generation apparatus, a data recording system, and a program product.

2. Description of the Related Art

As a known data recording system, there is a data recording system including a combination of a data generation apparatus (e.g., imaging device) and a data storage apparatus that receives temporal order data generated by the data generation apparatus and stores the received data. According to the data recording system, a signature may be attached to the temporal order data for guaranteeing the authenticity of the data.

However, in a case where the attachment of the signature is performed on the side of the data generation apparatus, the side of the data storage apparatus that receives the signature-attached data cannot verify the authenticity of the signature if a piece of data is missing from the received data. In such a case, the authenticity of the data cannot be guaranteed even if the remaining received data has not been falsified (or forged).

SUMMARY OF THE INVENTION

The present invention may provide a data generation apparatus, a data recording system, and a program product that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a data generation apparatus, a data recording system, and a program product particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a data generation apparatus including a processor, and a memory containing instructions that cause the processor to execute a data generation process that includes obtaining target data sequentially from time-series data, the target data including n (n being an integer greater than or equal to 2) data items in a predetermined section of the time-series data, calculating parameter information that satisfies a (k−1) order polynomial based on the target data, the (k−1) order polynomial including k random values, k being an integer greater than or equal to 1 and less than n, associating the target data to the parameter information, outputting the target data and the parameter information associated to the target data, attaching a signature to secret information based on a secret distributed protocol, the secret information being calculable by using k pairs of data including the target data and the parameter information associated to the target data, and outputting the secret information attached with the signature.

Other objects, features and advantages of the present invention will become more apparent from the following detailed description when read in conjunction with the accompanying drawings.

BRIEF DESCRIPTION OF THE DRAWINGS

FIGS. 3A to 3C are schematic diagrams for explaining a secret distributed protocol (secret sharing protocol);

FIG. 12 is a schematic diagram illustrating an example of setting parameter information stored in a setting parameter storage part according to the second embodiment of the present invention;

FIG. 13 is a schematic diagram illustrating a hardware configuration of an imaging apparatus according to the third embodiment of the present invention;

DETAILED DESCRIPTION OF THE PREFERRED EMBODIMENTS

Figure 1:
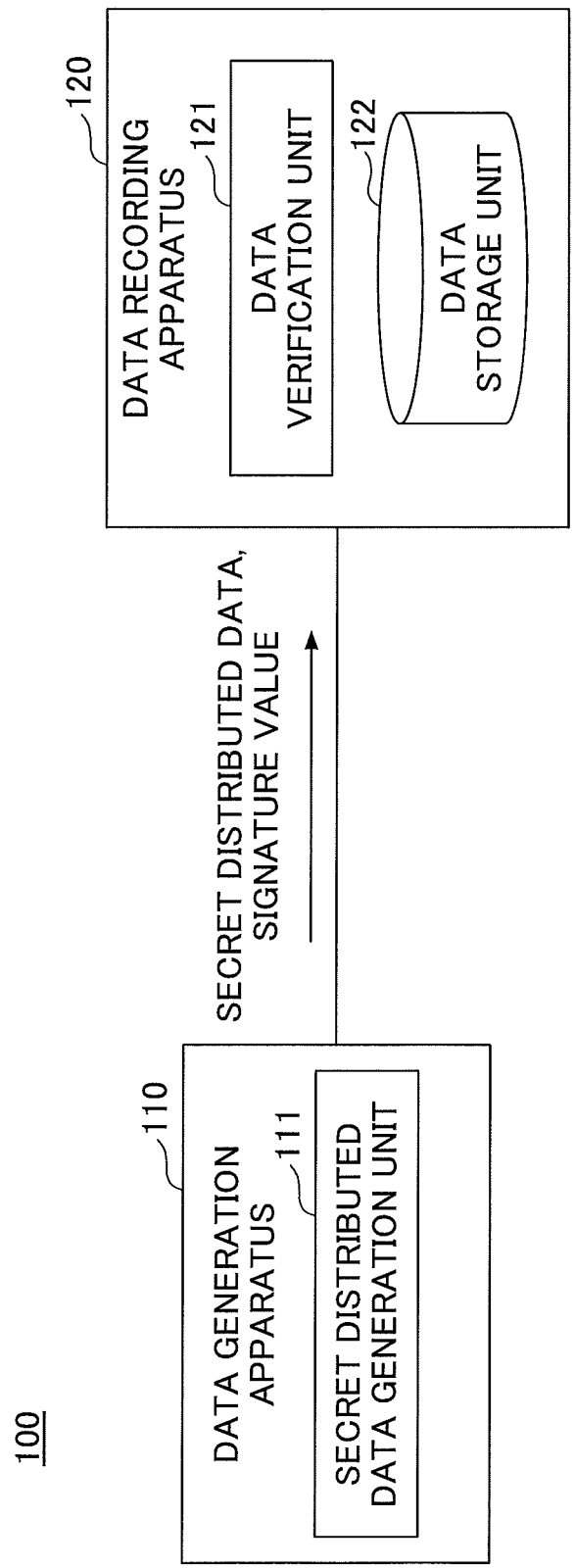
FIG. 1 is a schematic diagram illustrating a configuration of a data recording system according to the first embodiment of the present invention.

Next, embodiments of the present invention are described with reference to the accompanying drawings. Throughout the description of the embodiments and the drawings, like parts and components are denoted with like reference numerals and are not redundantly explained.

First Embodiment

<1. Configuration of Data Recording System>

First, an overall configuration of a data recording system 100 is described. FIG. 1 is a schematic diagram illustrating a configuration of the data recording system 100 according to an embodiment of the present invention.

As illustrated in FIG. 1, the data recording system 100 includes a data generation apparatus 110 and a data storage apparatus 120. According to the first embodiment, the data generation apparatus 110 and the data storage apparatus 120 are connected to communicate with each other via a network.

The data generation apparatus 110 is an apparatus that generates time-series data (data arranged in temporal order). In the first embodiment, an imaging apparatus that generates motion image data is hereinafter described as an example of the data generation apparatus 110. A secret distributed data generation program is installed in the imaging apparatus 110. By executing the secret distributed data generation program, the data generation apparatus (in this embodiment, imaging apparatus) 110 functions as a secret distributed data generation unit 111.

The secret distributed data generation unit 111 generates secret distributed data and transmits the secret distributed data to the data storage apparatus 120 by way of streaming transmission. The secret distributed data generation unit 111 generates the secret distributed data by associating parameter information to generation motion image data. The parameter information is based on a secret distributed protocol (described in detail below). Further, the secret distributed data generation unit 111 attaches a signature to secret information and transmits the secret information attached with the signature to the data storage apparatus 120. The secret information is used when the data storage apparatus 120 performs signature verification on the secret distributed information. The secret distributed data generation unit 111 transmits the secret information as a signature value to the data storage apparatus 120.

The data storage apparatus 120 is a storage apparatus that stores various data transmitted from the data generation apparatus 110. In the first embodiment, a server apparatus that stores secret distributed data and signature values is described as an example of the data storage apparatus 120. A data verification program is installed in the data storage apparatus (in this embodiment, server apparatus) 120. By executing the data verification program, the server apparatus 120 functions as a data verification unit 121.

The data verification unit 121 receives the secret distributed data and the signature value transmitted from the imaging apparatus 110 and stores the received data in the data storage unit 122. Further, the data verification unit 121 performs signature verification by using secret information that is calculated based on the secret distributed data stored in the data storage unit 122 and another secret information that is calculated based on the signature value stored in the data storage unit 122.

Note that the data verification unit 121 can perform signature verification even in a case where one or more secret distributed data included in the secret distributed data transmitted from the imaging apparatus 110 by streaming is missing (lost). This is because the secret distributed data generated by using the secret distributed protocol has high tolerance (integrity) against data loss during signature verification.

<2. Description of Secret Distributed Protocol>

Next, secret distributed protocol having high tolerance (integrity) with respect to data loss during signature verification is described with reference to FIGS. 2A to 3C. FIGS. 2A-3C are schematic diagrams for explaining the secret distributed protocol.

(1) Overview

Figure 2A:
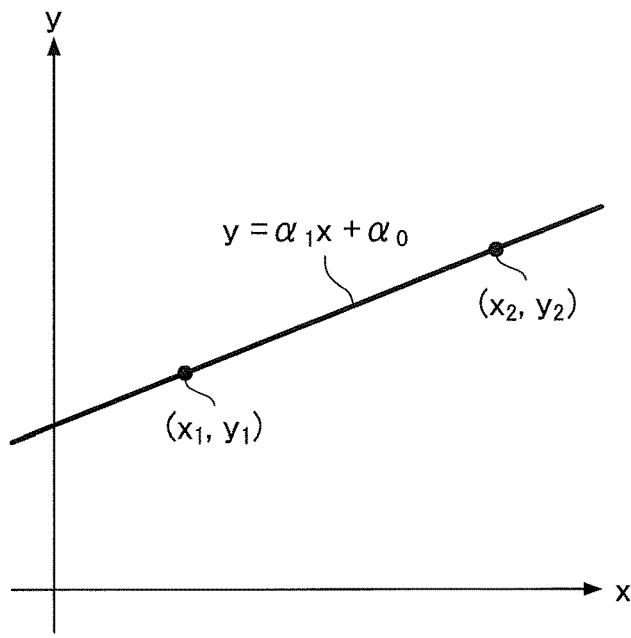
FIGS. 2A and 2B are schematic diagrams for explaining a secret distributed protocol (secret sharing protocol)
Figure 2B:
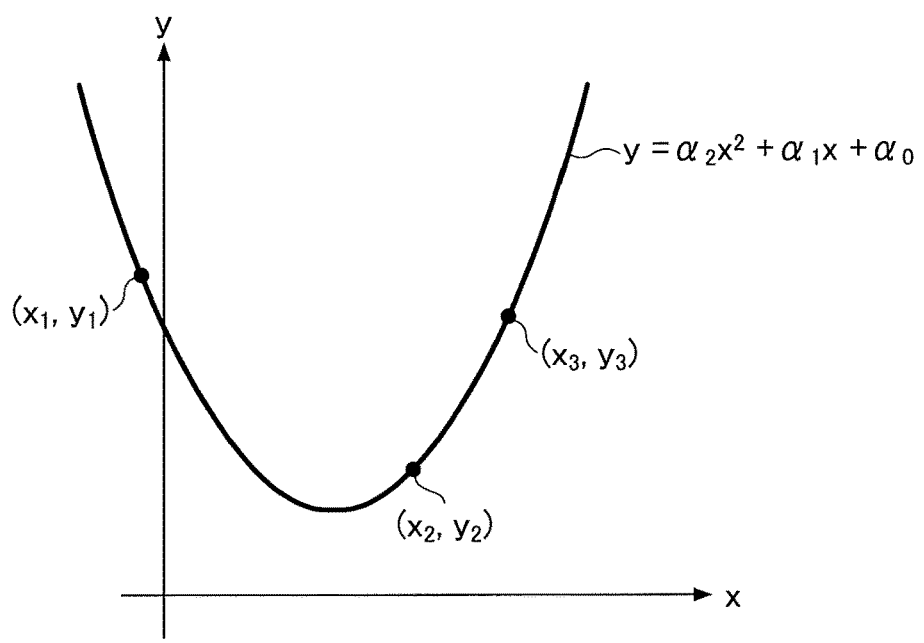

Typically, a (k-1) order polynomial can be uniquely defined if k independent solutions exist whereas the (k-1) order polynomial cannot be uniquely defined if the number of solutions is less than or equal to (k-1). FIG. 2A illustrates a case where a first order polynomial ($y=\alpha_{1}x+\alpha_{0}$) is uniquely defined based on two independent solutions (($x_1$, $y_1$), ($x_2$, $y_2$)). FIG. 2B illustrates a case where a second order polynomial ($y=\alpha_{2}x^2\alpha_{1}x\ \alpha_{0}$) is uniquely defined based on three independent solutions (($x_1$, $y_1$), ($x_2$, $y_2$), ($x_3$, $y_3$)).

Figure 3A:
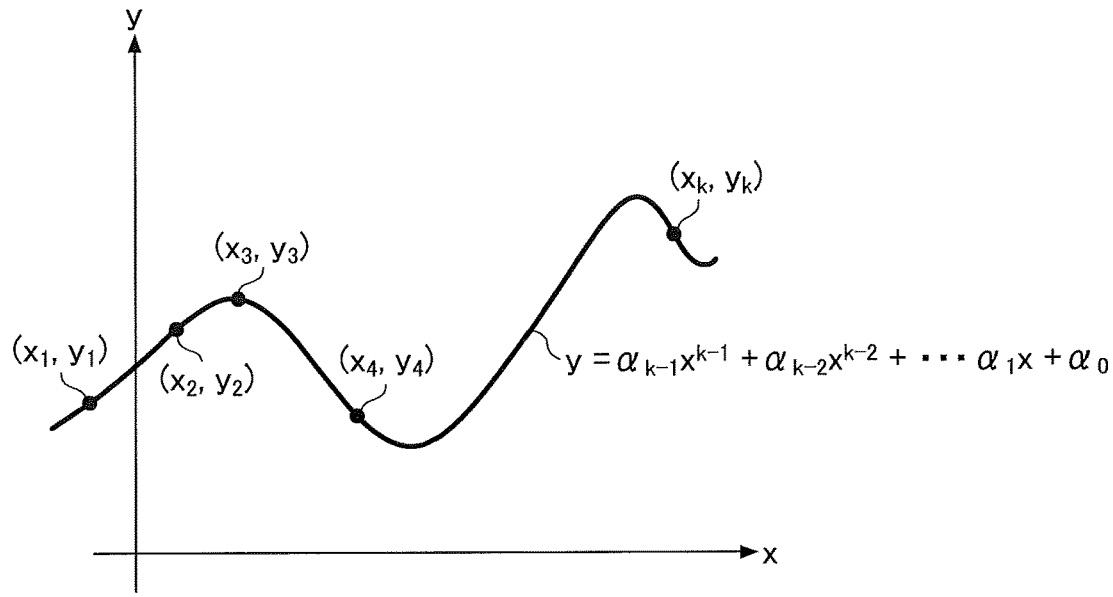

Further, FIG. 3A illustrates a case where a (k-1) order polynomial ($y=\alpha_{k-1}x^{k-1}+\alpha_{k-2}x^{k-2}+\ldots \alpha_{1}x+\alpha_{0}$) is uniquely defined based on k independent solutions (($x_1$, $y_1$), ($x_2$, $y_2$), ..., ($x_k$, $y_k$)).

Figure 3B:
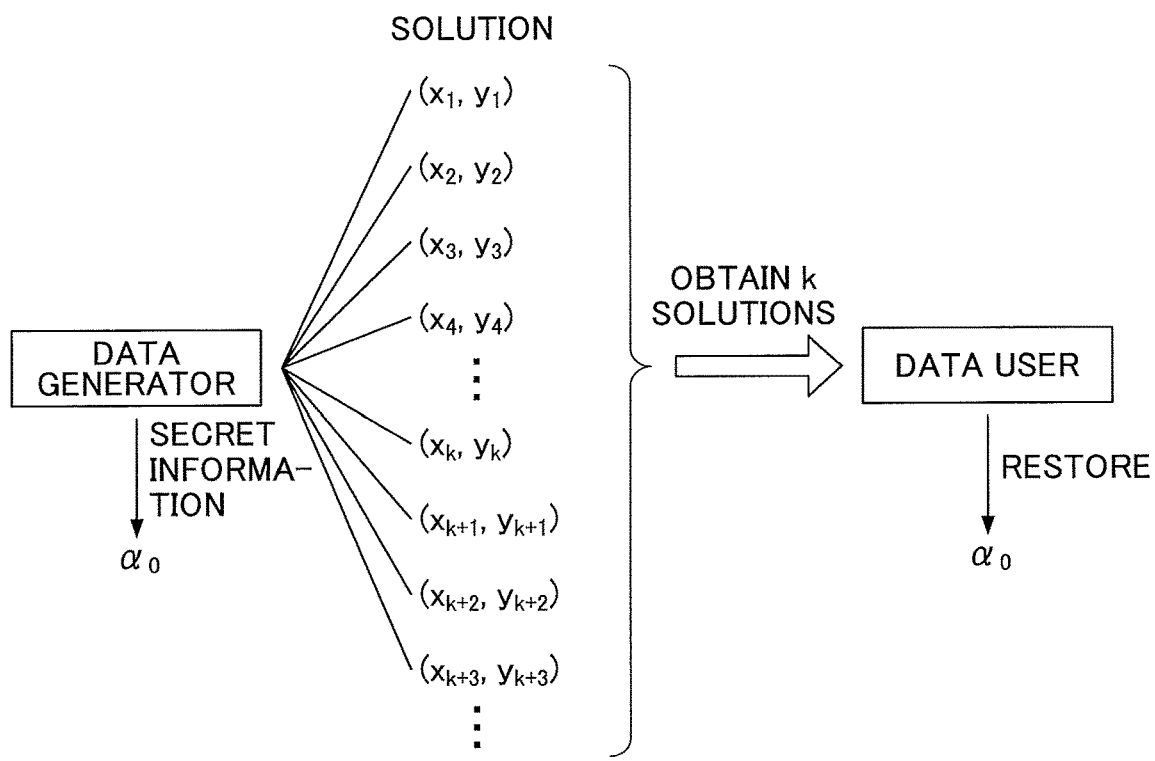

The secret distributed protocol utilizes the above-described relationship between a polynomial and the solution of the polynomial. In a case of using the secret distributed protocol, an entity that generates secret information (data generator) embeds generated secret information into a 0 order term ($\alpha_0$) of a (k-1) order polynomial as illustrated in FIG. 3B. Further, the data generator generates multiple solutions of the (k-1) order polynomial, divides the solutions, and retains the divided solutions. Accordingly, even in a case where one or more of the multiple solutions are leaked, the secret information ($\alpha_0$) cannot be restored. That is, the secret distributed protocol has a characteristic of high tolerance against information leakage.

Further, the user of data (data user) can recover the secret information ($\alpha_0$) as long as the data user can obtain k solutions of the multiple solutions generated by the data generator by using the secret distributed protocol as illustrated in FIG. 3B. This is because the (k-1) order polynomial can be uniquely determined by using the k solutions obtained. That is, the secret distributed protocol also has a characteristic of high tolerance against data loss.

In light of the characteristic of high tolerance against data loss, the first embodiment applies the secret distributed protocol to time-series data.

(2) Applying Secret Distributed Protocol to Time-Series Data

The imaging apparatus 110 of the first embodiment achieves improvement of tolerance against data loss during signature verification by applying the secret distributed protocol to time-series data (in this embodiment, motion image data). The imaging apparatus 110 of the first embodiment is described with reference to FIG. 3C.

First, the imaging apparatus 110 obtains n ("n" being an integer greater than or equal to 2) data units from motion image data arranged in time-series. The term "data unit(s)" refers to a predetermined unit of data that constitutes the motion image data. For example, in a case where the imaging apparatus 110 processes the motion image data in units of frames (frame-by-frame), the "predetermined unit of data" is each frame of the motion image data. Further, in a case where the imaging apparatus 110 processes the motion image data in units of packets (packet-by-packet), the "predetermined unit of data" is each packet of the motion image data. In the following description of the embodiments, the $i^{th}$ data unit among n data units is indicated as "$D_i$".

Then, the imaging apparatus 110 generates n solutions of a (k-1) order polynomial based on n data units ($D_i$). In generating the solutions of (k-1) order polynomial, "k" is an integer greater than or equal to 1 and less than n, and a random value is used for the k parameters ($\alpha_{k-1}, \alpha_{k-2}, \ldots \alpha_0$) of the (k-1) order polynomial. According to the first embodiment, a hash value is used in substituting n data units ($D_i$) to a variable x. Further, among the values of the n variables y that are calculated by the substitution of Hash ($D_i$), the $i^{th}$ value is indicated as parameter information "$W_i$". The parameter information "$W_i$" is calculated based on the following formula.

[Formula 1]

$$W_i = \Sigma_{(t=0-k-1)} \alpha_t \times \text{Hash}(D_i)^t \quad \text{(Formula 1)}$$

As a result, the imaging device 110 can calculate n solutions ($D_i$, $W_i$) of the (k-1) order polynomial ($y=\alpha_{k-1}x^{k-1}+\alpha_{k-2}x^{k-2}+\ldots \alpha_{1}x+\alpha_{0}$) based on n data units. Then, the imaging device 110 transmits the calculated n solutions ($D_i$, $W_i$) as secret distributed data. The secret distributed data that is transmitted includes a pair of a data unit and parameter information associated to the data unit.

Even in a case where a part of the secret distributed data ($D_i$, $W_i$) is lost, the server apparatus 120 can calculate the parameters ($\alpha_{k-1}, \alpha_{k-2}, \ldots \alpha_0$) as long as k secret distributed data can be gathered.

In a case of assuming that k secret distributed data are not falsified, the parameters ($\alpha_{k-1}, \alpha_{k-2}, \ldots \alpha_0$) that are calculated by the server apparatus 120 based on k secret distributed data would match with the parameters ($\alpha_{k-1}, \alpha_{k-2}, \ldots \alpha_0$) of the (k-1) order polynomial that is used by the imaging apparatus 110 for generating n solutions. On the other hand, the parameters would not match if k secret distributed data are falsified. In other words, signature verification can be performed by determining whether the parameters match. In a case where the parameters match (success of signature verification), the authenticity of the secret distributed data (i.e., secret distributed data not being falsified) can be guaranteed.

According to the first embodiment, the server apparatus 120 determines that the signature verification of the secret distributed data ($D_i$, $W_i$) has succeeded when there is a match of one parameter ($\alpha_0$) That is, according to the first embodiment, the parameter ($\alpha_0$) serves as the secret information. The secret information can be defined as information that can be calculated by gathering k secret distributed data. Note that the imaging apparatus 110 calculates a signature value (S) and transmits the calculated signature value (S) to the server apparatus 120, so that the server apparatus can determine the success/failure of the signature verification. The imaging apparatus 110 calculates the signature value (S) by attaching a signature to the secret information by using the following Sign algorithm.

[Formula 2]

$$S = \text{Sign}(\alpha_0, sk_{cam}) \quad \text{(Formula 2)}$$

In the [Formula 2], "$Sk_{cam}$," refers to a signature key generated by the imaging apparatus 110.

The server apparatus 120 that has received the signature value (S) calculates the secret information ($\alpha_0$) based on a verification key by using a Vrfy algorithm corresponding to the Sign algorithm. Further, the server apparatus 120 determines whether the secret information ($\alpha_0$) calculated by the k secret distributed data matches the secret information ($\alpha_0$) calculated by the signature value (S). In a case where the secret information match, the server apparatus 120 determines that the signature verification has succeeded. In a case where the secret information do not match, the server apparatus 120 determines that the signature verification has failed.

In the following description of the embodiments, each of the n secret distributed data transmitted from the imaging apparatus 110 is assumed to be attached with association information. The association information is associated to a first pair of data including a data unit ($D_i$) and parameter information ($W_i$). Further, the signature value (S) transmitted from the imaging apparatus 110 is also assumed to be attached with association information. The association information attached to the signature value (S) is associated to the n secret distributed data.

<3. Hardware Configuration of Data Recording System>

Figure 4A:
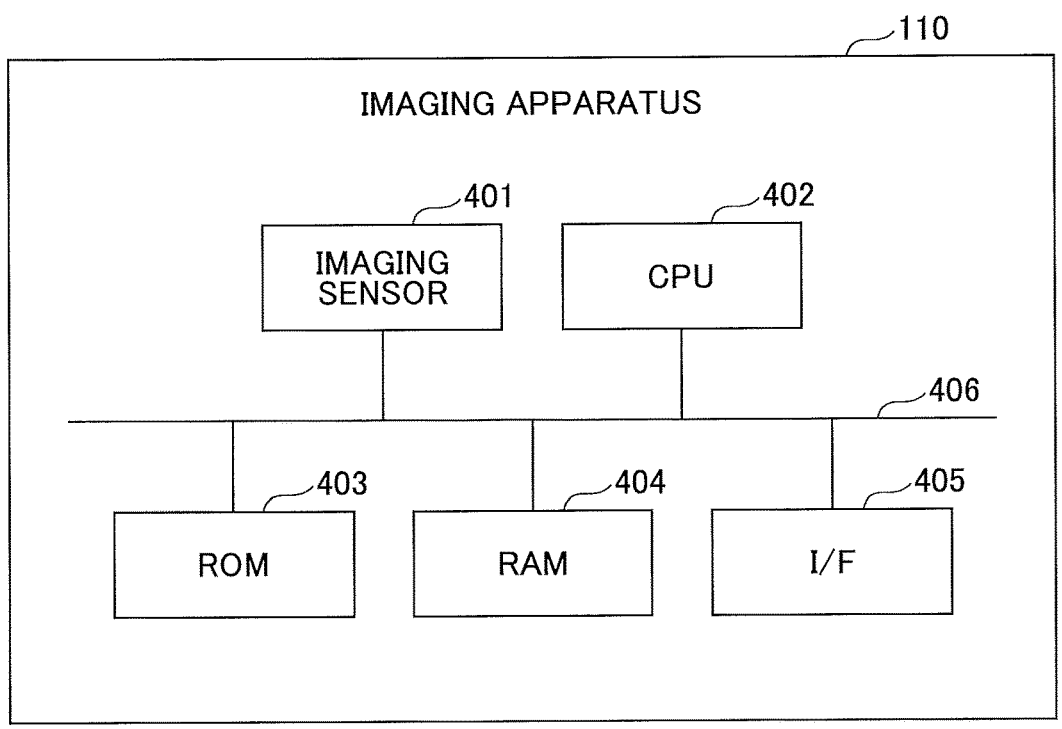
FIG. 4A is a schematic diagram illustrating a hardware configuration of an imaging apparatus according to the first embodiment of the present invention.
Figure 4B:
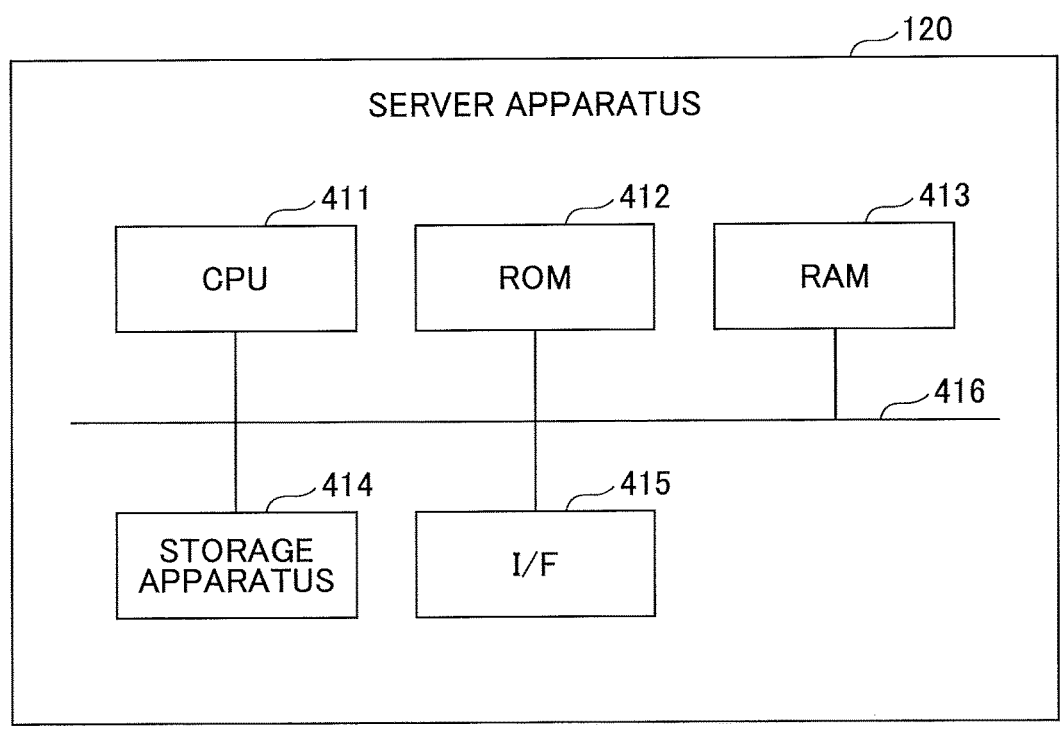
FIG. 4B is a schematic diagram illustrating a hardware configuration of a server apparatus according to the first embodiment of the present invention.

Next, the hardware configurations of the imaging apparatus 110 and the server apparatus 120 included in the data recording system 100 are described. FIG. 4A is a schematic diagram illustrating a hardware configuration of the imaging apparatus 110 according to the first embodiment of the present invention. FIG. 4B is a schematic diagram illustrating a hardware configuration of the server apparatus 120 according to the first embodiment of the present invention.

As illustrated in FIG. 4A, the imaging apparatus 110 includes an imaging sensor 401, a CPU (Central Processing Unit) 402, a ROM (Read Only Memory) 403, a RAM (Random Access Memory) 404, and an interface (I/F) 405. The hardware components included in the imaging apparatus 110 are connected to each other with a bus 406.

The imaging sensor 404 converts received light into electric signals and generates motion image data according to the electric signals. The CPU 402 is a computer that executes various programs (e.g., secret distributed data generation program) stored in the ROM 403.

The ROM 403 stores various programs to be executed by the CPU 402. The ROM 403 also stores other programs and data that are to be used when the CPU 402 executes the various programs. The RAM 404 provides a work area for the CPU 402 when the CPU 402 executes the various programs.

The I/F 405 is connected to a network. The I/F 405 performs data communication (transmission and reception of data) with respect to the server apparatus 120.

As illustrated in FIG. 4B, the server apparatus 120 includes a CPU 411, a ROM 412, a RAM 413, a storage device 414, and an I/F 415. The hardware components included in the server apparatus 120 are connected to each other with a bus 416.

Because the hardware configuration of the server apparatus 120 is substantially the same as the hardware configuration of the imaging apparatus 110, the difference between the server apparatus 110 and the imaging device 110 are described. Namely, the server apparatus 120 does not include the imaging sensor 401. Further, the server apparatus 120 includes the storage device 414.

The storage device 414 stores a data verification program which is one of the various programs to be executed by the CPU 411. The ROM 412 stores other programs and data that are to be used when the CPU 402 executes, for example, the data verification program. Note that the storage device 414 implements the above-described data storage unit 122.

<4. Functional Configuration of Imaging Apparatus>

Figure 5:
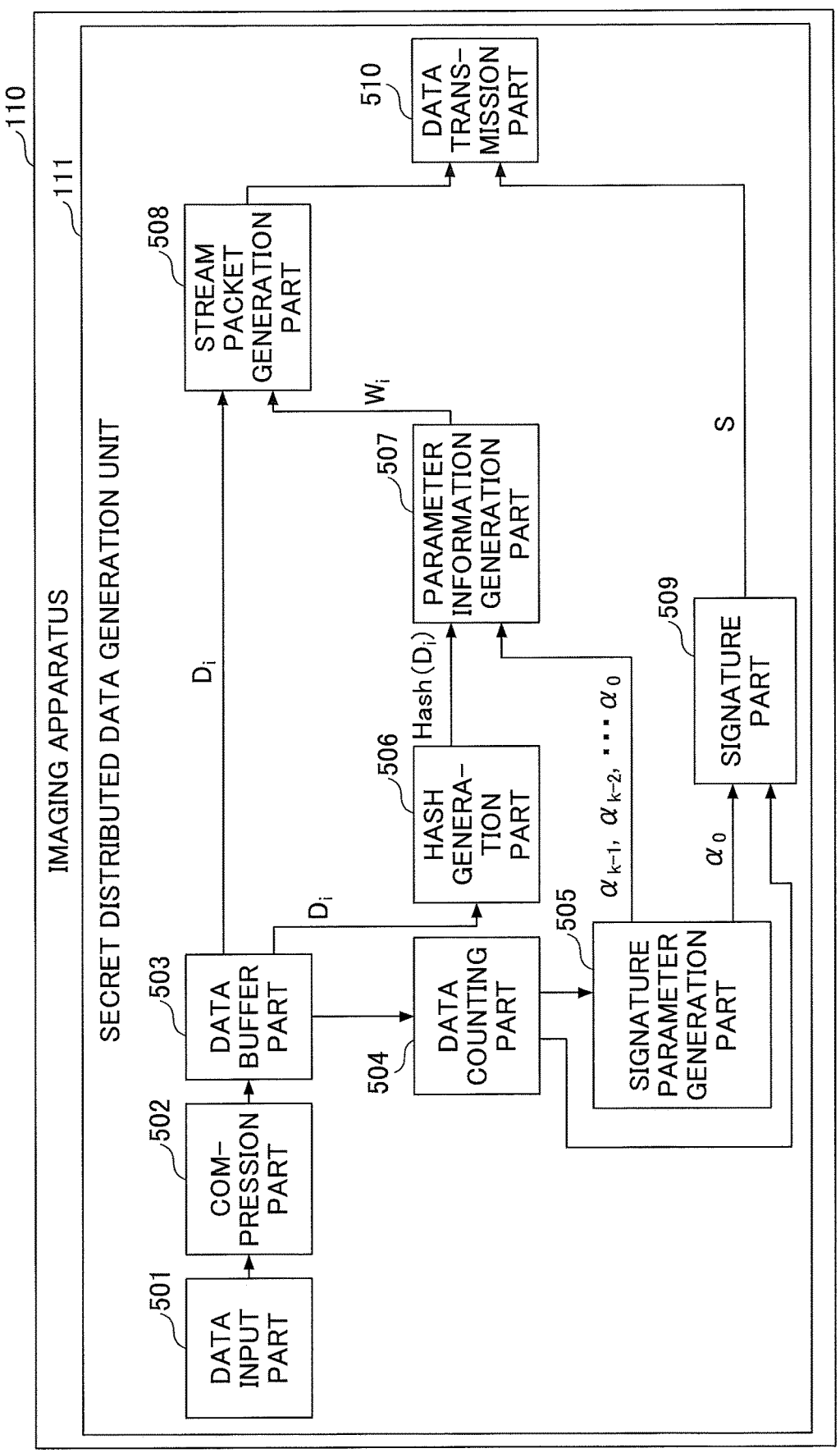
FIG. 5 is a schematic diagram illustrating a functional configuration of an imaging apparatus according to the first embodiment of the present invention.

Next, there is described a functional configuration of the secret distributed data generation unit 111 implemented by the imaging apparatus 110. FIG. 5 is a schematic diagram illustrating the functional configuration of the imaging apparatus 110 according to the first embodiment of the present invention.

As illustrated in FIG. 5, the secret distributed data generation unit 111 includes a data input part 501, a compression part 502, a data buffer part 503, a data counting part 504, a signature parameter generation part 505, a hash generation part 506, a parameter information generation part 507, a stream packet generation part 508, a signature part 509, and a data transmission part 510.

The data input part 501 obtains motion image data generated by the imaging sensor 401. The compression part 502 generates data units by compressing the obtained motion image data. The compression part 502 compresses the motion image data by using an arbitrary compression format (e.g., MPEG, H.264) and generates data units from the compressed motion image data.

The data buffer part 503 temporarily stores the data units generated by the compression part 502. The data counting part 504 counts the number of data units stored in the data buffer part 503. In a case where the counted number of data items reaches a predetermined number (n), the data counting part 504 reports to the signature parameter generation part 505 and the signature part 509 that the counted number of data items has reached a predetermined number (n).

The signature parameter generation part 505 includes a random number generator. When the signature parameter generation part 505 receives the report indicating that the counted number of data items has reached a predetermined number (n) from the data counting part 504, the signature parameter generation part 505 obtains parameters ($\alpha_{k-1}$, $\alpha_{k-2}$, ... $\alpha_0$) from the random number generator. That is, the k random values generated by the random number generator are used as the parameters ($\alpha_{k-1}$, $\alpha_{k-2}$, ... $\alpha_0$). Further, the signature parameter generation part 505 reports the obtained parameters ($\alpha_{k-1}$, $\alpha_{k-2}$, ... $\alpha_0$) to the parameter information generation part 507. Further, the signature parameter generation part 505 reports the parameter ($\alpha_0$) as secret information to the signature part 509.

The hash generation part 506 sequentially obtains data units ($D_i$) from the data units stored in the data buffer part 503 and calculates the hash values (Hash ($D_i$)) of the data units. Note that the reason that the hash values of the data units ($D_i$) are calculated by the hash generation part 506 is for reducing the work load of the imaging apparatus 110.

The parameter information generation part 507 is an example of a calculation unit. The parameter information generation part 507 obtains the hash values (Hash ($D_i$)) calculated by the hash generation part 506 and the parameters ($\alpha_{k-1}$, $\alpha_{k-2}$, ... $\alpha_0$) obtained by the signature parameter generation part 505. Further, the parameter information generation part 507 uses [Formula 1] to calculates the parameter information ($W_i$) based on the obtained hash values (Hash ($D_i$)) and the parameters ($\alpha_{k-1}$, $\alpha_{k-2}$, ... $\alpha_0$).

The stream packet generation part 508 is an example of an output unit. The stream packet generation part 508 obtains secret distributed data ($D_i$, $W_i$) by obtaining the data units ($D_i$) and the parameter information ($W_i$) and associating the data units ($D_i$) and the parameter information ($W_i$) to each other. The stream packet generation part 508 forms the obtained secret distributed data into packets and outputs the secret distributed data as packets. Note that the format for forming the secret distributed data into packets is determined according to the method used for transmitting the secret distributed data. For example, in a case where the transmission method is a network interface type, the packets are transmitted by using RTSP (Real Time Streaming Protocol) or UDP (User Datagram Protocol). In a case where the transmission method is a USB (Universal Serial Bus) type, the packets are transmitted by using an isochronouos transmission method.

The signature part 509 is an example of a first signature unit. When the signature part 509 receives the report indicating that the counted number of data items has reached a predetermined number (n) from the data counting part 504, the signature part 509 calculates a signature value (S) by using the secret information ($\alpha_0$) output from the signature parameter generation part 505. According to the first embodiment, a Sign algorithm is used for calculating the signature value (S). However, signature algorithm used for calculating the signature value (S) is not limited to the Sign algorithm. For example, an RSA algorithm, an RSASSA-PSS algorithm, or an ElGamal algorithm may be used for calculating the signature value (S).

The data transmission part 510 is an example of a first transmission unit. The data transmission part 510 transmits the secret distributed data ($D_i$, $W_i$) formed into packets by the stream packet generation part 508 and the signature value (S) calculated by the signature parameter generation part 505. The data transmission part 510 transmits the packets of the secret distributed data ($D_i$, $W_i$) by using a connectionless type streaming transmission method. Further, the data transmission part 510 transmits the signature value (S) by using a connection type transmission method.

Figure 6:
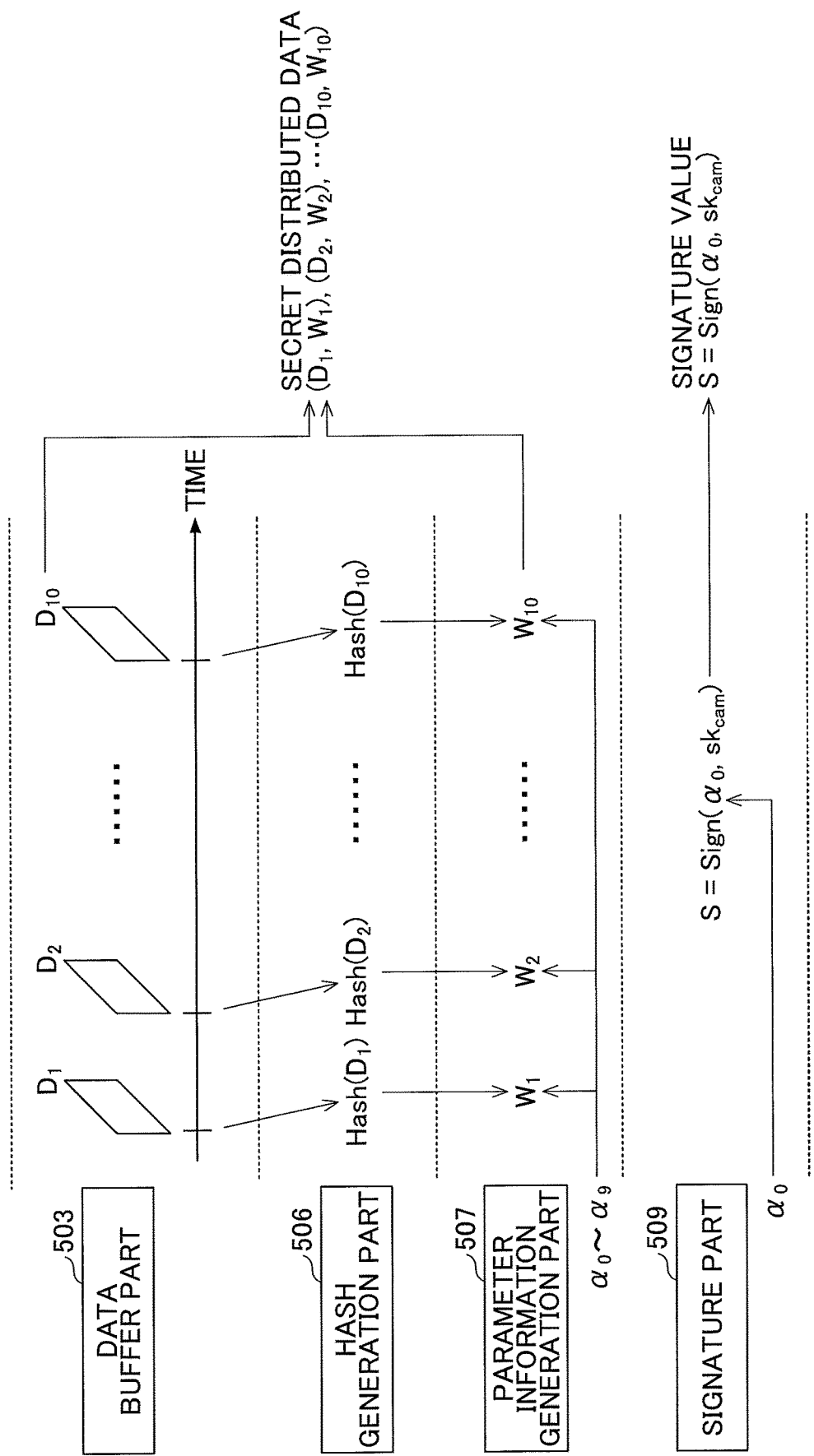
FIG. 6 is a schematic diagram illustrating the operations (actions) of each part included in an imaging apparatus according to the first embodiment of the present invention.

FIG. 6 is a schematic diagram illustrating the operations (actions) of the data buffer part 503, the hash generation part 506, the parameter information generation part 507, and the signature part 509 included in the imaging apparatus 110 of the first embodiment. In the example illustrated in FIG. 6, the predetermined number "n" is 10.

As illustrated in FIG. 6, the hash generation part 506 calculates the hash value (Hash ($D_1$)) when the hash generation part 506 obtains the data unit ($D_1$) stored in the data buffer part 503.

Further, the parameter information generation part 507 obtains the hash value (Hash ($D_1$)) calculated by the hash generation part and the parameters ($\alpha_9$, $\alpha_8$, ... $\alpha_0$) output by the signature parameter generation part 505. Further, the parameter information generation part 507 calculates the parameter information ($W_1$) based on the hash value (Hash ($D_1$)) and the parameters ($\alpha_9$, $\alpha_8$, ... $\alpha_9$) and outputs the calculated parameter information ($W_1$).

Similarly, the parameter information ($W_2$, $W_3$, ... $W_{10}$) are output by the parameter information generation part 507 by performing each of the aforementioned processes of FIG. 6 on the other data units ($D_2$, $D_3$, ... $D_{10}$) stored in the data buffer part 503.

The stream packet generation part 508 associates the data units ($D_1$, $D_2$, ... $D_{10}$) stored in the data buffer part 503 to the parameter information ($W_1$, $W_2$, ... $W_{10}$) output by the parameter information generation part 507. Thereby, the stream packet generation part 508 obtains the secret distributed data (($D_1$, $W_1$), ($D_2$, $W_2$), ... $D_{10}$, $W_{10}$)).

Meanwhile, the signature part 509 calculates the signature value (S) by using the secret information ($\alpha_0$) output by the signature parameter generation part 505.

Thus, owing to the above-described actions of each of the parts of the imaging apparatus 110, the secret distributed data and the signature value based on the generated motion image data can be output.

<5. Processes of Secret Distributed Data Generation Part>

Figure 7:
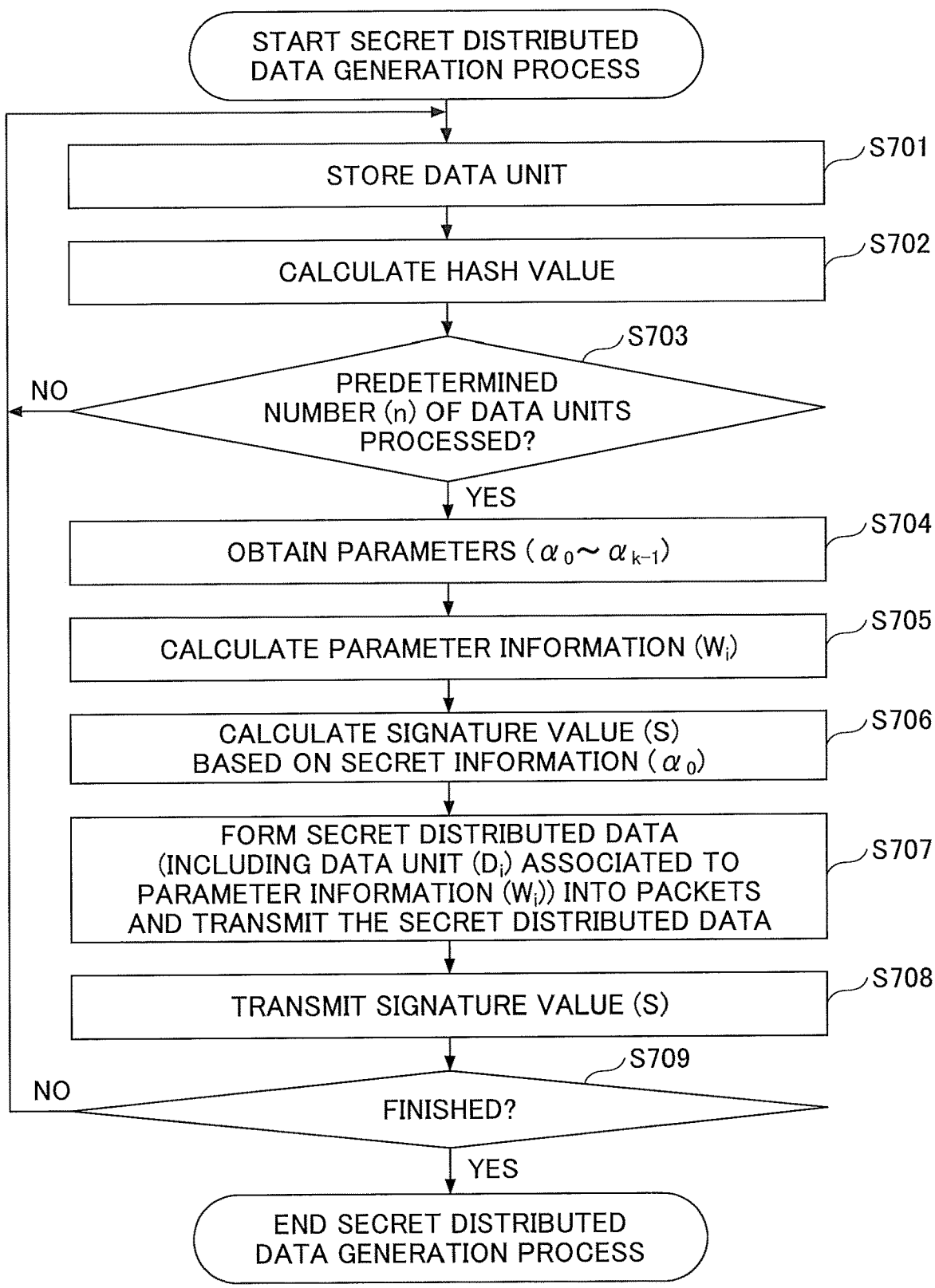
FIG. 7 is a flowchart illustrating the flow of a secret distributed data generation process according to the first embodiment of the present invention.

Next, the flow of the secret distributed data generation process by the secret distributed data generation unit 111 is described. FIG. 7 is a flowchart illustrating the flow of the secret distributed data generation process. When the imaging sensor 401 starts the generation of motion image data, the secret distributed data generation unit 111 starts the processes illustrated in FIG. 7.

In Step S701, the data input part 501 obtains motion image data generated by the imaging sensor 401. Further, the compression part 502 compresses the obtained motion image data and generates data units with the compressed motion image data. Then, the compression part 502 stores the data units in the data buffer part 503.

In Step S702, the hash generation part 506 obtains the data unit ($D_i$) from the data buffer part 503 and calculates the hash value (Hash ($D_i$)) of the obtained data unit ($D_i$).

In Step S703, the data counting part 504 determines whether the predetermined number n of data units have been stored in the data buffer part 503. In a case where the predetermined number n of data units have been stored in the data buffer part 503 (No in Step S703), the hash generation part 506 determines that hash values for the predetermined number n of data items have not yet been calculated. In this case, the secret distributed data generation process returns to Step S703. On the other hand, in a case where the predetermined number n of data units have been stored in the data buffer part 503 (Yes in Step S703), the hash generation part 506 determines that hash values for the predetermined number n of data items have been calculated. Accordingly, the secret distributed data generation process proceeds to Step S704.

In Step S704, the signature parameter generation part 505 obtains k random values generated by the random number generator as the parameters ($\alpha_{k-1}$, $\alpha_{k-2}$, ... $\alpha_0$).

In Step S705, the parameter information generation part 507 obtains the predetermined number of hash values (Hash $D_i$)) and k parameters ($\alpha_{k-1}$, $\alpha_{k-2}$, ... $\alpha_0$). Further, the parameter information generation part 507 calculates n parameter information ($W_i$) by using the obtained the predetermined number n of hash values and k parameters.

In Step S706, the signature part 509 obtains the parameter ($\alpha_0$) as the secret information from the signature parameter generation part 505 and adds a signature to the obtained secret information ($\alpha_0$). Thereby, the signature part 509 calculates the signature value (S) based on the secret information ($\alpha_0$) and outputs the calculated signature value (S).

In Step S707, the stream packet generation part 508 obtains the secret distributed data by associating the data unit ($D_i$) stored in the data buffer part 503 to the parameter information ($W_i$) output by the parameter information generation part 507. Further, the stream packet generation part 508 outputs the secret distributed data in the form of packets. Further, the data transmission part 510 performs streaming transmission to transmit the secret distributed data output from the parameter information generation part 507 to the server apparatus 120 via the network.

In Step S708, the data transmission part 510 transmits the signature value (S) output from the signature part 509 to the server apparatus 120 via the network.

In Step S709, the data input part 501 determines whether to end the secret distributed data generation process. In a case where the input of the motion image data generated by the imaging sensor 401 is continuing (No in Step S709), the secret distributed data generation process returns to Step S701. In a case where the input of the motion image data generated by the imaging sensor 401 has stopped (Yes in Step S709), the secret distributed data generation process is terminated.

<6. Functional Configuration of Server Apparatus>

Figure 8:
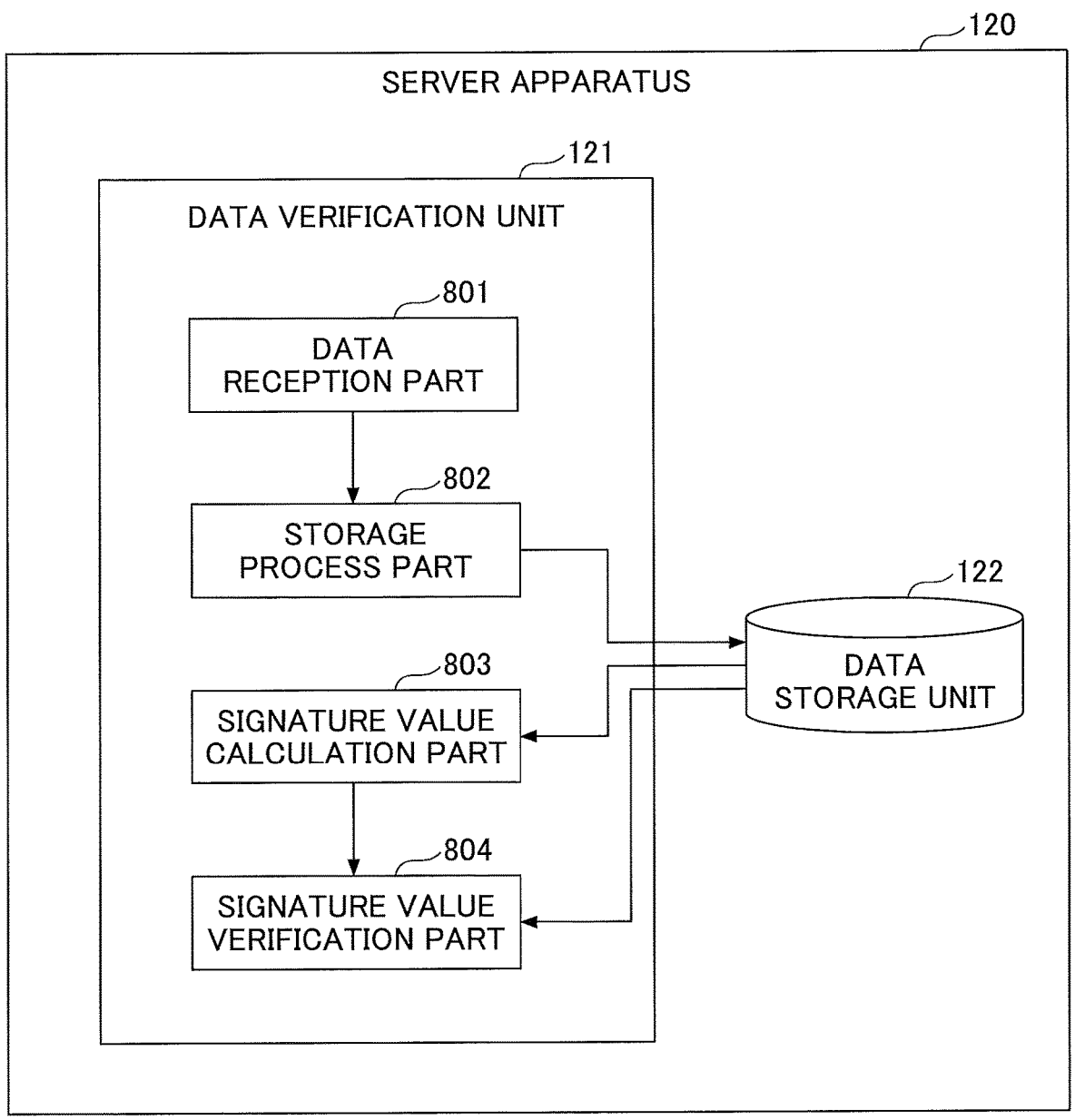
FIG. 8 is a schematic diagram illustrating the functional configuration of a server apparatus according to the first embodiment of the present invention.

Next, a functional configuration of the data verification part 121 implemented by the server apparatus 120 is described. FIG. 8 is a schematic diagram illustrating the functional configuration of the server apparatus 120.

As illustrated in FIG. 8, the data verification unit 121 includes a data reception part 801, a storage process part 802, a signature value calculation part 803, and a signature value verification part 804.

The data reception part 801 is an example of a reception unit. The data reception part 801 receives the secret distributed data (a pair of the data unit ($D_1$) and parameter information ($W_1$) associated to the data unit) and the signature value (S) transmitted from the imaging apparatus 110. The storage process part 802 stores the secret distributed data and the signature value received by the data reception unit 801 in the data storage unit 122.

The signature value calculation part 803 is an example of a first falsification determination unit. The signature value calculation part 803 determines whether signature verification is a success or a failure. For example, the signature value calculation part 803 determines whether k or more secret distributed data are stored in the data storage unit 122. In a case where less than k secret distributed data is stored in the data storage unit 122, the signature value calculation part 803 determines that the signature verification has failed.

In a case where k or more secret distributed data are stored in the data storage unit 122, the signature value calculation part 803 determines that the signature verification is a success, and reads out the k secret distributed data from the data storage unit 122. The signature value calculation part 803 calculates secret information ($\alpha_0$) based on the read out k secret distributed data by using the following formula.

[Formula 3]

$$\alpha_0 = \Sigma_{(p=1-k)} W_{ip} \Pi_{(0 \leq q \leq k, q \neq p)} \text{Hash}(D_{iq})/(\text{Hash}(D_{iq}) - \text{Hash}(D_{ip}))$$ (Formula 3)

The signature value verification part 804 reads out the signature value (S) stored in the data storage unit 122 and uses the vrfy algorithm to calculate the secret information ($\alpha_0$) based on the verification key $vk_{cam}$.

[Formula 4]

$$\text{Vrfy}(S, vk_{cam}) = \alpha_0$$ (Formula 4)

The signature value verification part 804 is an example of a second falsification determination unit. The signature value verification part 804 determines whether signature verification is a success. For example, the signature value verification part 804 compares the secret information ($\alpha_0$) calculated by the signature value calculation part 803 and the secret information ($\alpha_0$) calculated by using the vrfy algorithm based on the signature value (S). In a case where both of the secret information match as a result of the comparison, the signature value verification part 804 determines that the signature verification is a success (i.e., secret distributed data is not falsified). On the other hand, in a case where the secret information do not match as a result of the comparison, the signature value verification part 804 determines that the signature verification is a failure (i.e., secret distributed data is falsified).

The results of determining the signature verification by the signature value calculation part 803 and the signature value verification part 804 may be stored in, for example, the data storage unit 122. Thereby, the server apparatus 120 can perform streaming transmission with an external terminal in which only the data unit included in the secret distributed data determined to have succeeded in the signature verification is transmitted. As a result, the external terminal (e.g., information terminal connected to the network) can reproduce only the motion image data whose authenticity is guaranteed.

<7. Process of Data Verification Part>

Figure 9:
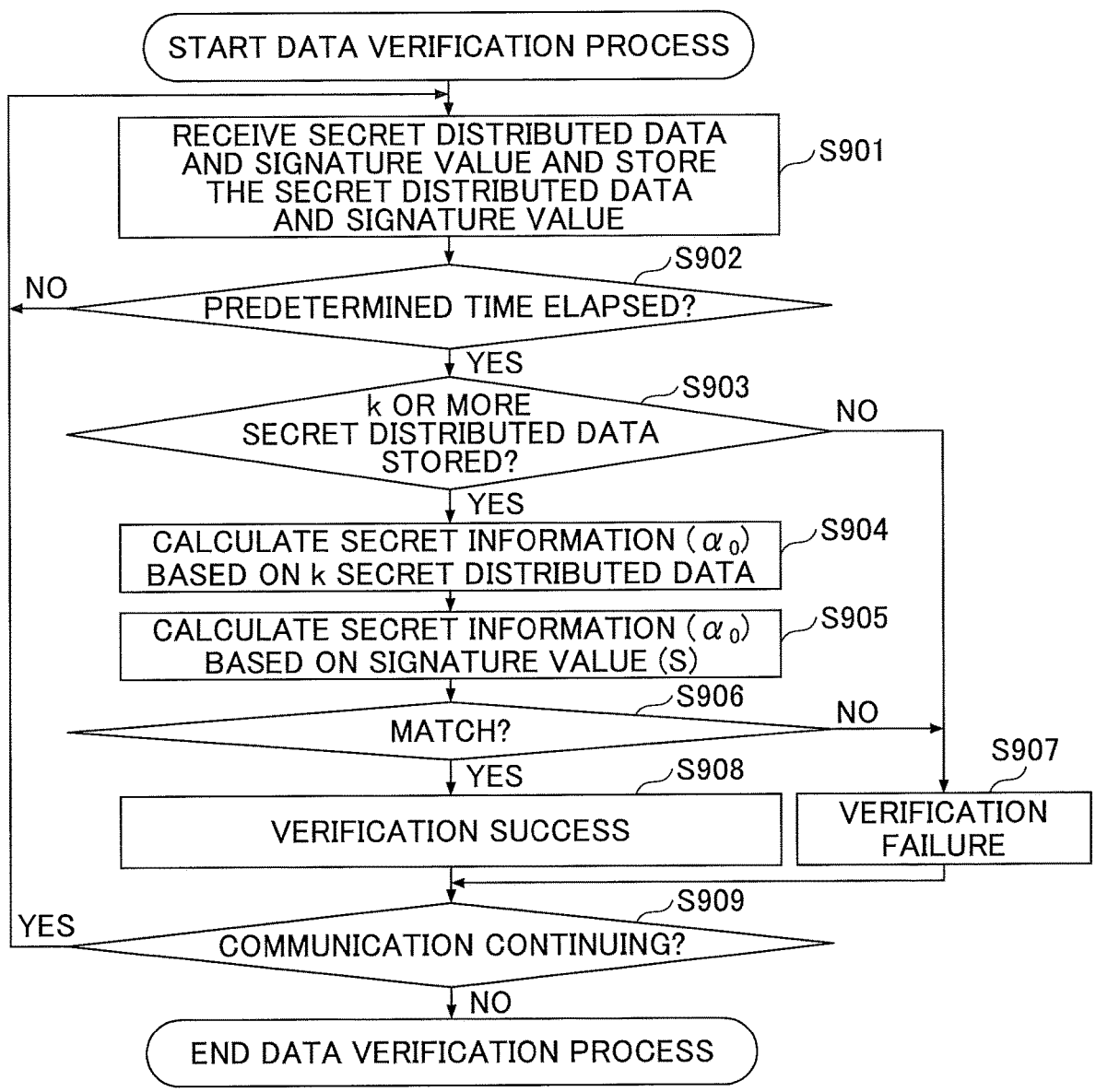
FIG. 9 is a flowchart illustrating the flow of a data verification process according to the first embodiment of the present invention.

Next, the flow of the data verification process by the data verification unit 121 is described. FIG. 9 is a flowchart illustrating the flow of the data verification process. The processes illustrated in FIG. 9 are implemented by communicably connecting the server apparatus 120 to the imaging apparatus 110.

In Step S901, the data reception part 801 receives the secret distributed data and the signature value transmitted from the imaging apparatus 110. Further, the storage process part 802 stores the secret distributed data and the signature value received from the data reception part 801 in the data storage unit 122.

In Step S902, the data reception part 801 determines whether a predetermined time has elapsed. In Step S902, the data reception part 801 waits until the predetermined time elapses in a case where the data reception part 801 determines that the predetermined time has not elapsed.

On the other hand, the data verification process proceeds to Step S903 in a case where the data reception part 801 determines that the predetermined time has elapsed. In Step S903, the signature value calculation part 803 determines whether k or more secret distributed data are stored in the data storage unit 122.

In Step S903, the signature value calculation part 803 determines that the signature verification is a failure in a case where the signature value calculation part 803 determines that k or more secret distributed data are not stored in the data storage unit 122. In this case, the data verification process proceeds to Step S907.

On the other hand, in a case where the signature value calculation part 803 determines that k or more secret distributed data are stored in the data storage unit 122, the data verification process proceeds to Step S904. In Step S904, the signature value calculation part 803 reads out k secret distributed data from the data storage unit 122 and calculates the secret information ($\alpha_0$) by using Formula 3.

In Step 905, the signature value verification part 804 reads out the signature value (S) stored in the data storage unit 122 and uses the vrfy algorithm to calculate the secret information ($\alpha_0$) d based on the verification key $vk_{cam}$.

In Step S906, the signature value verification part 804 compares the secret information ($\alpha_0$) calculated by the signature value calculation part 803 and the secret information ($\alpha_0$) calculated by using the vrfy algorithm based on the signature value (S). In a case where the secret information do not match as a result of the comparison of Step S906, the signature value verification part 804 determines that the signature verification is a failure (i.e., secret distributed data is falsified). In this case, the data verification process proceeds to Step S907.

On the other hand, in a case where the secret information match as a result of the comparison of Step S906, the signature value verification part 804 determines that the signature verification is a success failure (i.e., secret distributed data is not falsified).

In Step S909, the data reception part 801 determines whether communication with the imaging apparatus 110 is continuing. In a case where the data reception part 801 determines that communication with the imaging apparatus 110 is continuing, the data verification process returns to Step S901. On the other hand, in a case where the data reception part 801 determines that communication with the imaging apparatus 110 is disconnected, the signature value calculation part 803 or the signature value verification part 804 performs signature verification on the secret distributed data that are already stored in the data storage unit 122 but have not yet been processed. After performing the signature verification, the data verification process is terminated.

<8. Applied Example>

Figure 10:
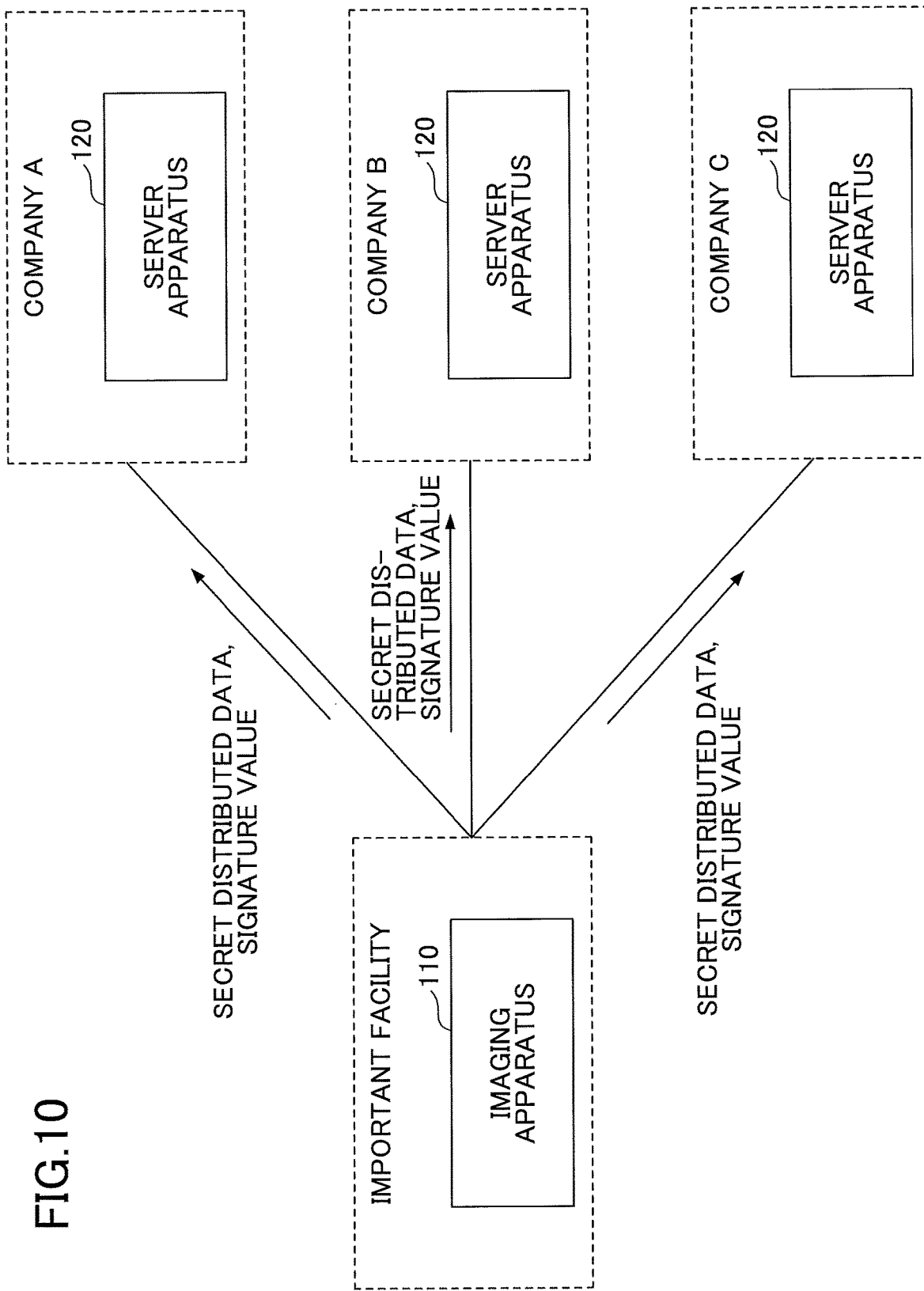
FIG. 10 is a schematic diagram illustrating an applied example of a data recording system according to the first embodiment of the present invention.

Next, an applied example of the data recording system 100 is described. FIG. 10 is a schematic diagram illustrating an applied example of the data recording system 100. The example of FIG. 10 illustrates the imaging apparatus 110 of the first embodiment being placed in an important installation (e.g., nuclear power plant) and the server apparatus 120 being placed in multiple companies (companies A to C).

Because an important installation such as a nuclear power plant) runs 24 hours, there is a need for the imaging apparatus placed in the installation to perform streaming transmission of authentic motion image data (motion image data whose authenticity is guaranteed) consecutively 24 hours a day.

The imaging apparatus 110 of the first embodiment can fulfill such need because the process load of the imaging apparatus 110 is light. This is because the process load for the imaging apparatus 110 to attach a signature is light. That is, according to the imaging apparatus 110 of the first embodiment, the imaging apparatus 110 attaches a signature to the secret information ($\alpha_0$) instead of attaching a signature to a data unit. Accordingly, the process load for the imaging apparatus 110 to attach a signature is light. Further, according to the imaging apparatus 110 of the first embodiment, the load for processing the data unit is light because the imaging apparatus 110 generates the parameter information by performing a hash process on the data unit.

As illustrated in FIG. 10, each company can perform signature verification with the transmitted secret distributed data and the signature value even in a case of loss of transmitted data. Accordingly, the authenticity of motion image data can be guaranteed. Because the same data can be transmitted to multiple companies, authentic motion image data can be prevented from being concealed by a particular company of the multiple companies.

Hence, according to the above-described data recording system of the first embodiment, the imaging apparatus sequentially obtains n data units ($D_i$) from the generated motion image data and calculates, based on the obtained data units ($D_i$), the parameter information ($W_i$) satisfying the (k−1) order polynomial including k (1≤k<) random numbers. Further, the imaging apparatus transmits n secret distributed data (having the obtained data units ($D_i$) associated to the parameter information ($W_i$)) to the server apparatus. Further, the imaging apparatus calculates the signature value (S) by attaching a signature to secret information that can be calculated by gathering k secret distributed data. Then, the imaging apparatus transmits the calculated signature value to the server apparatus.

Thereby, in a case where the server apparatus receives k secret distributed data of the n secret distributed data transmitted from the imaging apparatus, the server apparatus can calculate the secret information based on the k secret distributed data (calculation possible even if (n−k) data is missing). Then, the server apparatus performs signature verification by comparing the calculated secret information with the secret information calculated from the signature value transmitted from the imaging apparatus. Thereby, the authenticity of the secret distributed data can be guaranteed. That is, even in a case where a part of the secret distributed data transmitted from the imaging apparatus is missing, the server apparatus can perform signature verification, so that the authenticity of the secret distributed data can be guaranteed.

Hence, according to the first embodiment of the present invention, tolerance against data loss during signature verification can be improved.

Second Embodiment

In the above-described first embodiment, each part of the secret distributed data generation unit 111 performs a process that is set beforehand. Alternatively, the secret distributed data generation unit 111 may be configured to change a process performed by each part of the secret distributed data generation unit 111 according to conditions input from an external device or the like. Next, the second embodiment of the present invention is described mainly on the differences with respect to the first embodiment.

Figure 11:
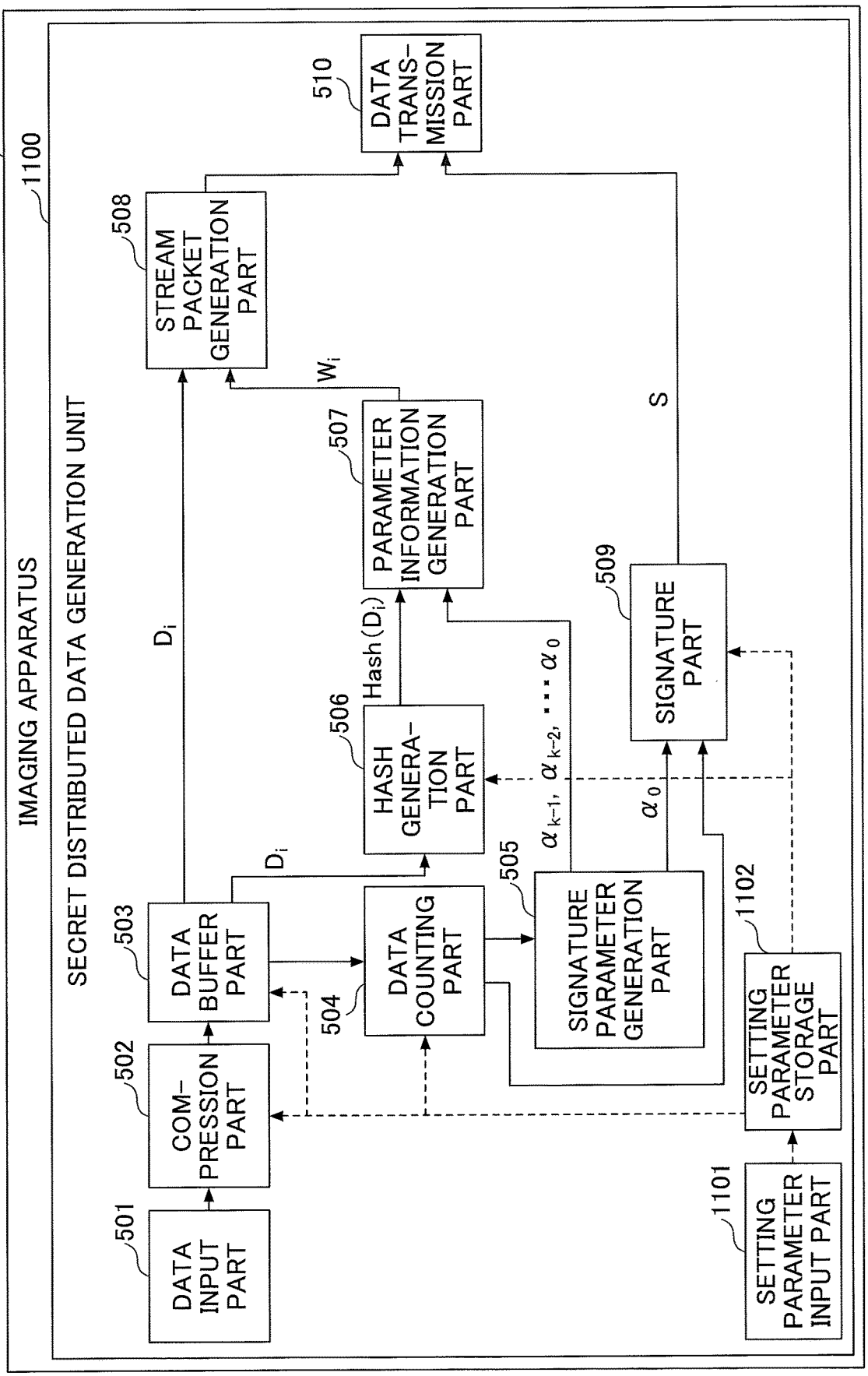
FIG. 11 is a schematic diagram illustrating a functional diagram of an imaging apparatus according to the second embodiment of the present invention.

FIG. 11 is a schematic diagram illustrating a functional diagram of the imaging apparatus 110 according to the second embodiment of the present invention. Among the components of the functional configuration of the imaging apparatus 110 of FIG. 11, like components and parts are denoted with like reference numerals as the reference numerals of the components of the functional configuration of the imaging apparatus 110 of FIG. 5 and are not further explained.

The difference between the imaging apparatus 110 of FIG. 11 and the imaging apparatus 110 of FIG. 5 is that the imaging apparatus 110 of FIG. 11 includes a secret distributed data generation unit 1100 including a setting parameter input part 1101 and a setting parameter storage part 1102.

The setting parameter input part 1101 is an example of a setting unit. The setting parameter input part 1101 receives input of a setting parameter. The setting parameter is a parameter that regulates a condition(s) for enabling each component of the secret distributed data generation unit 1100 to operate. Each of the compression part 502, the data buffer part 503, the data counting part 504, the hash generation part 506, the stream packet generation part 508, and the signature part 509 operates according to a setting parameter input to the setting parameter input part 1101.

The setting parameter storage part 1102 stores the setting parameter input to the setting parameter input part 1101 as setting parameter information.

FIG. 12 is a schematic diagram illustrating an example of the setting parameter information stored in the setting parameter storage part 1102. According to the example illustrated in FIG. 12, setting parameter information 1200 includes information items such as "setting parameter type" and "setting content".

Information pertaining to the type of the setting parameter is stored in the information item "setting parameter type". In the example of the setting parameter information 1200 illustrated in FIG. 12, the information item "setting parameter type" includes "buffering information", "stream packet generation information", "compression type information", "hash information", "signature information", and "threshold information".

Information pertaining to the setting parameter is stored in the information item "setting content" in correspondence with the type of setting parameter. According to the example of the setting parameter information 1200 illustrated in FIG. 12, "information pertaining to protocol" (e.g., RTP (Real-time Transport Protocol), UDP (User Datagram Protocol)) is stored in correspondence with the "stream packet generation information". Further, "information pertaining to compression type" (e.g., H.264, MPEG (Moving Pictures Experts Group)) is stored in correspondence with the "compression type information". Further, "information pertaining to hash algorithm" (SHA (Secure Hash Algorithm) 1, SHA 256) is stored in correspondence with "hash information".

Further, "information pertaining to signature algorithm" (e.g., RSA (Rivest Shamir Adleman) algorithm, ElGamal algorithm) is stored in correspondence with the "signature information". Further, "information pertaining to threshold" (e.g., n, k) is stored in correspondence with the "threshold information".

Each part of the secret distributed data generation unit 1100 identifies a corresponding "setting parameter type", reads out the "setting content" corresponding to the identified "setting parameter type", and operates according to the "setting content".

Hence, according to the data recording system of the second embodiment, each part of the secret distributed data generation unit 1100 can operate based on the setting parameter input from an external device or the like.

Third Embodiment

The imaging apparatus 110 of the first and second embodiments forms the secret distributed data $(D_i, W_i)$ into packets and transmits the packets, by way of streaming transmission via a network, to the server apparatus 120 provided outside of the imaging apparatus 110. However, the secret distributed data do not necessarily need to be transmitted, by way of streaming transmission via a network, to the server apparatus 120 provided outside of the imaging apparatus 110. Alternatively, an auxiliary storage device may be provided inside of the imaging apparatus 110, so that the secret distributed data is stored in the auxiliary storage device. Next, the third embodiment of the present invention is described mainly on the differences with respect to the first embodiment.

<1. Hardware Configuration of Imaging Apparatus>

FIG. 13 is a schematic diagram illustrating a hardware configuration of an imaging apparatus 1300 according to the third embodiment of the present invention. The difference between the hardware configuration of the imaging apparatus 110 of FIG. 4A and the imaging apparatus 1300 of the third embodiment of FIG. 13 is that an auxiliary storage device 1301 is included in the imaging apparatus 1300 of the third embodiment of FIG. 13. The auxiliary storage device 1301 is an example of a storage unit. The auxiliary storage device 1301 has a storage capacity capable of storing the secret distributed data of a predetermined period of time and the signature value of the predetermined period of time. Further, the data stored in the auxiliary storage device 1301 can be read out from outside of the imaging apparatus 1300 via the I/F 405. Note that the auxiliary storage device 1301 may be a removable recording medium such as a SD (Secure Digital) card.

<2. Functional Configuration of Imaging Apparatus>

Figure 14:
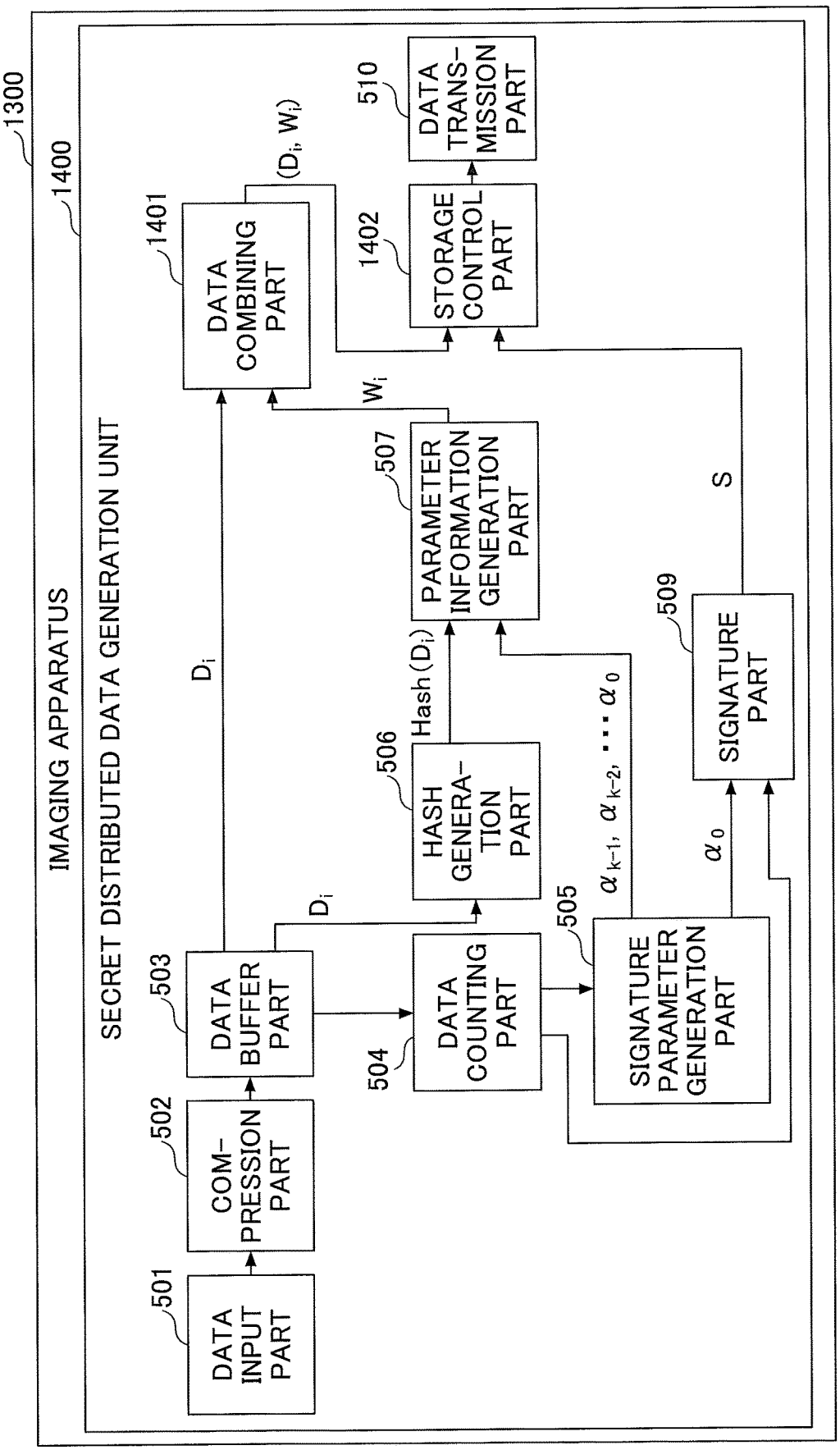
FIG. 14 is a schematic diagram illustrating a functional configuration of an imaging apparatus according to the third embodiment of the present invention.

FIG. 14 is a schematic diagram illustrating a functional configuration of the imaging apparatus 1300 according to the third embodiment of the present invention. The difference between the imaging apparatus 1300 of FIG. 13 and the imaging apparatus 110 of FIG. 5 is that imaging apparatus 1300 of FIG. 13 includes a secret distributed data generation unit 1400 including a data combining part 1401 (instead of the stream packet generation part 508) and a storage control part 1402.

The data combining part 1401 is an example of an output unit. The data combining part 1401 obtains secret distributed data $(D_i, W_i)$ by associating a data unit $(D_i)$ to parameter information $(W_i)$ and outputs the obtained secret distributed data to the storage control part 1402. The storage control part 1402 stores the secret distributed data $(D_i, W_i)$ output from the data combining part 1401 and the signature value (S) output from the signature part 509 in the auxiliary storage device 1301. Further, in a case where the storage control part 1402 receives a request for reading out data from the outside of the imaging apparatus 1300 via the data transmission part 510, the storage control part 1402 reads out the secret distributed data $(D_i, W_i)$ and the signature value (S) stored in the auxiliary storage device 1301. Further, the data transmission part 510 outputs the secret distributed data $(D_i, W_i)$ and the signature value (S) read out by the storage control part 1402 to the outside of the imaging apparatus 1300.

<3. Applied Example>

Figure 15:
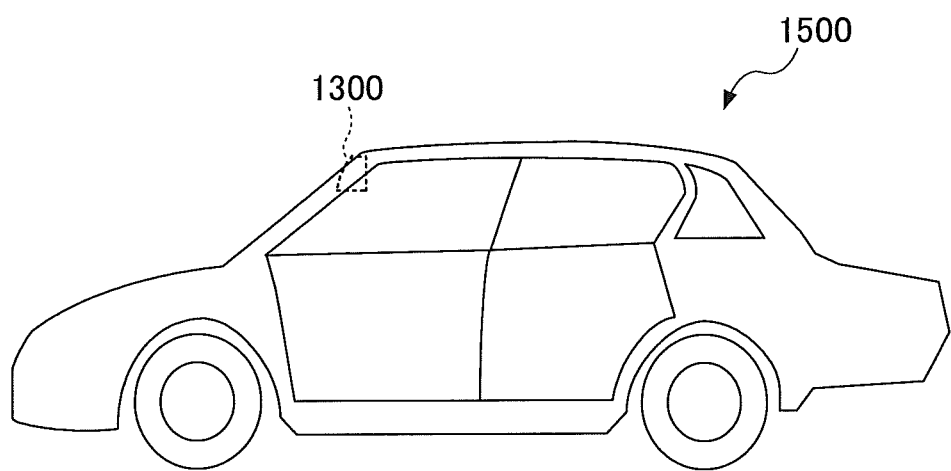
FIG. 15 is a schematic diagram illustrating an applied example of an imaging apparatus according to the third embodiment of the present invention.

FIG. 15 is a schematic diagram illustrating an applied example of the imaging apparatus 1300 of the third embodiment. In the applied example of FIG. 15, the imaging apparatus 1300 is a drive recorder placed inside of a vehicle 1500. In FIG. 15, the imaging apparatus 1300 records the generated secret distributed data and the signature value to the auxiliary storage device 1301 provided inside the imaging apparatus 1300. Thereby, in a case where the vehicle 150 is in an accident or the like, the secret distributed data and the signature value during the occurrence of the accident can be extracted from the auxiliary storage device 1301, so that signature verification can be performed on the secret distributed data. Further, even in a case where a part of the extracted secret distributed data is missing, the authenticity of the secret distributed data can be guaranteed.

According to the third embodiment, the auxiliary storage device 1301 is provided inside of the imaging apparatus 110. Alternatively, the auxiliary storage device 1301 may be attached to the outside of the imaging apparatus 110, and the secret distributed data $(D_i, W_i)$ may be stored in the externally attached auxiliary storage device 1301.

Fourth Embodiment

According to the first to third embodiments, the secret distributed data generation unit is configured to associate a single parameter information $(W_i)$ to a single data unit $(D_i)$. However, it preferable that a data unit having higher importance than other data units $(D_i)$ to be more tolerant against data loss. Therefore, according to the fourth embodiment, the number of parameter information $(W_i)$ to be associated to the data unit $(D_i)$ is changed according to the importance of the data unit $(D_i)$. That is, more parameter information $(W_i)$ are associated the higher the importance of the data unit $(D_i)$ becomes. Thereby, tolerance against data loss can be improved. Next, the fourth embodiment of the present invention is described mainly on the differences with respect to the first embodiment.

<1. Functional Configuration of Imaging Apparatus>

Figure 16:
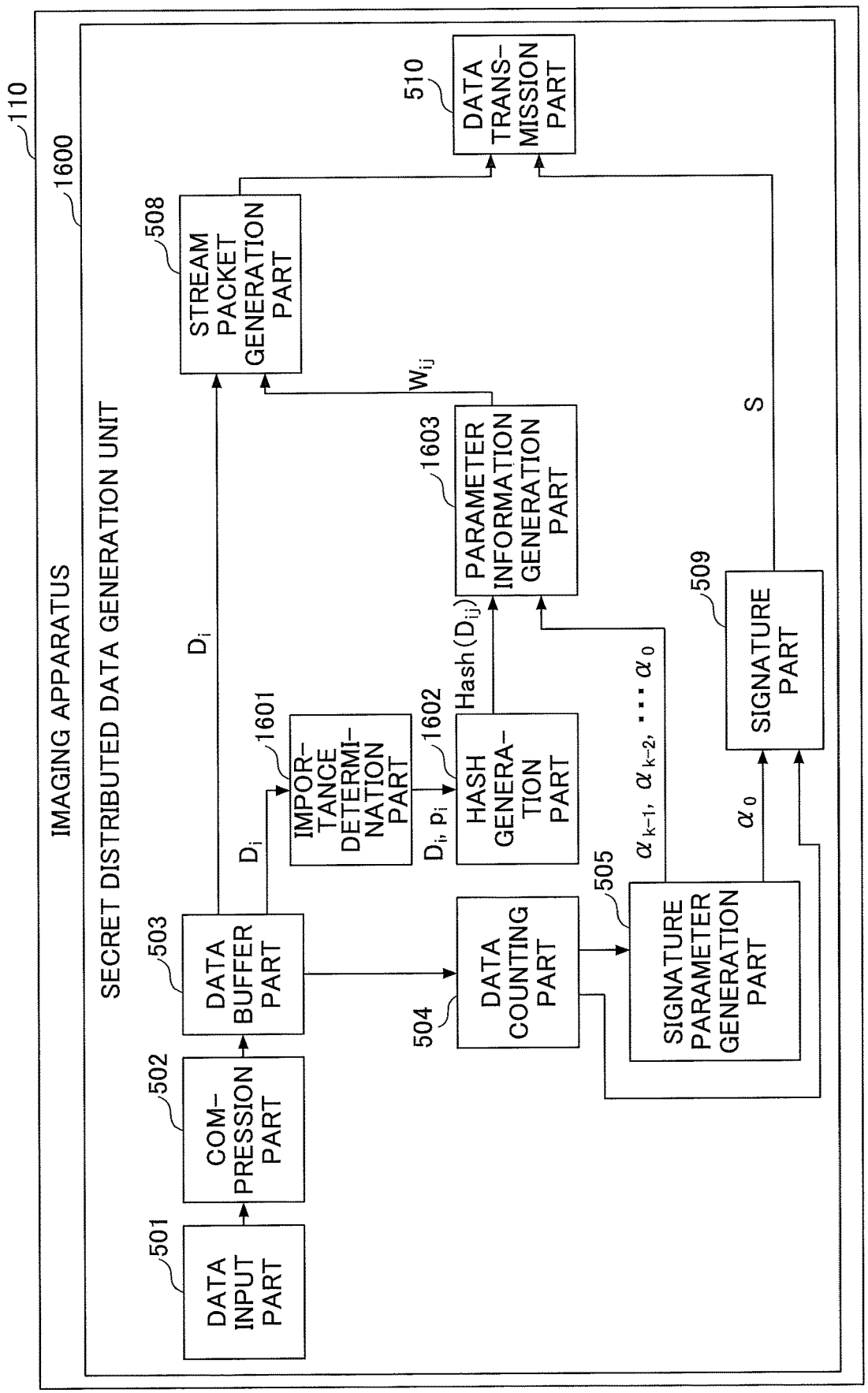
FIG. 16 is a schematic diagram illustrating a functional configuration of an imaging apparatus according to the fourth embodiment of the present invention.

FIG. 16 is a schematic diagram illustrating a functional configuration of the imaging apparatus according to the fourth embodiment of the present invention. Among the components of the functional configuration of the imaging apparatus 110 of FIG. 16, like components and parts are denoted with like reference numerals as the reference numerals of the components of the functional configuration of the imaging apparatus 110 of FIG. 5 and are not further explained.

The difference between the imaging apparatus 110 of FIG. 16 and the imaging apparatus 110 of FIG. 5 is that the imaging apparatus 110 of FIG. 16 includes a secret distributed data generation unit 1600 including an importance determination part 1601. Further, the functions of a hash generation part 1602 and a parameter information generation part 1603 are different from the functions of the hash generation part 506 and the parameter information generation part 507 of FIG. 5.

The importance determination part 1601 is an example of a determination unit. The importance determination part 1601 determines the importance of a data unit ($D_i$). In the fourth embodiment, the importance of a data unit ($D_i$) is indicated as "$p_i$". The importance determination part 1601 sequentially obtains data units ($D_i$) from the data units stored in the data buffer part 503 and determines the importance of each of the obtained data units ($D_i$). Then, the importance determination part 1601 reports the obtained data units ($D_i$) along with their determined importance ($p_i$) to the hash generation part 1602.

The hash generation part 1602 calculates the hash values of the data units ($D_i$) reported from the importance determination part 1601 based on the following formula.

[Formula 5]

$$\text{Hash}(D_{ij}) = \text{Hash}(D_i)^j \quad \text{(Formula 5)}$$

It is, however, to be noted that "j"=1~$p_i$. The hash generation part 1602 reports the calculated hash value (Hash ($D_{ij}$)) to the parameter information generation part 1603.

The parameter information generation part 1603 obtains the hash value (Hash ($D_{ij}$)) calculated by the hash generation part 1602 and the parameters ($\alpha_{k-1}, \alpha_{k-2}, \ldots \alpha_0$) obtained by the signature parameter generation part 505. Further, the parameter information generation part 1603 calculates the parameter information ($W_{i\_j}$) based on the obtained hash value and the parameters by using the following formula.

[Formula 6]

$$W_{i\_j} = \Sigma_{(t=0 \sim k-1)} \alpha_t \text{Hash}(D_{ij})^t \quad \text{(Formula 6)}$$

Figure 17:
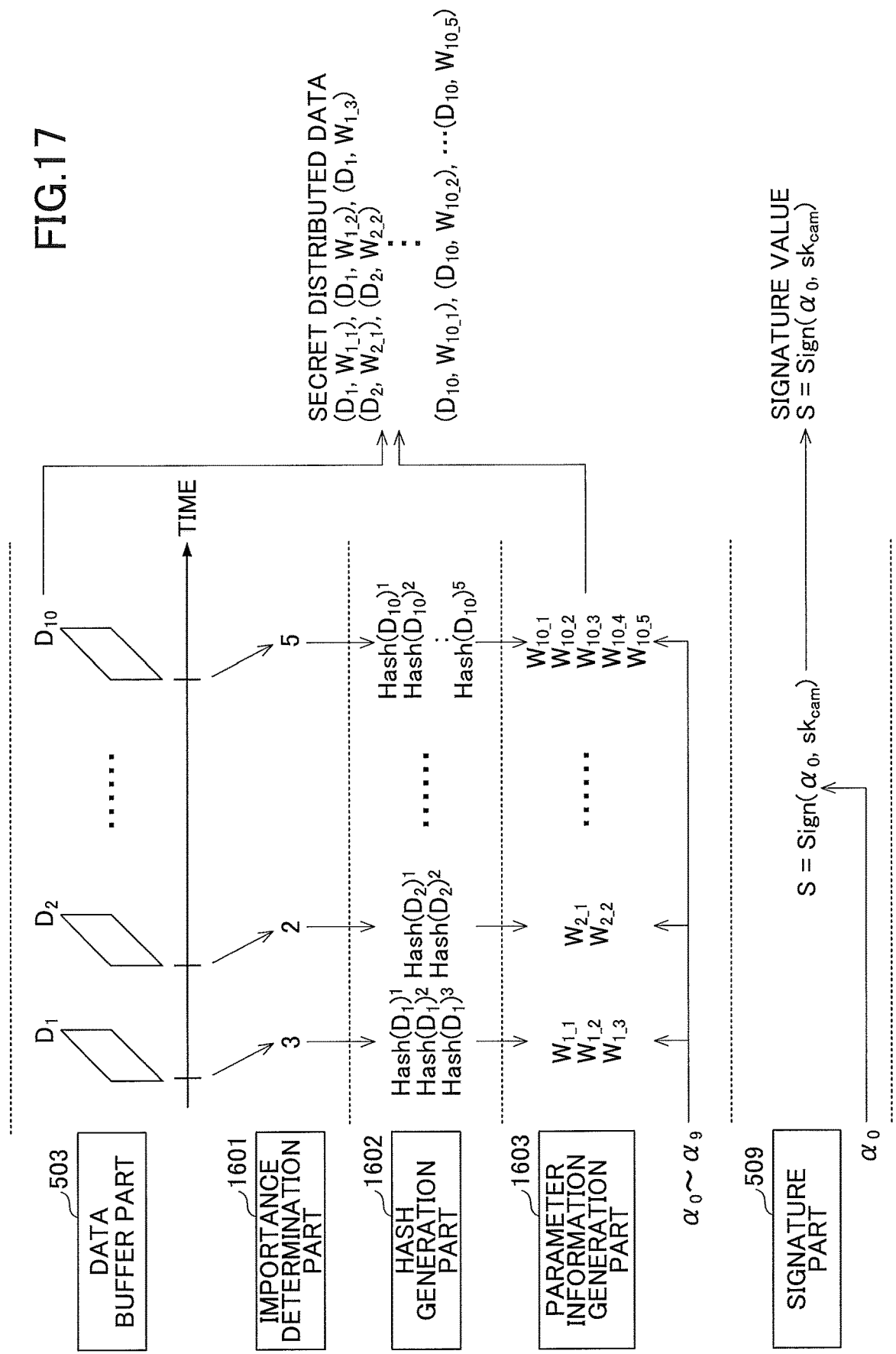
FIG. 17 is a schematic diagram illustrating the operations (actions) of each part included in an imaging apparatus 110 according to the fourth embodiment of the present invention.

FIG. 17 is a schematic diagram illustrating the operations (actions) of the data buffer part 503, the importance determination part 1601, the hash generation part 1602, the parameter information generation part 1603, and the signature part 509 included in the imaging apparatus 110 of the fourth embodiment. In the example illustrated in FIG. 17, the predetermined number "n" is 10.

As illustrated in FIG. 17, the importance determination part 1601 determines the importance ($p_1$) of the data unit ($D_1$) when the importance determination part 1601 obtains the data unit ($D_1$) stored in the data buffer part 503. In this example, the value of the importance ($p_1$) of the data unit ($D_1$) is determined to be 3 ($p_1$=3).

The hash generation part 1602 calculates the hash value (Hash ($D_{ij}$)) when the hash generation part 1602 obtains the data unit ($D_1$) and the corresponding importance ($p_1$) from the importance determination part 1601. In a case where the importance is $p_1$=3, the hash generation part 1602 calculates hash values Hash $(D_1)^1$, Hash $(D_1)^2$, and Hash $(D_1)^3$.

The parameter information generation part 1603 calculates the parameter information based on the hash values Hash $(D_1)^1$, Hash $(D_1)^2$, and Hash $(D_1)^3$ calculated by the hash generation part 1602 and the parameters ($\alpha_9, \alpha_8, \ldots \alpha_0$).

More specifically, the parameter information generation part 1603 calculates parameter information $W_{1\_1}$, $W_{1\_2}$, and $W_{1\_3}$.

Similarly, the parameter information ($W_{2\_1}, W_{2\_2}, \ldots W_{10\_1}, \ldots W_{10\_5}$) are output by the parameter information generation part 1603 by performing each of the aforementioned processes of FIG. 17 on the other data units ($D_2, D_3, \ldots D_{10}$) stored in the data buffer part 503.

The stream packet generation part 508 associates the data units ($D_1, D_2, \ldots D_{10}$) stored in the data buffer part 503 to the parameter information ($W_{2\_1}, W_{2\_2}, \ldots W_{10\_5}$) output from the parameter information generation part 507. Thereby, the stream packet generation part 508 obtains secret distributed data (($D_1, W_{1\_1}$) ($D_1, W_{1\_2}$), ... ($D_{10}, W_{10\_5}$)).

According to the fourth embodiment, more secret distributed data are generated the higher the importance of the data unit ($D_i$) becomes. As a result, tolerance against data loss is improved as the importance of the data unit becomes higher.

<2. Processes of Secret Distributed Data Generation Part>

Figure 18:
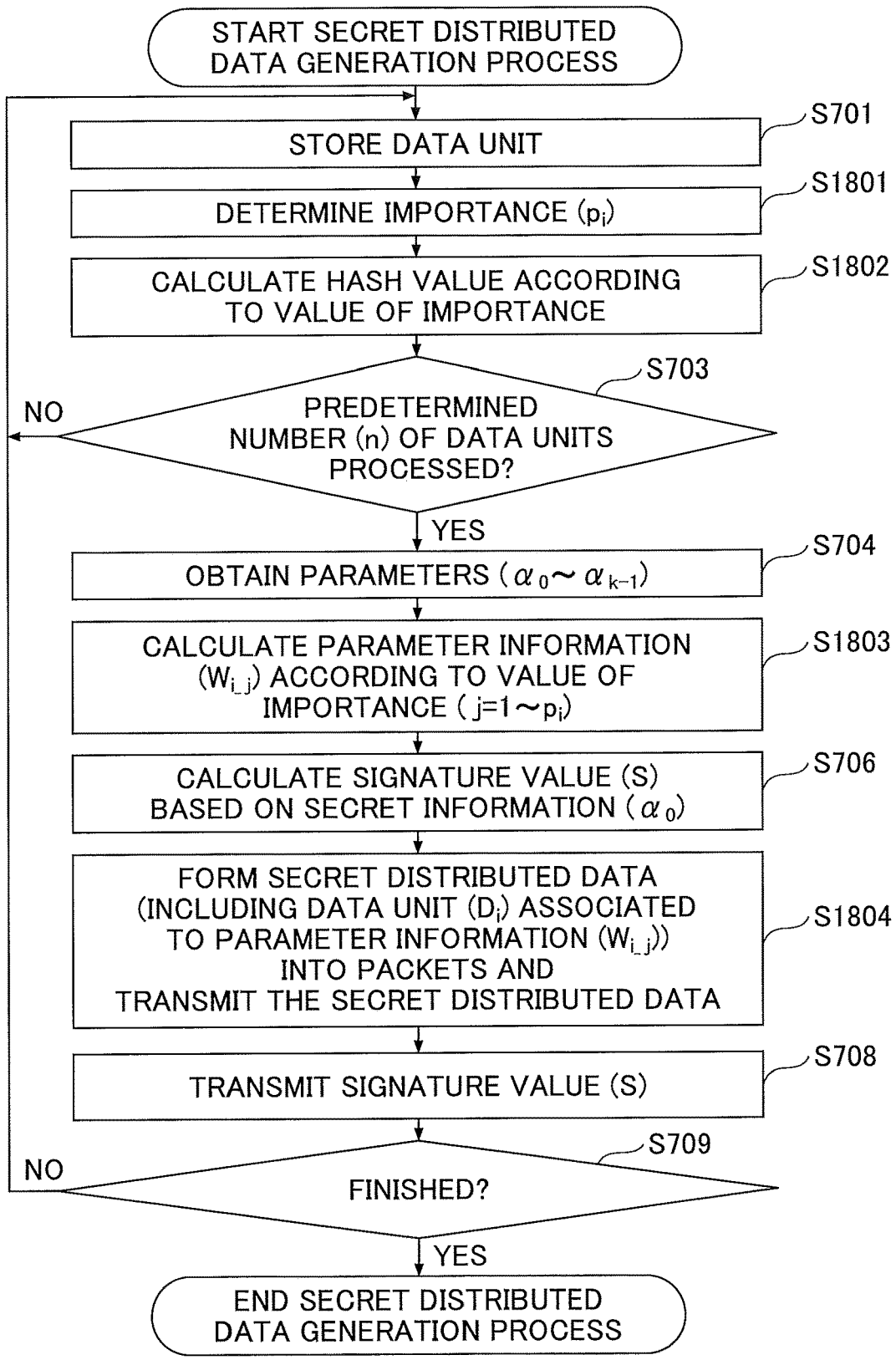
FIG. 18 is a flowchart illustrating the flow of a secret distributed data generation process according to the fourth embodiment of the present invention.

Next, the flow of the secret distributed data generation process by the secret distributed data generation part 1600 is described. FIG. 18 is a flowchart illustrating the flow of the secret distributed data generation process according to the fourth embodiment of the present invention. Next, the secret distributed data generation process of FIG. 18 is described mainly on the differences with respect to the secret distributed data generation process of FIG. 7. The differences with respect to the secret distributed data generation process of FIG. 7 are the below-described processes of Steps S1801 to S1804.

In Step S1801, the importance determination part 1601 determines the importance ($p_i$) of the data unit ($D_i$). In Step S1802, the hash generation part 1602 calculates the hash value (Hash ($D_{ij}$)) according to the value of the determined importance.

In Step S1803, the parameter information generation part 1603 calculates the parameter information ($W_{i\_j}$) according to the value of the determined importance. In Step S1804, the stream packet generation part 508 obtains the secret distributed data by associating the data unit ($D_i$) stored in the data buffer part 503 to the parameter information ($W_{i\_j}$) output by the parameter information generation part 1603. Further, the stream packet generation part 508 forms the obtained secret distributed data into packets and outputs the packets. Further, the data transmission part 510 transmits, by way of streaming transmission via a network, the secret distributed data output from the stream packet generation part 508 to the server apparatus 120.

<3. Processes of Data Verification Unit>

Figure 19:
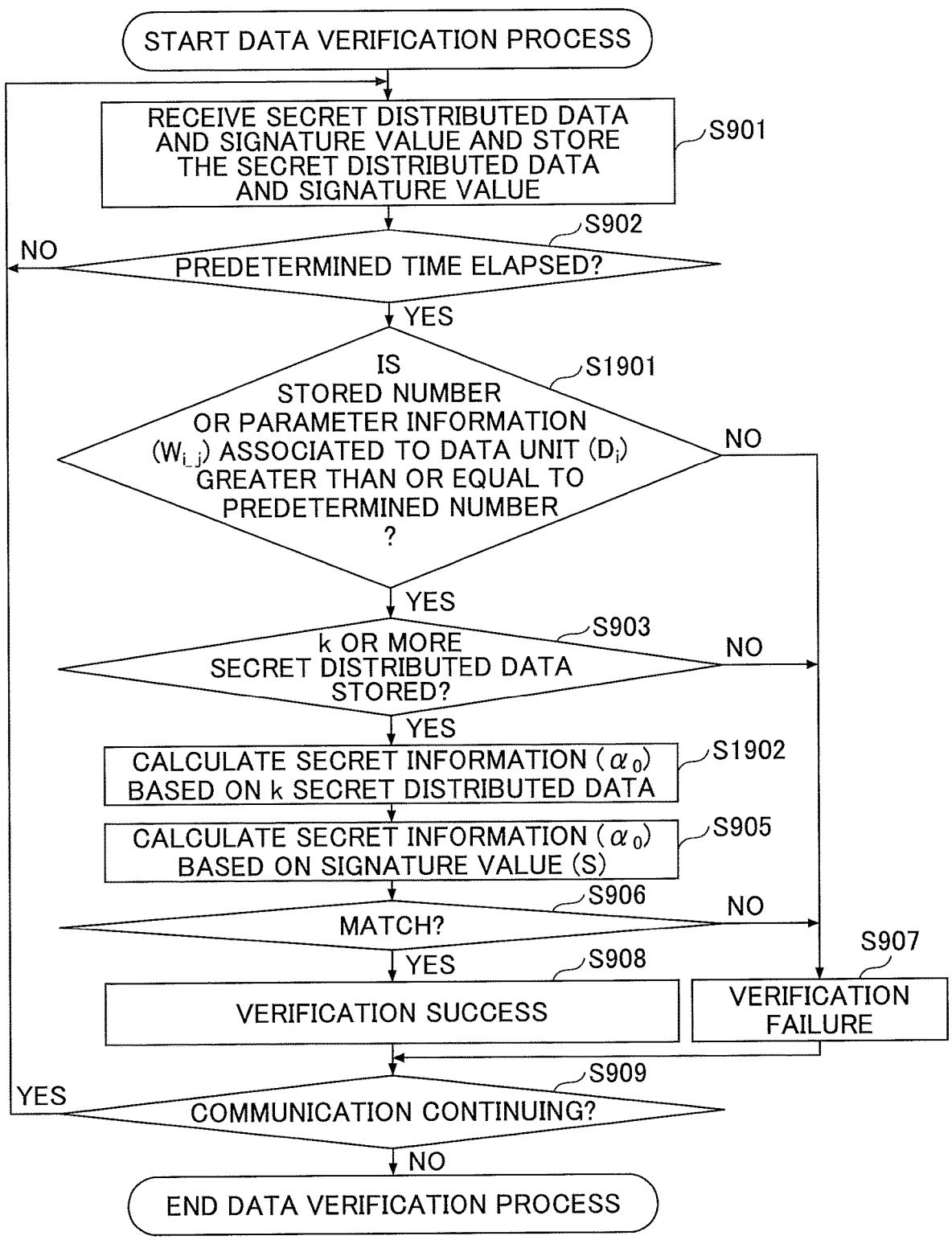
FIG. 19 is a flowchart illustrating the flow of a data verification process according to the fourth embodiment of the present invention.

Next, the flow of the data verification process of the data verification unit 121 of the server apparatus 120 of the fourth embodiment is described. FIG. 19 is a flowchart illustrating the flow of the data verification process according to the fourth embodiment of the present invention. Note that the data verification process of FIG. 19 is described mainly on the differences with respect to the data verification process of FIG. 9. The differences with respect to the verification process of FIG. 9 are the below-described processes of Steps S1901 and S1902.

In Step S1901, the signature value calculation part 803 determines whether the parameter information ($W_{i\_j}$) associated to the data unit ($D_i$) is stored in the data storage part 122 in a number greater than or equal to a predetermined number.

In a case where the number of the parameter information ($W_{i\_j}$) stored in the data storage part 122 is less than the predetermined number (No in Step S1901), the signature value calculation part 803 determines that signature verification has failed. Thereby, the data verification process proceeds to Step S907.

On the other hand, in a case where the number of the parameter information ($W_{i\_j}$) stored in the data storage part 122 is greater than or equal to the predetermined number (Yes in Step S1901), the data verification process proceeds to Step S903.

In Step S1902, the signature value calculation part 803 reads out k secret distributed data from the data storage part 122 and calculates the secret information ($\alpha_0$) by using the following formula.

[Formula 7]

$$\alpha_0 = \Sigma_{(p=1-k)} W_{i\_jp} \Pi_{(0 \leq q \leq k, q \neq p)} \text{Hash}(D_{ijq})/(\text{Hash}(D_{ijq}) - \text{Hash}(D_{ijp})) \quad \text{(Formula 7)}$$

Hence, according to the server apparatus 120 of the fourth embodiment, not only can the number of secret distributed data be used for determining the success of the signature verification but also the number of the parameter information ($W_{i\_j}$) associated to each data unit ($D_i$) can also be used for determining the success of the signature verification.

<4. Applied Example>

Figure 20A:
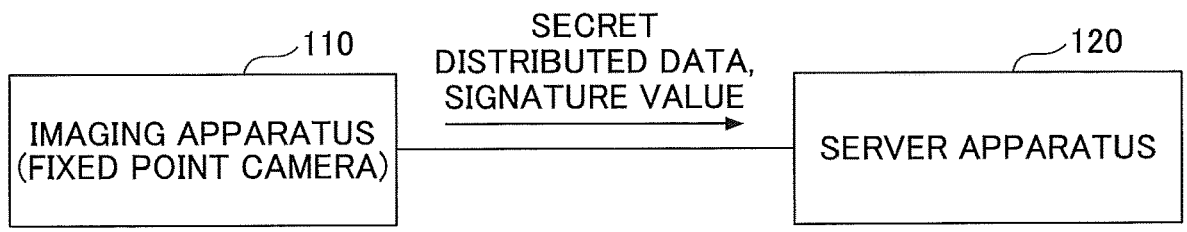
FIGS. 20A to 20C are schematic diagrams illustrating applied examples of a data recording system according to an embodiment of the present invention.
Figure 20B:
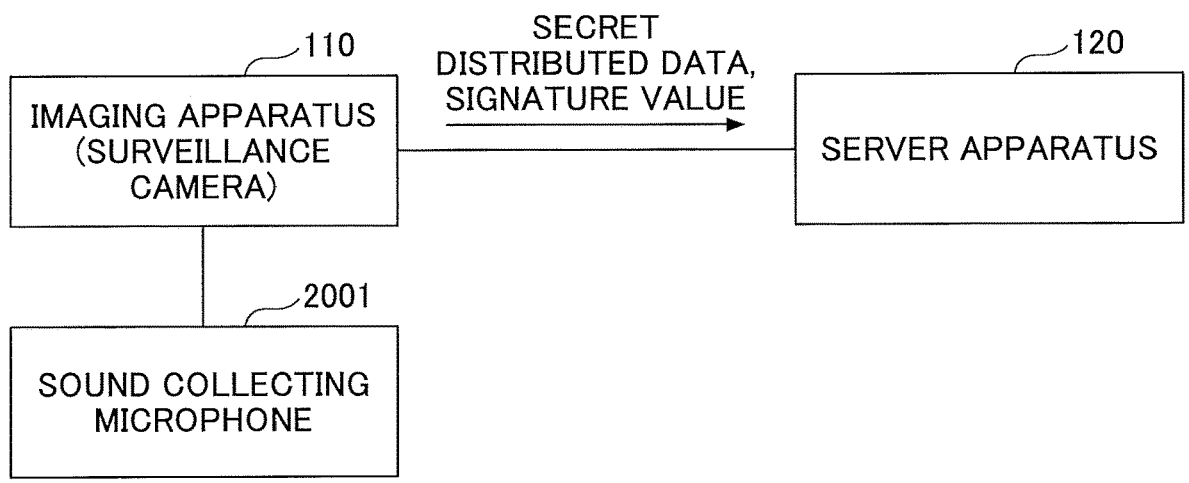
Figure 20C:
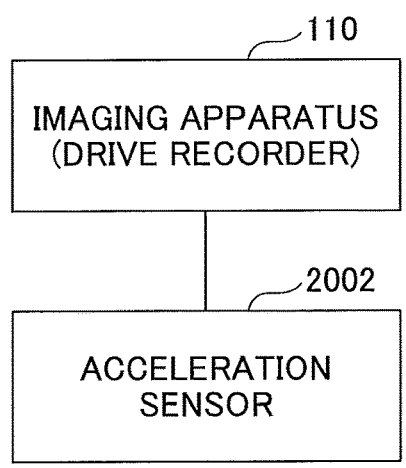

Next, applied examples of the data recording system 100 of the fourth embodiment are described. FIGS. 20A to 20C are schematic diagrams illustrating the applied examples of the data recording system 100. FIG. 20A illustrates a case where the imaging apparatus 110 is used as a fixed-point camera. In the case where the imaging apparatus 110 is used as a fixed-point camera, the importance determination part 1601 determines the importance of the data unit ($D_i$) depending on whether a specific object (e.g., a person or a vehicle) is detected from the data unit ($D_i$). Alternatively, the importance determination part 1601 may calculate the difference between the data unit ($D_i$) and a background image and determine the importance of the data unit ($D_i$) depending on the amount of the difference. Alternatively, the importance determination part 1601 may determine the importance of the data unit ($D_i$) depending on whether a moving object is detected from the data unit ($D_i$).

FIG. 20B illustrates a case where the imaging apparatus 110 is attached with a sound collecting microphone 2001 and used as a surveillance camera. In the case where the imaging apparatus 110 is attached with a sound collecting microphone 2001, the importance determination part 1601 determines the importance of the data unit depending on the sound detected by the sound collecting microphone 2001.

FIG. 20C illustrates a case where the imaging apparatus 110 is attached with an acceleration sensor 2002 and used as a drive recorder. In the case where the imaging apparatus 110 is attached with the acceleration sensor 2002, the importance determination part 1601 determines the importance of the data unit depending on whether an abnormal vibration or shock is detected by the acceleration sensor 2002.

According to the data recording system of the fourth embodiment, the tolerance against data loss can be improved with respect to a data unit having high importance.

Fifth Embodiment

According to the above-described fourth embodiment, the importance of each data unit ($D_i$) is determined, so that the tolerance against data loss improves as the importance of the data unit becomes higher. According to the fifth embodiment, secret distributed data and a signature value for a data item having high importance are generated separate from the other data items. Thereby, the secret distributed data and the signature value that are generated based on the data item having high importance can be received separately from the secret distributed data and the signature values that are generated based on the other data items. As a result, signature verification can be efficiently performed on the secret distributed data that is generated based on the data item having high importance. Next, the fifth embodiment of the present invention is described mainly on the differences with respect to the fourth embodiment.

Figure 21:
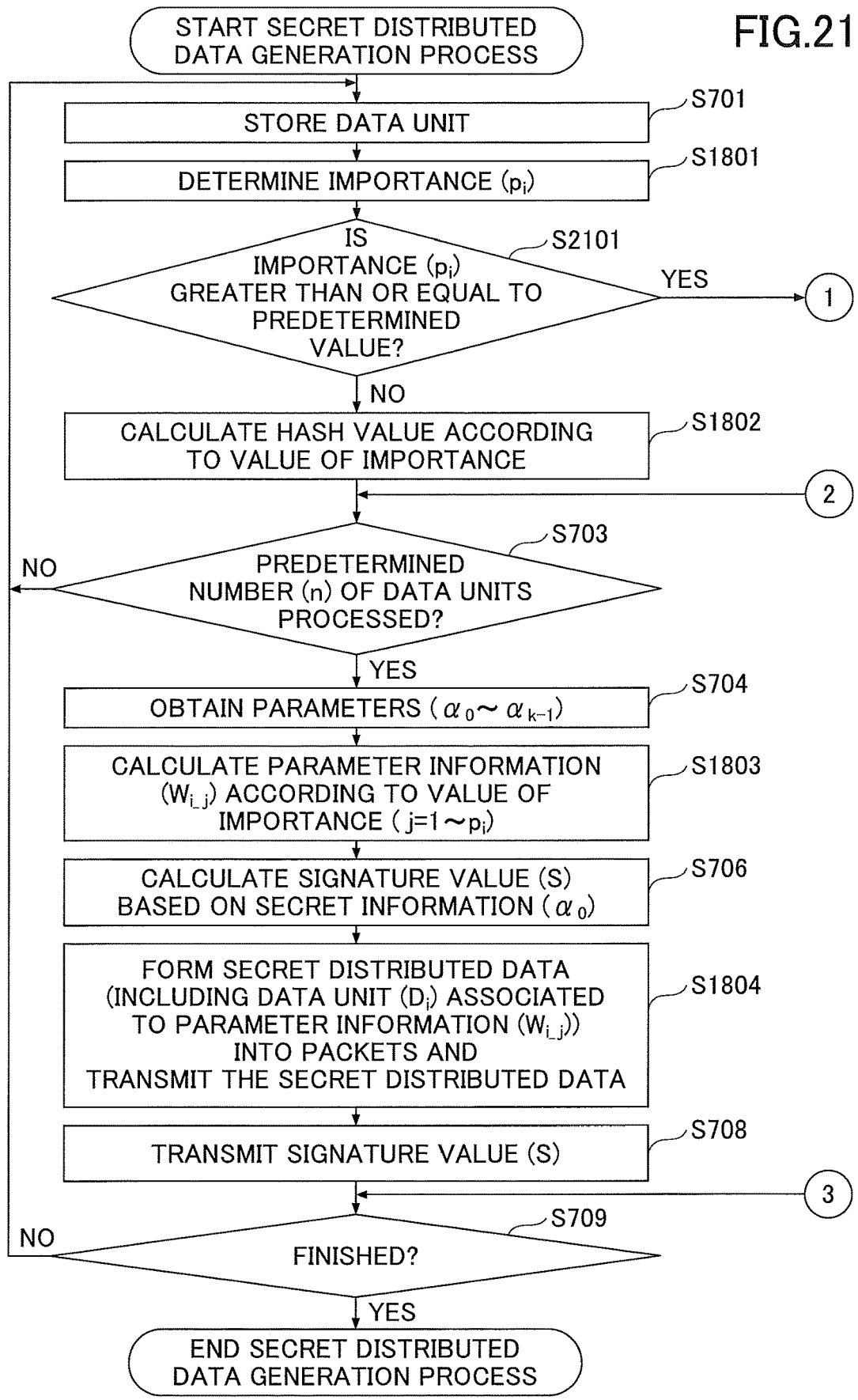
FIG. 21 is a flowchart illustrating the flow of a secret distributed data generation process according to the fifth embodiment of the present invention.

FIGS. 21 and 22 are flowcharts illustrating the flow of the secret distributed data generation process according to the fifth embodiment of the present invention. Note that the flowchart of the secret distributed data generation process illustrated in FIG. 21 is the same as the flowchart illustrated in FIG. 18 except for the process of Step S2101. Therefore, the description of the processes of FIG. 21 is omitted except for Step S2101.

In Step S2101, the hash generation unit 1602 determines whether the importance ($p_i$) determined by the importance determination part 1601 is greater than or equal to a predetermined value. In a case where the importance ($p_i$) is less than the predetermined value, the secret distributed data generation process of the fifth embodiment proceeds to Step S1802.

Figure 22A:
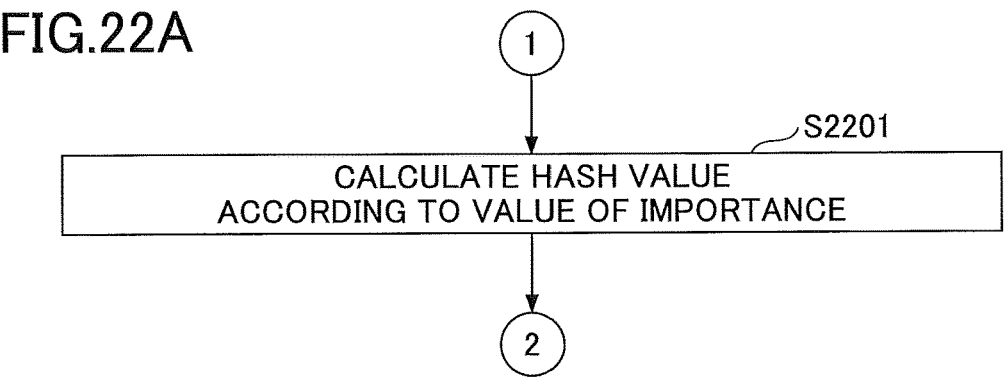
FIGS. 22A and 22B are flowcharts illustrating the flow of the secret distributed data generation process according to the fifth embodiment of the present invention.
Figure 22B:
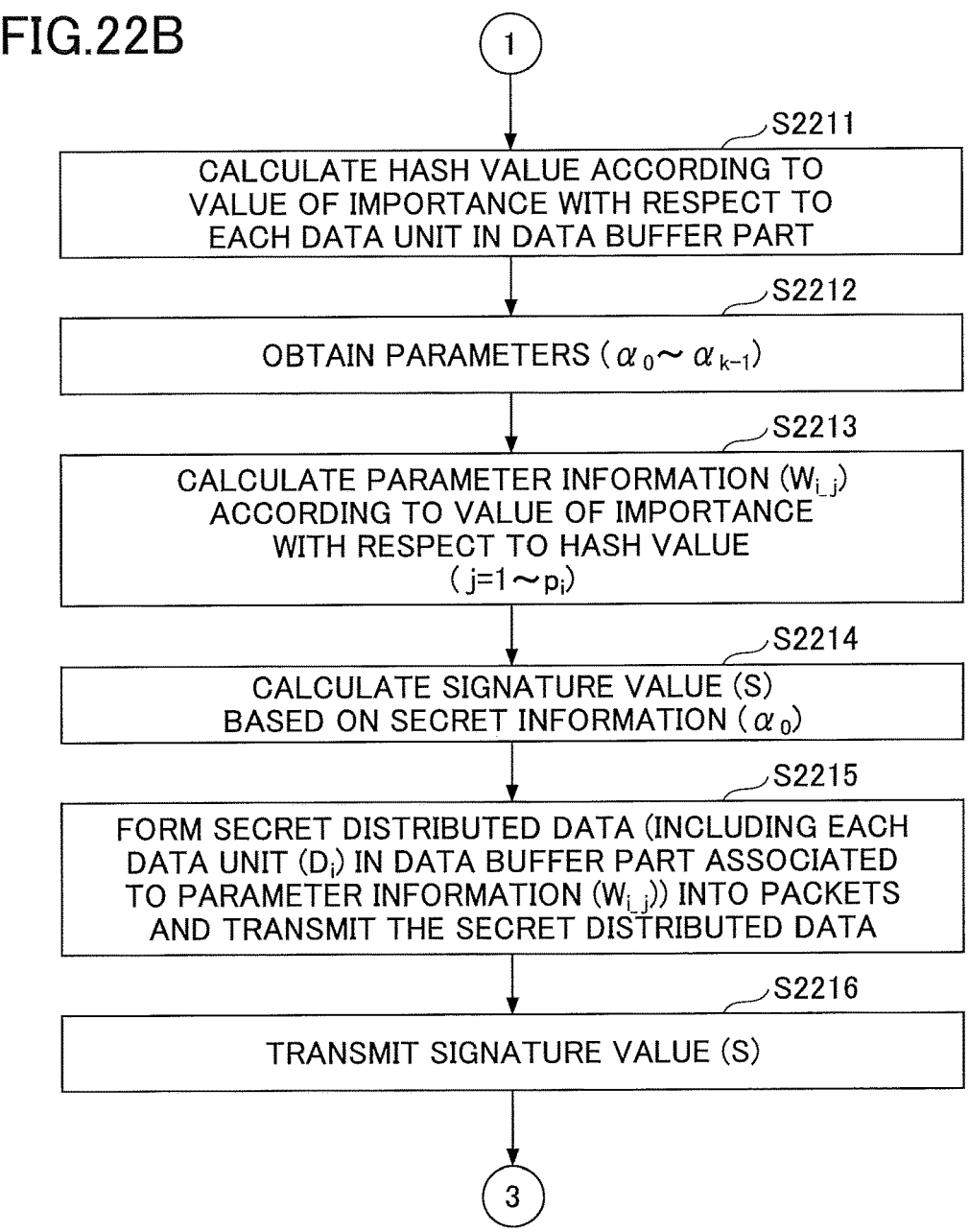

On the other hand, in a case where the importance ($p_i$) is greater than or equal to the predetermined value, the secret distributed data generation process of the fifth embodiment proceeds to the processes illustrated in FIGS. 22A and 22B.

As illustrated in FIGS. 22A and 22B, the secret distributed data generation process of the fifth embodiment performs two processes in parallel in the case where the importance ($p_i$) is greater than or equal to the predetermined value. The first process is the same as the process performed when the importance ($p_i$) is determined to be greater than or equal to the predetermined value. That is, hash values are calculated according to the value of the importance in Step S22A. After the calculation of the hash values, the secret distributed data generation process of the fifth embodiment returns to Step S703 of FIG. 21.

In the second process, secret distributed data are generated separately from the secret distributed data generated for other data units stored in the data buffer part 503 when the importance is determined to be greater than or equal to the predetermined value.

More specifically, in Step S2211, the hash generation part 1602 calculates hash values according to the importance with respect to each data unit stored in the data buffer part 503.

In Step S2212, the signature parameter generation part 505 obtains parameters ($\alpha_{k-1}, \alpha_{k-2}, \ldots \alpha_0$). The signature parameter generation part 505 obtains the parameters by generating k random numbers (second random value) by using the random number generator. In Step S2213, the parameter information generation part 1603 calculates parameter information ($W_{i\_j}$) in a number corresponding to the value of importance with respect to each hash value calculated in Step S2211.

In Step S2214, the signature part 509 obtains the parameter ($\alpha_0$) obtained by the signature parameter generation part 505 in Step S2212. The obtained parameter ($\alpha_0$) serves as the secret information to which a signature is attached. Thereby, the signature part 509 calculates the signature value (S) based on the obtained secret information ($\alpha_0$) and outputs the calculated signature value (S).

In Step S2215, the stream packet generation part 508 obtains secret distributed data by associating the data unit ($D_i$) stored in the data buffer part 503 to the parameter information ($W_{i\_j}$) output by the parameter information generation part 1603. Further, the stream packet generation part 508 forms the obtained secret distributed data into packets and outputs the packets. Further, the data transmission part 510 transmits, by way of streaming transmission via a network, the secret distributed data output by the stream packet generation part 508.

In Step S2216, the data transmission part 510 transmits the signature value (S) output from the signature part 509 via the network. Then, the secret distributed data generation process of the fifth embodiment returns to Step S709 of FIG. 21.

Note that the destination of the secret distributed data and the signature value transmitted during Steps S2215 and S2216 are assumed to be different from the destination of the secret distributed data and the signature value transmitted during Step S1804 and S708. Alternatively, even in a case where the destination of the secret distributed data and the signature value transmitted during Steps S2215 and S2216 are the same as the destination of the secret distributed data and the signature value transmitted during Step S1804 and S708, the secret distributed data and the signature value transmitted during Steps S2215 and S2216 are to be received separate from the secret distributed data and the signature value transmitted during Step S1804 and S708 by the server apparatus 120.

According to the fifth embodiment, in a case where a data item is determined to have an importance greater than or equal to a predetermined value, the secret distributed data and the signature value for the data item having high importance are generated separately from the secret distributed data and the signature values for the other data items stored in the data buffer part 503.

Thereby, the secret distributed data and the signature value that are generated based on the data item having high importance can be distinguished from the secret distributed data and the signature values that are generated based on the other data items. As a result, signature verification can be efficiently performed on the secret distributed data that is generated based on the data unit having high importance.

Sixth Embodiment

According to the above-described fifth embodiment, in a case where a data item is determined to have an importance greater than or equal to a predetermined value, the secret distributed data and the signature value for the data item having high importance are generated separately from the secret distributed data and the signature values for the other data items stored in the data buffer part. According to the sixth embodiment, in a case where a data item is determined to have an importance greater than or equal to a predetermined value, the secret distributed data that is generated based on the data unit having high importance is transmitted multiple times by way of streaming transmission. Thus, according to the sixth embodiment, the possibility of data loss can be reduced for the secret distributed data that is generated based on the data unit having high importance.

Figure 23:
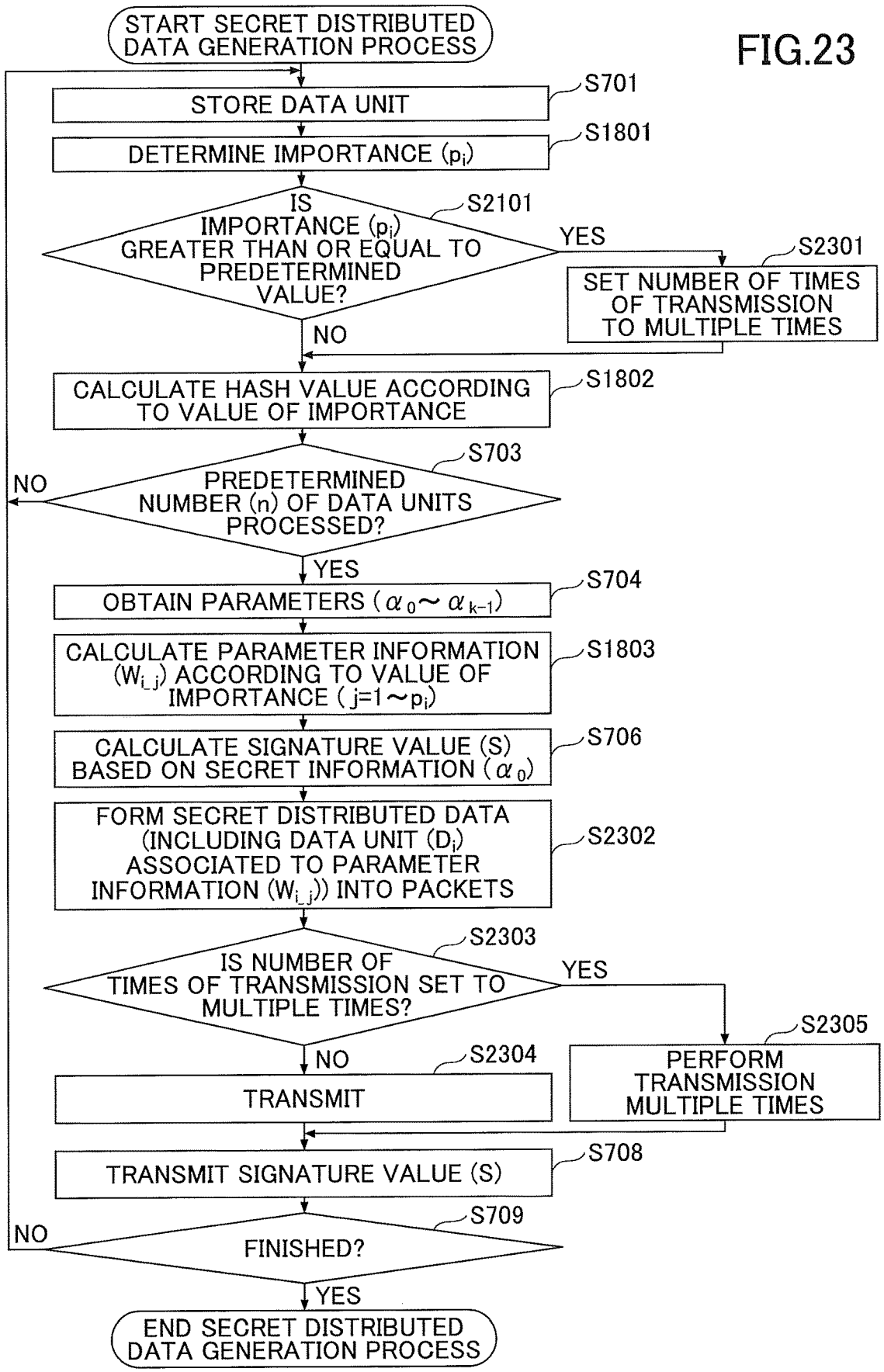
FIG. 23 is a flowchart illustrating a secret distributed data generation process according to the sixth embodiment of the present invention.

FIG. 23 is a flowchart illustrating a secret distributed data generation process according to the sixth embodiment of the present invention. The flowchart of FIG. 23 is different from the flowchart of FIG. 21 in that the secret distributed data generation process includes Step S2301 to S2305.

In Step S2101, the secret distributed data generation process of the sixth embodiment proceeds to Step S2301 when the importance ($p_i$) is determined to be greater than or equal to a predetermined value. In Step S2301, the stream packet generation part 508 sets the number times for transmitting the secret distributed data generated based on the data unit ($D_i$) determined to have an importance ($p_i$) greater than or equal to a predetermined value, so that the secret distributed data can be transmitted multiple times (e.g., two times).

In Step S2302, the stream packet generation part 508 obtains the secret distributed data by associating the data unit ($D_i$) stored in the data buffer part 503 to the parameter information ($W_{i\_j}$) output by the parameter information generation part 1603. Further, the stream packet generation part 508 forms the obtained secret distributed data into packets and outputs the packets.

In Step S2303, the data transmission part 510 determines whether the number of times of transmitting the secret distributed data output by the stream packet generation part 508 is set to a multiple number of times. In a case where the number of times of transmitting the secret distributed data is not set to multiple times, the secret distributed data generation process of the sixth embodiment proceeds to Step S2304. In Step S2304, the secret distributed data is transmitted to the server apparatus 120 by way of streaming transmission via a network. On the other hand, in a case where the number of times of transmitting the secret distributed data is set to multiple times, the secret distributed data generation process of the sixth embodiment proceeds to Step S2305.

In Step S2305, the data transmission part 510 transmits the secret distributed data to the server apparatus 120 by way of streaming transmission for a multiple number of times.

According to the sixth embodiment, in a case where a data item is determined to have an importance greater than or equal to a predetermined value, the secret distributed data that is generated based on the data unit having high importance is transmitted multiple times. Thus, according to the sixth embodiment, the possibility of data loss can be reduced for the secret distributed data that is generated based on the data unit having high importance.

Seventh Embodiment

According to the above-described sixth embodiment, in a case where a data item is determined to have an importance greater than or equal to a predetermined value, the secret distributed data that is generated based on the data unit having high importance is transmitted multiple times by way of streaming transmission. According to the seventh embodiment, in a case where a data item is determined to have an importance greater than or equal to a predetermined value, the secret distributed data that is generated based on the data unit having high importance is temporarily stored. Thus, according to the seventh embodiment, in a case where the server apparatus (transmission destination) 120 requests the imaging apparatus 110 to re-transmit the secret distributed data after performing streaming transmission of the secret distributed data, the imaging apparatus 110 can re-transmit the secret distributed data, and the possibility of data loss can be reduced for the secret distributed data.

Figure 24:
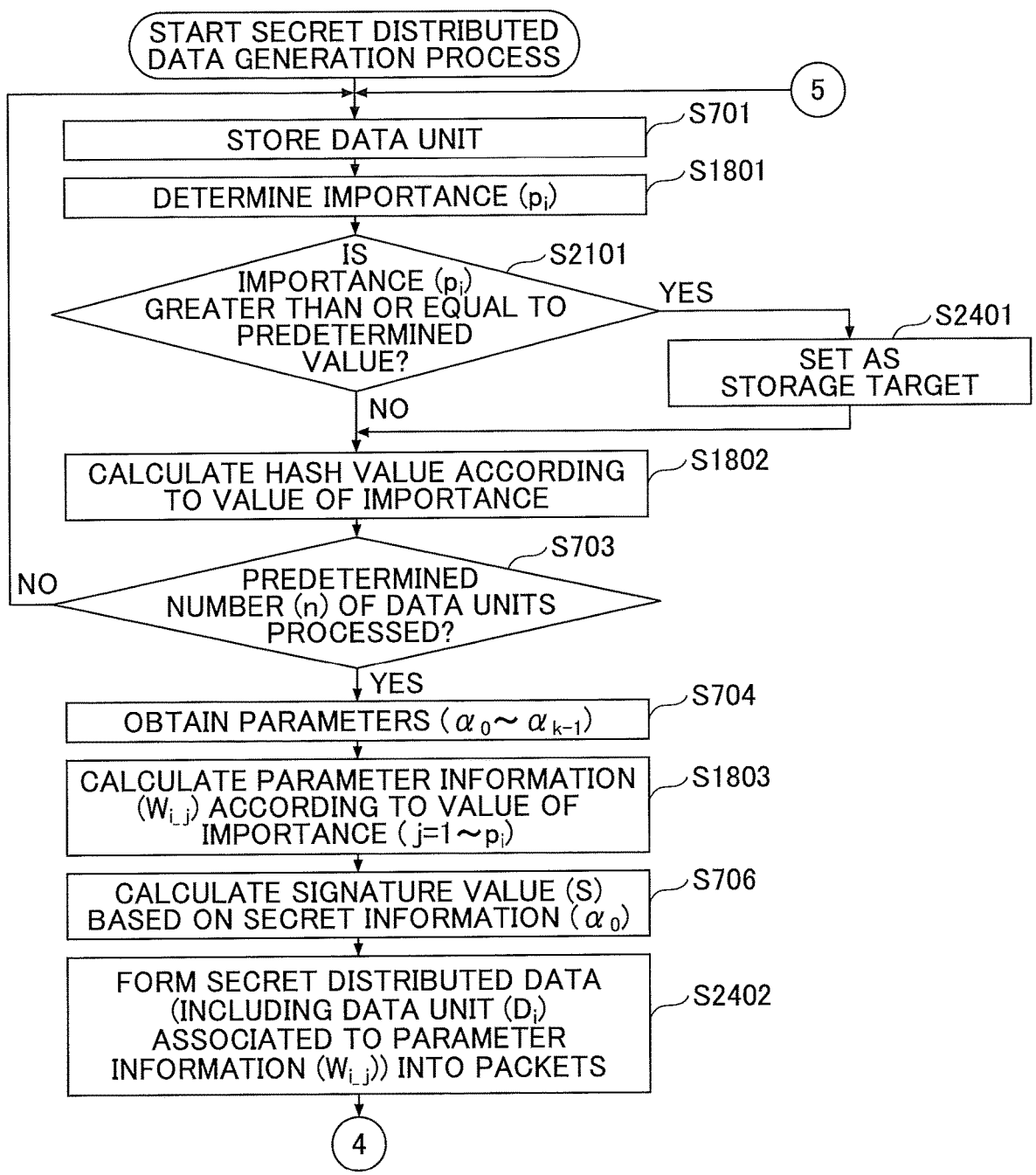
FIG. 24 is a flowchart illustrating a secret distributed data generation process according to the seventh embodiment of the present invention.
Figure 25:
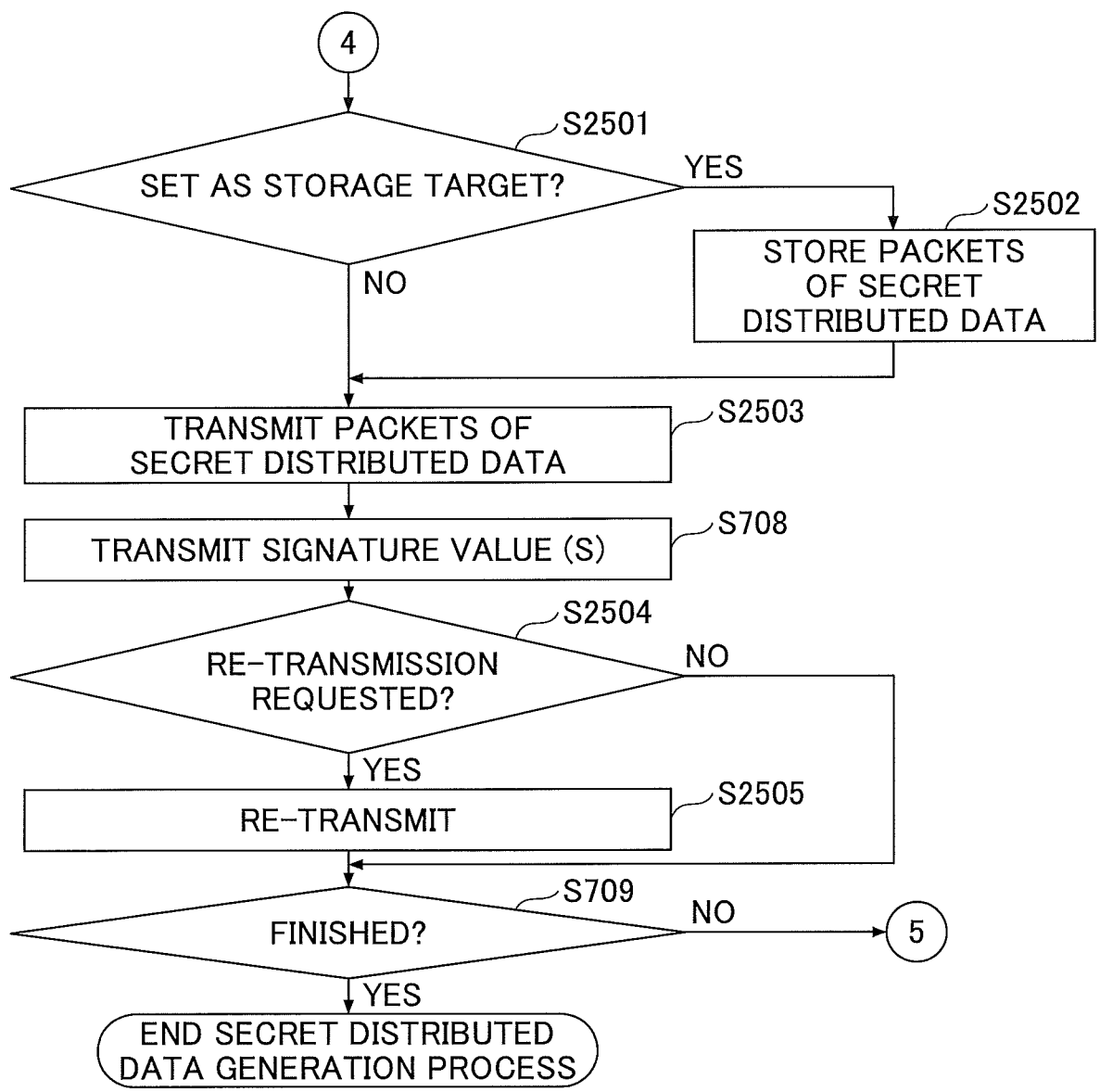
FIG. 25 is a flowchart illustrating the secret distributed data generation process according to the seventh embodiment of the present invention.

FIGS. 24 and 25 are flowcharts illustrating the secret distributed data generation process according to the seventh embodiment of the present invention. The flowcharts of FIGS. 24 and 25 are different from the flowchart of FIG. 21 in that the secret distributed data generation process of the seventh embodiment includes Steps S2401 to S2402 and Steps S2501 to S2505.

In Step S2101, the secret distributed data generation process of the seventh embodiment proceeds to Step S2401 when the importance ($p_i$) is determined to be greater than or equal to a predetermined value. In Step S2401, the stream packet generation part 508 sets a storage target. More specifically, the secret distributed data generated based on the data unit ($D_i$) determined to have an importance ($p_i$) greater than or equal to a predetermined value is set to be the storage target.

In Step S2402, the stream packet generation part 508 obtains the secret distributed data by associating the data unit ($D_i$) stored in the data buffer part 503 to the parameter information ($W_{i\_j}$) output by the parameter information generation part 1603. Further, the stream packet generation part 508 forms the obtained secret distributed data into packets and outputs the packets.

In Step S2501 of FIG. 25, the data transmission part 510 determines whether the secret distributed data output in Step S2402 is set to be the storage target. In a case where the secret distributed data is not set to be the storage target, the secret distributed data generation process of the seventh embodiment proceeds to Step S2503. On the other hand, in Step S2501, the secret distributed data generation process of the seventh embodiment proceeds to Step S2502.

In Step S2502, the data transmission part 510 temporarily stores the secret distributed data output in Step S2402 into the RAM 404. In this embodiment, the RAM 404 functions as a storage unit that temporarily stores the packets of the secret distributed data.

In Step S2503, the data transmission part 510 transmits, by way of streaming transmission via a network, the secret distributed data that is output by the stream packet generation part 508 to the server apparatus 120.

In Step S2504, the data transmission part 510 determines whether a re-transmission request from the server apparatus 120 is received. In a case where the data transmission part 510 determines that the re-transmission request is received, the secret distribution data generation process of the seventh embodiment proceeds to Step S2505.

In Step S2505, the data transmission part 510 reads out the secret distributed data from the RAM 404 and transmits the secret distributed data requested to be transmitted by way of streaming transmission again (re-transmission).

According to the seventh embodiment, in a case where a data item is determined to have an importance greater than or equal to a predetermined value, the secret distributed data that is generated based on the data unit having high importance is temporarily stored. Thus, according to the seventh embodiment, in a case where the server apparatus (transmission destination) 120 requests the imaging apparatus 110 to re-transmit the secret distributed data after performing streaming transmission of the secret distributed data, the imaging apparatus 110 can re-transmit the secret distributed data, and the possibility of data loss can be reduced for the secret distributed data.

Eighth Embodiment

According to the first to seventh embodiments, the authenticity of secret distributed data (i.e., secret distributed data not being falsified) can be guaranteed by using the above-described secret distributed protocols even in a case where data loss has occurred. However, according to the first to seventh embodiments, once the signature verification is determined as a success by the server apparatus 120, the (k−1) order polynomial ($y=\alpha_{k-1}x^{k-1}+\alpha_{k-2}x^{k-2}+ \ldots \alpha_1 x \alpha_0$) used for performing the signature verification is revealed.

Accordingly, the server apparatus 120 can generate new secret distributed data (e.g., $D_{n+1}$, $W_{n+1}$) by using the revealed (k−1) order polynomial. This is because new secret distributed data that satisfies the (k−1) order polynomial can be generated by adding an arbitrary number to the variable x of the (k−1) order polynomial and calculating the variable y of the (k−1) order polynomial. Thus, it becomes possible for the server apparatus 120 to falsify the new secret distributed data.

Hence, according to the below-described embodiments, a function for preventing falsification of the secret distributed data of the server apparatus 120 is described.

<1. Configuration of Data Recording System>

Figure 26:
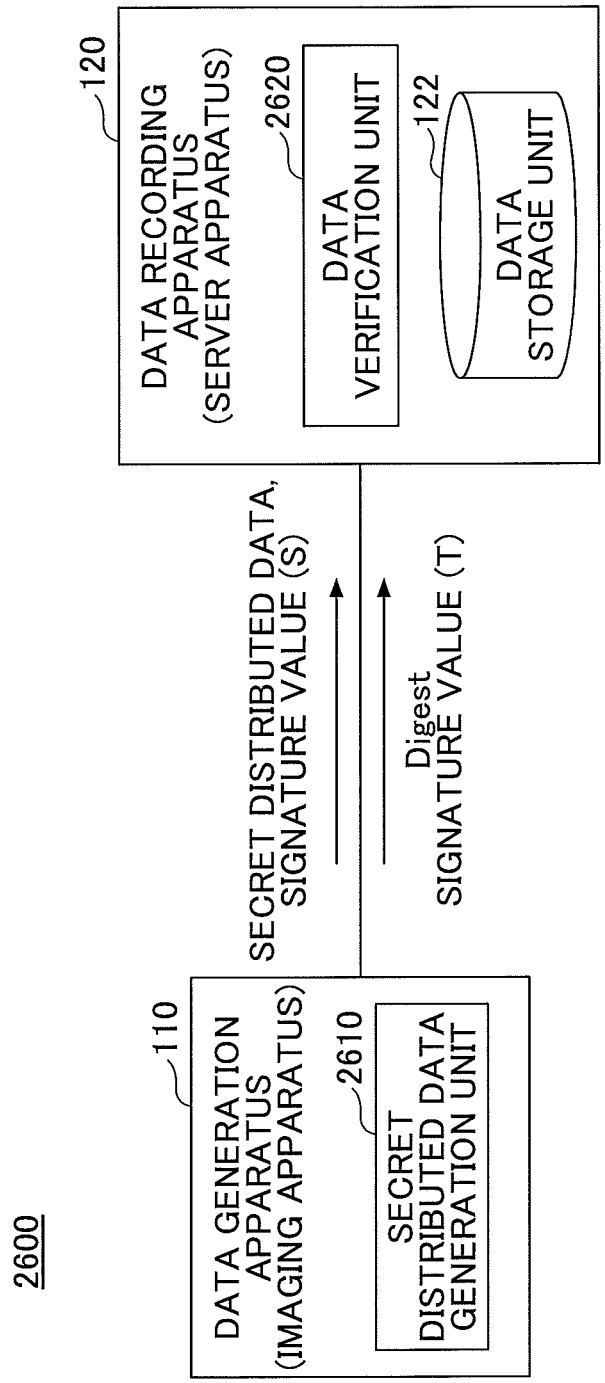
FIG. 26 is a schematic diagram illustrating a configuration of a data recording system according to the eighth embodiment of the present invention.

First, an overall configuration of a data recording system 2600 according to the eighth embodiment of the present invention is described. FIG. 26 is a schematic diagram illustrating a configuration of the data recording system 2600 according to the eighth embodiment of the present invention.

The data recording system 2600 of FIG. 26 is different from the data recording system 100 of FIG. 1 in that a secret distributed data generation unit 2610 transmits a pair of a Digest and a signature value (T) in addition to secret distributed data and a signature value (S).

The term "Digest" refers to data in which the hash values of the data units ($D_i$) included in the secret distributed data are coupled (connected) to each other. The Digest is expressed by the following formula.

[Formula 8]

$$\text{Digest} = \text{Hash}(D_1)|\text{Hash}(D_2)| \ldots |\text{Hash}(D_n) \quad \text{(Formula 8)}$$

Further, the signature value (T) is a value that is calculated by attaching a signature to the Digest by using a Sign algorithm expressed as follows.

[Formula 9]

$$T = \text{Sign}(\text{Digest}, sk_{cam}) \quad \text{(Formula 9)}$$

Further, the data recording system 2600 of FIG. 26 is different from the data recording system 100 of FIG. 1 in that the function of a data verification unit 2620 is different from the function of the data verification unit 121. More specifically, the data verification unit 2620 not only has a function of the data verification unit 121 but also has a function of performing signature verification on the hash value (Hash ($D_i$)) included in the Digest by using the signature value (T).

Before the data verification unit 2620 verifies the authenticity of the secret distributed data (i.e., determines whether the secret distributed data is falsified), the data verification unit 2620 performs signature verification on the hash value (Hash ($D_i$)) included in the Digest by using the signature value (T). Then, in a case where the signature verification on the hash value (Hash ($D_i$ $D_i$)) has succeeded, the data verification unit 2620 uses the hash value (Hash ($D_i$)) to verify the authenticity of the data unit ($D_i$) included in the secret distributed data (i.e., determines whether the data unit ($D_i$) is falsified). Then, the data verification unit 2620 determines the authenticity of the secret distributed data (i.e., determines whether the secret distributed data is falsified).

Accordingly, the data verification unit 2620 verifies the authenticity of data by determining whether the data has been forged and by determining whether the data has been falsified.

<2. Functional Configuration of Imaging Apparatus>

Figure 27:
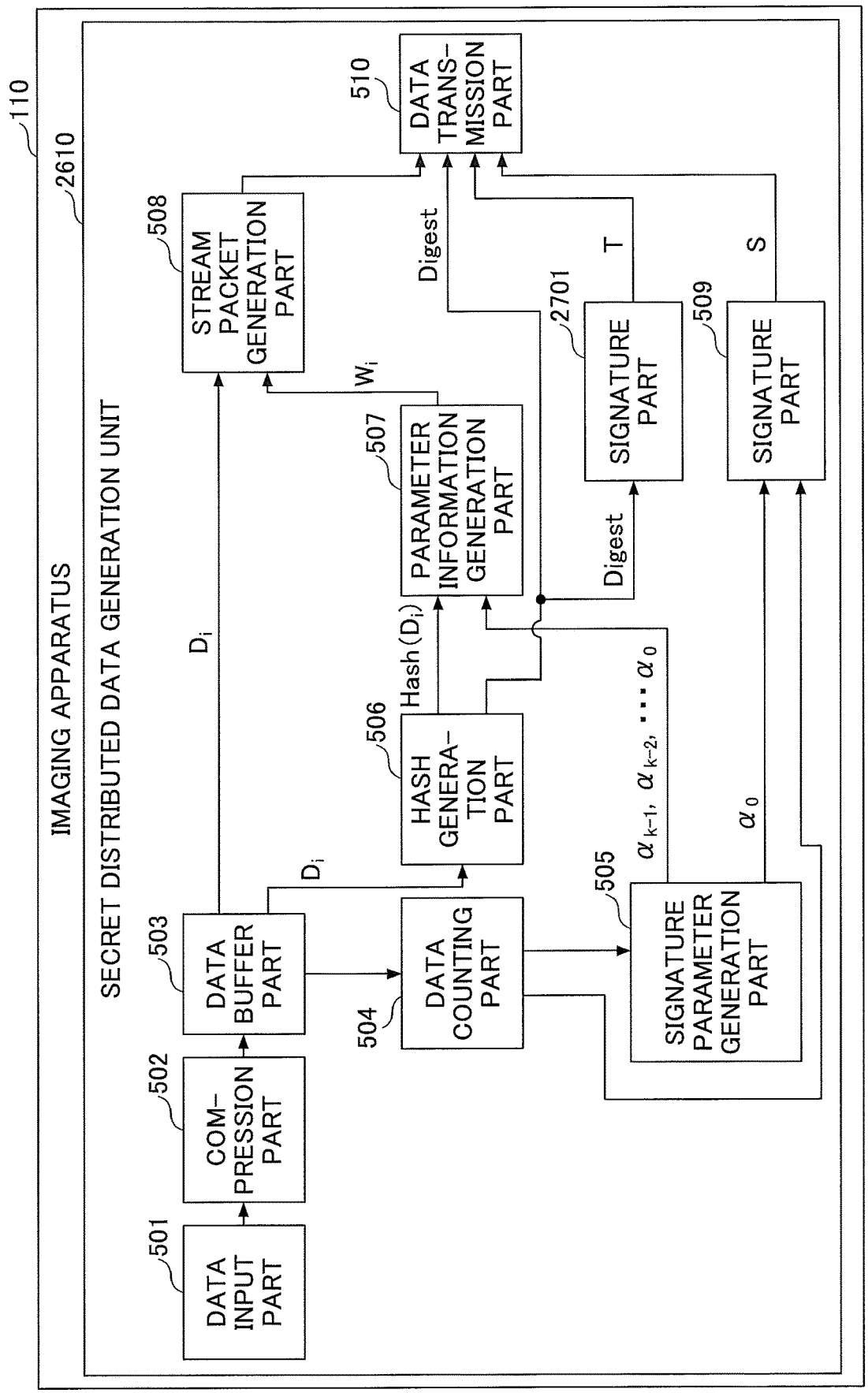
FIG. 27 is a schematic diagram illustrating a functional configuration of an imaging apparatus according to the eighth embodiment of the present invention.

FIG. 27 is a schematic diagram illustrating a functional configuration of the imaging apparatus 110 according to the eighth embodiment of the present invention. Among the components of the functional configuration of the imaging apparatus 110 of FIG. 27, like components and parts are denoted with like reference numerals as the reference numerals of the components of the functional configuration of the imaging apparatus 110 of FIG. 5 and are not further explained.

The secret distributed data generation unit 2610 of FIG. 27 is different from the secret distributed data generation unit 111 of FIG. 5 in that the hash generation part 506 generates the Digest of the hash value (Hash ($D_i$)) and reports the generated Digest to the data transmission part 510 and a signature part 2701.

Further, the secret distributed data generation unit 2610 of FIG. 27 is different from the secret distributed data generation unit 111 of FIG. 5 in that the secret distributed data generation unit 2610 of FIG. 27 includes the signature part 2701. The signature part 2701 is an example of a second signature unit. When the signature part 2701 receives the Digest of the hash value (Hash ($D_i$)) from the hash generation part 506, the signature part 2701 generates the signature value (T) by attaching a signature to the Digest. The signature part 2701 attaches the signature to the Digest by using the above-described [Formula 9]. Further, the signature part 2701 reports the generated signature value (T) to the data transmission part 510.

Further, the secret distributed data generation unit 2610 of FIG. 27 is different from the secret distributed data generation unit 111 of FIG. 5 in that the data transmission part 510 functions as a second transmission unit. The data transmission part 510 not only transmits the secret distributed data ($D_i$, $W_i$) and the signature value (S) but also transmits the Digest and the signature value (T).

Figure 28:
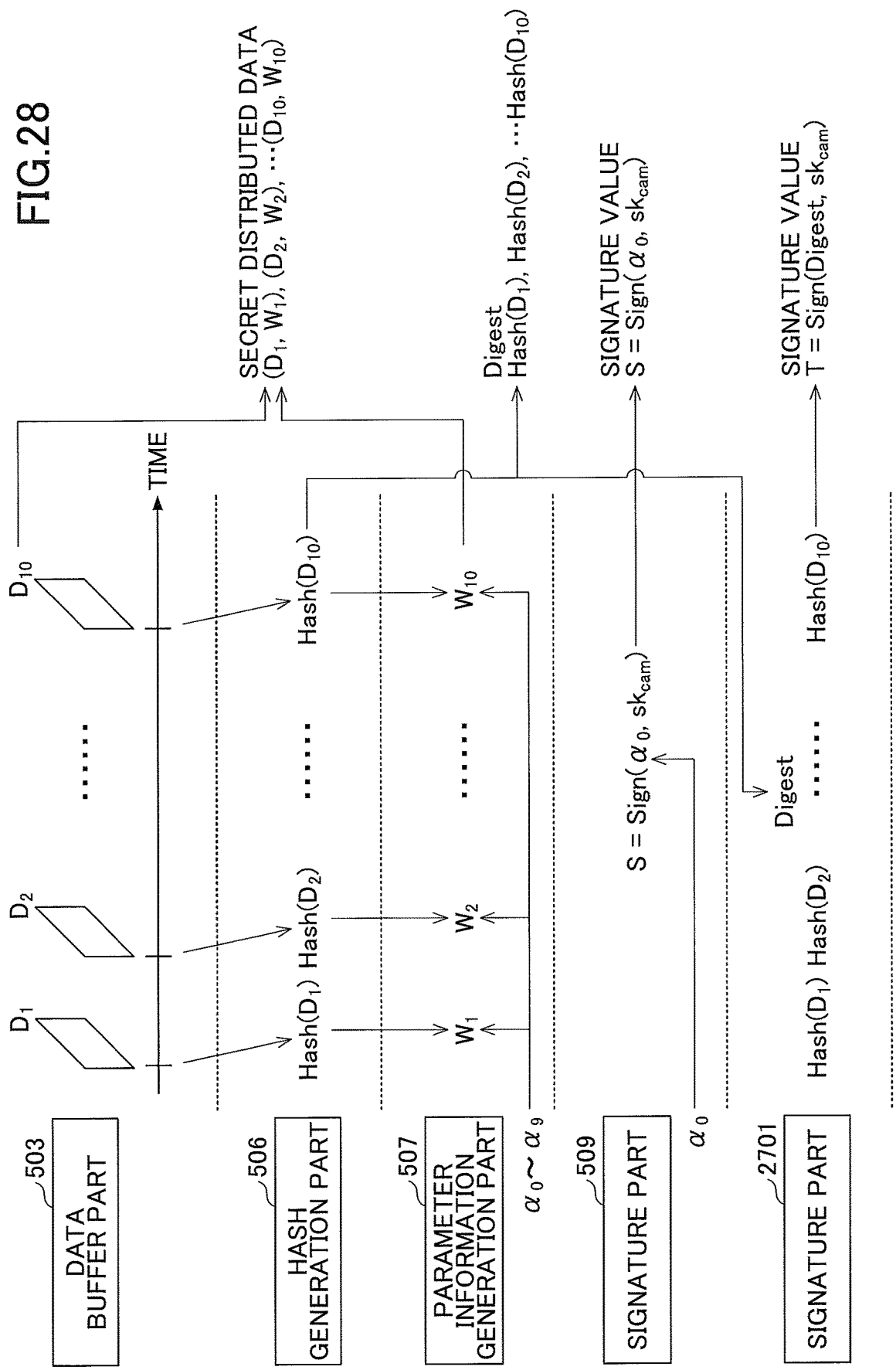
FIG. 28 is a schematic diagram illustrating the operations (actions) of each part included in an imaging apparatus according to the eighth embodiment of the present invention.

FIG. 28 is a schematic diagram illustrating the operations (actions) of the data buffer part 503, the hash generation part 506, the parameter information generation part 507, the signature part 509, and the signature part 2701 included in the imaging apparatus 110 of the eighth embodiment. In the example illustrated in FIG. 28, the predetermined number "n" is 10.

As illustrated in FIG. 28, the hash generation part 506 generates the Digest by coupling the generated hash values (Hash ($D_i$)).

When the signature part 2701 obtains the Digest of the hash values (Hash ($D_i$)) generated by the hash generation part 506, the signature part 2701 attaches a signature to the Digest by using the Sign algorithm and calculates the signature value (T).

<3. Processes of Secret Distributed Data Generation Unit>

Figure 29:
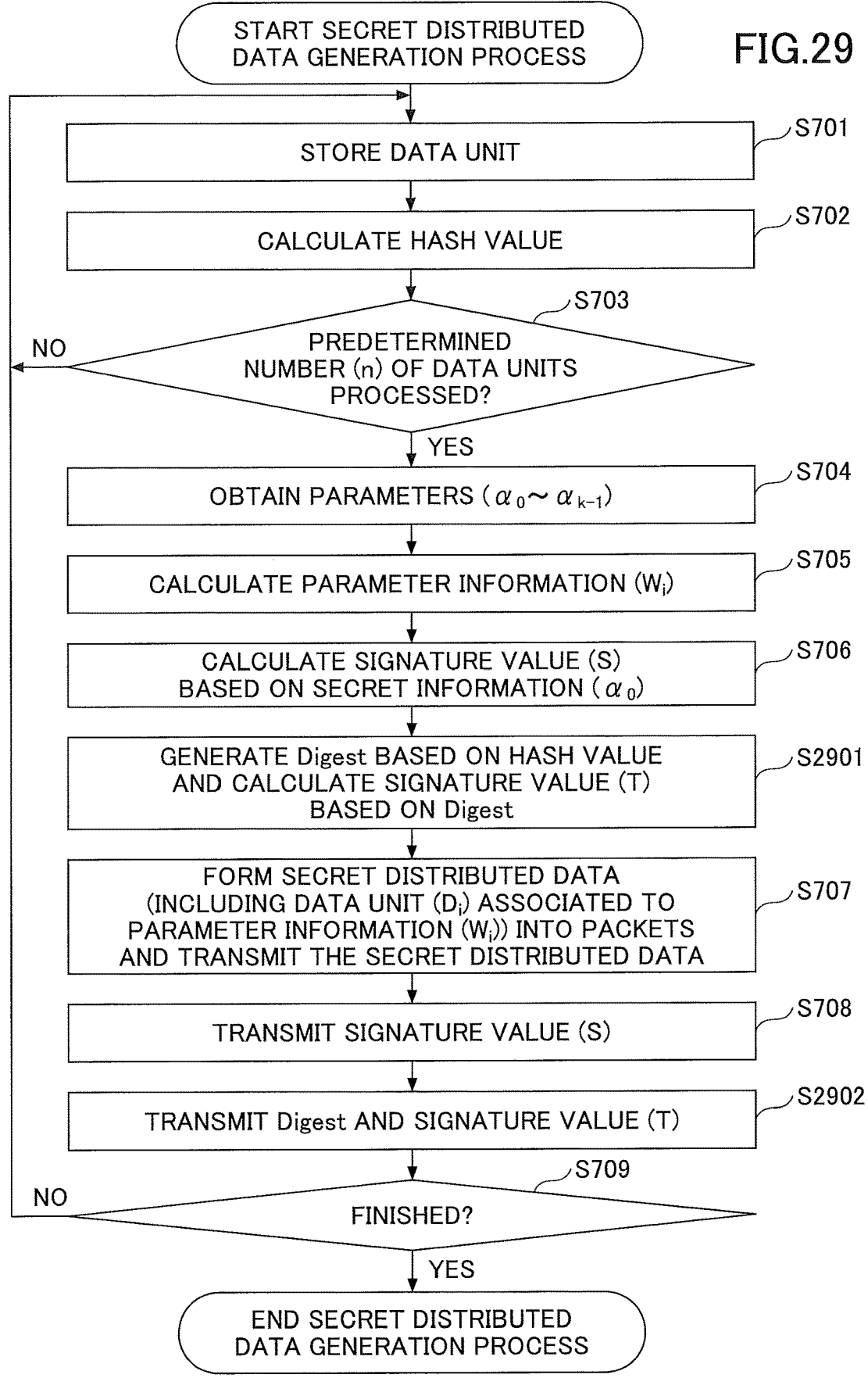
FIG. 29 is a flowchart illustrating the flow of a secret distributed data generation process according to the eighth embodiment of the present invention.

Next, the flow of the secret distributed data generation process performed by the secret distributed data generation unit 2610 of the imaging apparatus 110 is described. FIG. 29 is a flowchart illustrating the flow of the secret distributed data generation process according to the eighth embodiment of the present invention. The secret distributed data generation process of FIG. 29 is described mainly on the differences with respect to the secret distributed data generation process of FIG. 7. The differences with respect to the secret distributed data generation process of FIG. 7 are the below-described processes of Steps S2901 and S2902.

In Step S2901, the hash generation part 506 generates the Digest of the hash values (Hash ($D_i$)). Then, the signature part 2701 calculates the signature value (T) based on the generated Digest.

In Step S2902, the data transmission part 510 transmits the Digest of the hash values (Hash ($D_i$)) reported from the hash generation part 506 and the signature value (T) reported from the signature part 2701 to the server apparatus 120.

<4. Functional Configuration of Server Apparatus>

Figure 30:
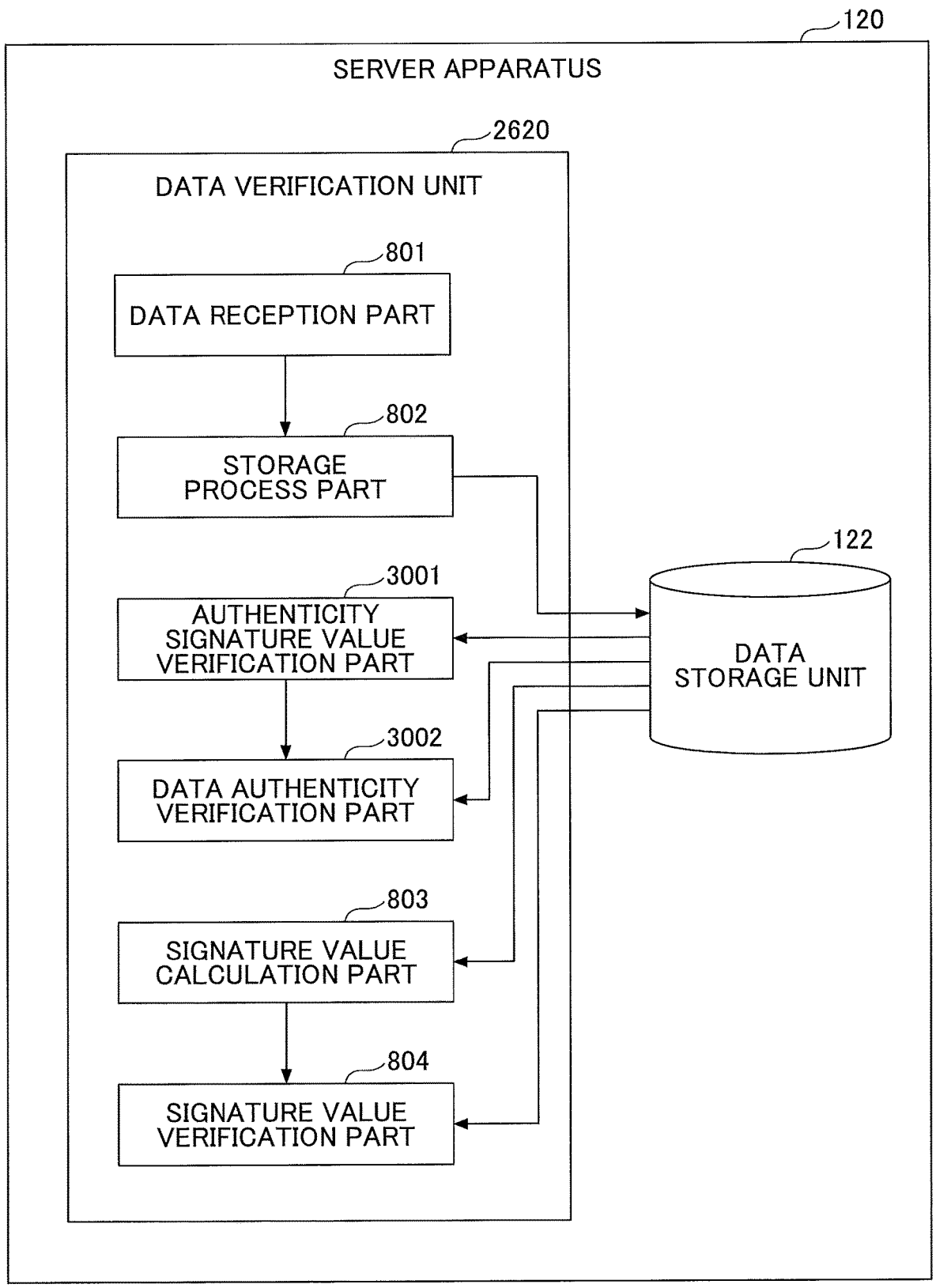
FIG. 30 is a schematic diagram illustrating a functional configuration of a server apparatus according to the eighth embodiment of the present invention.

Next, a functional configuration of the data verification unit 2620 implemented by the server apparatus 120 is described. FIG. 30 is a schematic diagram illustrating the functional configuration of the server apparatus 120 according to the eighth embodiment of the present invention.

The functional configuration of the data verification unit 2620 of FIG. 30 is different from the data verification unit 121 of FIG. 8 in that the data verification unit 2620 includes an authenticity signature value verification part 3001 and a data authenticity verification part 3002.

The authenticity signature value verification part 3001 reads out the Digest and the signature value (T) that are transmitted from the secret distributed data generation part 2610 and stored in the data storage unit 122. Further, the authenticity signature value verification part 3001 uses the below-described vrfy algorithm and calculates the Digest based on a verification key $vk_{cam}$.

[Formula 10]

$$\text{Vrfy}(T, vk_{cam}) = \text{Digest} \qquad \text{(Formula 10)}$$

Further, the authenticity signature value verification part 3001 compares the Digest read out from the data storage unit 122 with the Digest calculated by using the vrfy algorithm illustrated in [Formula 10]. In a case where the Digests match as a result of the comparison, the authenticity signature value verification part 3001 determines that the signature verification of the Digest read out from the data storage unit 122 is a success (i.e., determines that the hash value (Hash ($D_i$)) included in the Digest is correct). On the other hand, in a case where the Digests do not match as a result of the comparison, the authenticity signature value verification part 3001 determines that the signature verification of the Digest read out from the data storage unit 122 is a failure (i.e., determines that the hash value (Hash ($D_i$)) included in the Digest is incorrect).

Note the authenticity signature value verification part 3001 reports the determination results to the data authenticity verification part 3002 in a case where the signature verification is determined to be a success.

The data authenticity verification part 3002 is an example of a forgery determination unit. When the data authenticity verification part 3002 receives determination results indicating the success of signature verification from the authenticity signature value verification part 3001, the data authenticity verification part 3002 reads out the data unit ($D_i$) included in the secret distributed data stored in the data storage unit 122 and calculates the hash value (Hash ($D_i$)) of the data unit ($D_i$).

Further, the data authenticity verification part 3002 compares the calculated hash value (Hash ($D_i$)) with the hash value (Hash ($D_i$)) included in the Digest whose signature verification is determined as a success by the authenticity signature value verification part 3001. If all of the calculated hash values (Hash ($D_i$)) are included in the digest as a result of the comparison, the data authenticity verification part 3002 determines that the signature verification is a success (i.e., determines that the data unit ($D_i$) included in the secret distributed data is not forged). On the other hand, if there is a calculated hash value (Hash ($D_i$)) that is not included in the digest as a result of the comparison, the data authenticity verification part 3002 determines that the signature verification is a failure (i.e., determines that the data unit ($D_i$) included in the secret distributed data is forged).

Accordingly, the data authenticity verification part 3002 can guarantee the authenticity of the data unit ($D_i$) included in the secret distributed data read out from the data storage unit 122 (i.e., guarantee that the data unit ($D_i$) is not forged).

<5. Data Verification Process of Data Verification Unit>

Figure 31:
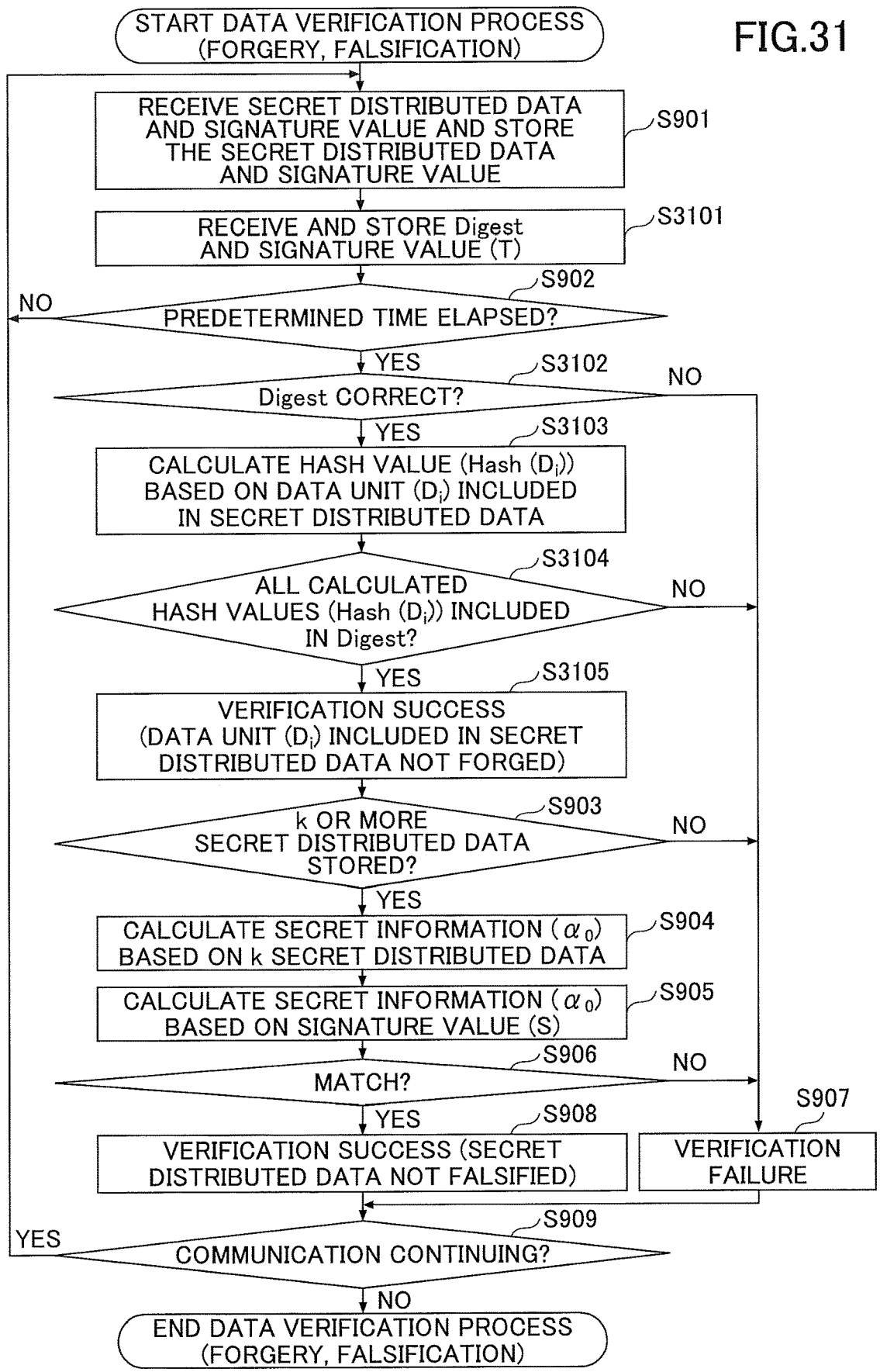
FIG. 31 is a flowchart illustrating a data verification process (verification of forgery and falsification) according to the eighth embodiment of the present invention.

Next, the flow of a data verification process (verification of forgery and falsification) by the data verification unit 2620 of the server apparatus 120 of the eighth embodiment is described. FIG. 31 is a flowchart illustrating the data verification process (verification of forgery and falsification) according to the eighth embodiment of the present invention. The data verification process of FIG. 31 is described mainly on the differences with respect to the data verification process of FIG. 9. The differences with respect to the data verification process of FIG. 9 are the below-described processes of Steps S3101 to S3105.

In Step S3101, the data reception part 801 receives the Digest and the signature value (T) transmitted from the imaging apparatus 110. Further, the storage process part 802 stores the Digest and the signature value (T) received by the data reception part 801 in the data storage unit 122.

In Step S3102, the authenticity signature value verification part 3001 performs signature verification on the Digest stored in the data storage unit 122 by using the signature value (T) stored in the data storage unit 122. More specifically, the authenticity signature value verification part 3001 determines whether the Digest calculated by using the vrfy algorithm with the signature value (T) matches the Digest stored in the data storage unit 122. Thereby, the authenticity signature value verification part 3001 determines whether the Digest stored in the data storage unit 122 is correct.

In a case where the Digest stored in the data storage unit 122 is determined to be incorrect as a result of the determination (No in Step S3102), the verification process of the eighth embodiment proceeds to Step S907. In this case, the authenticity signature value verification part 3001 determines that signature verification of the Digest read out from the data storage unit 122 is a failure.

On the other hand, in a case where the Digest stored in the data storage unit 122 is determined to be correct as a result of the determination (Yes in Step S3102), the verification process of the eighth embodiment proceeds to Step S3103.

In Step S3103, the data authenticity verification part 3002 reads out the data unit ($D_i$) included in the secret distributed data stored in the data storage unit 122 and calculates the hash value (Hash ($D_i$)) of the data unit ($D_i$).

In Step S3104, the data authenticity verification part 3002 compares the calculated hash value (Hash ($D_i$)) with the hash value (Hash ($D_i$)) included in the Digest whose signature verification is determined as a success by the authenticity signature value verification part 3001. In a case where a hash value (Hash ($D_i$)) that is not included in the Digest is included in the calculated hash value (Hash ($D_i$)) (No in Step S3104) as a result of the comparison, the verification process of the eighth embodiment proceeds to Step S907. In this case, the data authenticity verification part 3002 determines that signature verification of the data unit ($D_i$) included in the secret distributed data read out from the data storage unit 122 is a failure (i.e., determines that the data unit ($D_i$) included in the secret distributed data is forged).

On the other hand, in a case where all of the calculated hash values (Hash ($D_i$) are included in the Digest (Yes in Step S3104) as a result of the comparison, the data authenticity verification part 3002 proceeds to Step S903.

In Step S3105, the data authenticity verification part 3002 determines that signature verification is a success (i.e., determines that the data unit ($D_i$) included in the secret distributed data is not forged).

In the case where signature verification is determined as a success in Step S3105, the verification process proceeds to Step S903. After Step S903, signature verification is performed by determining whether the secret distributed data is falsified. In a case where signature verification is determined as a success as a result of the signature verification, the secret distributed data is determined as not being falsified.

Hence, according to the data recording system of the eighth embodiment, the imaging apparatus 110 transmits the Digest of the hash values of the data units ($D_i$) included in the secret distributed data to the server apparatus 120. The imaging apparatus 110 also transmits the signature value (T) calculated by adding a signature to the Digest with the Sign algorithm to the server apparatus 120.

Further, the server apparatus 120 performs signature verification of the Digest by using the signature value (T) received from the imaging apparatus 110.

Further, in a case where the signature verification of the Digest is a success, the server apparatus 120 verifies the authenticity of the data unit ($D_i$) included in the secret distributed data received from the imaging apparatus 110 (i.e., determines whether the data unit ($D_i$) is forged). The server apparatus 120 performs the verification by using the Digest whose signature verification is determined as a success.

Thus, according to the data recording system of the eighth embodiment, forgery of secret distributed data can be prevented.

Ninth Embodiment

According to the above-described eighth embodiment, the imaging apparatus 110 generates the Digest and the signature value (T) and transmits the generated Digest and signature value (T) to the server apparatus 120 for preventing forgery of secret distributed data. According to the ninth embodiment, an authenticity guarantee server that is separate from the imaging apparatus 110 and the server apparatus 120 is provided in the data recording system, so that the authenticity guarantee server generates the Digest and the signature value (T) and transmits the generated Digest and signature value (T) to the server apparatus 120. Next, the ninth embodiment is described.

<1. Configuration of Data Recording System

Figure 32:
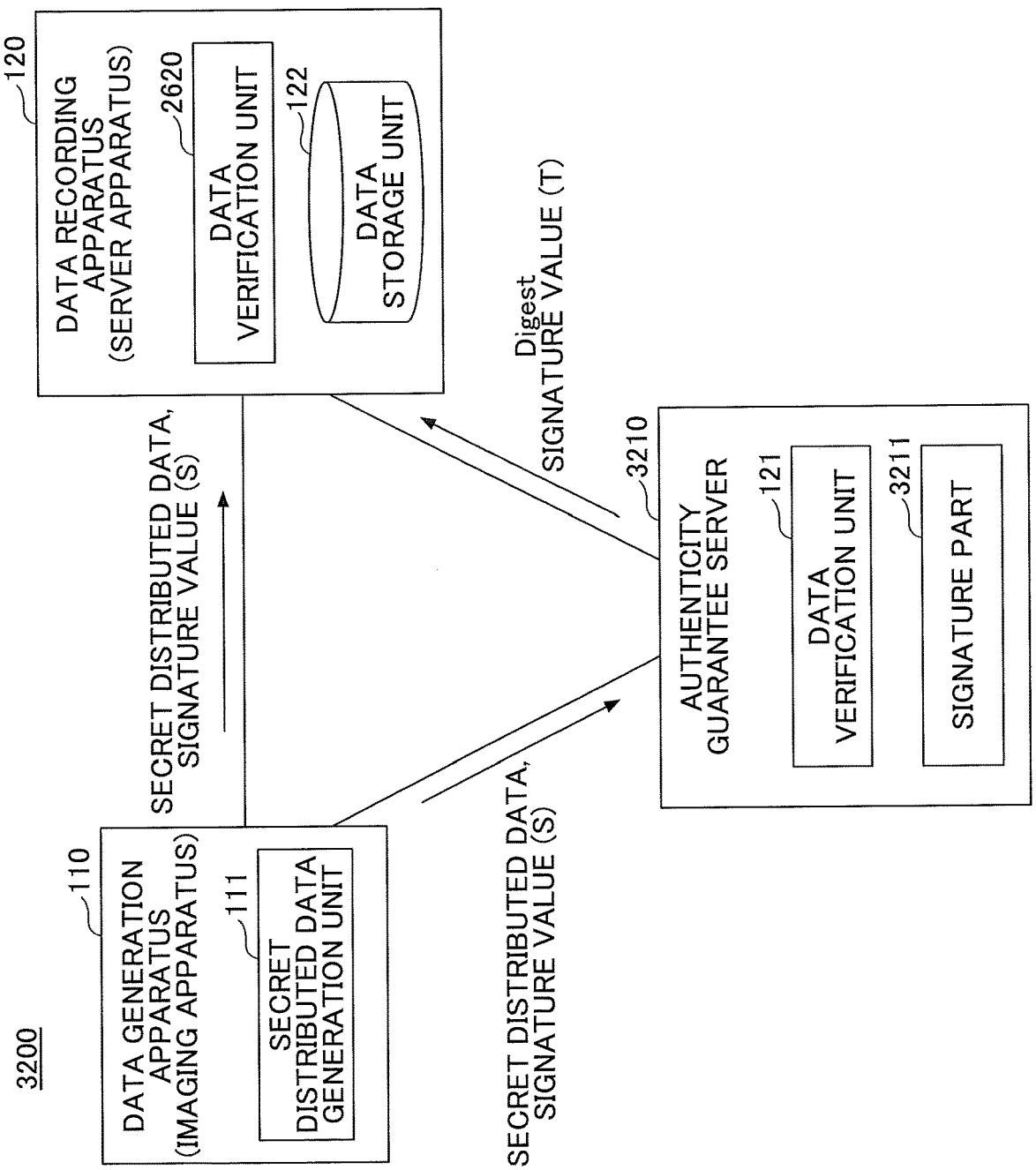
FIG. 32 is a schematic diagram illustrating a configuration of a data recording system according to the ninth embodiment of the present invention.

First, an overall configuration of the data recording system 3200 according to the ninth embodiment of the present invention is described. FIG. 32 is a schematic diagram illustrating a configuration of the data recording system 3200 according to the ninth embodiment of the present invention.

The data recording system 3200 of FIG. 32 is different from the data recording system 100 of FIG. 1 in that the data recording system 3200 includes an authenticity guarantee server 3210 that is communicably connected to the data generation apparatus 110 and the server apparatus 120 via a network. Further, according to the data recording system 3200 of FIG. 32, the secret distributed data generation unit 111 transmits the secret distributed data and the signature value (S) to the server apparatus 120 and the authenticity guarantee server 3210 by way of broadcast transmission. Further, the authenticity guarantee server 3210 transmits a pair of the Digest and the signature value (T) (second pair) to the server apparatus 120.

The authenticity guarantee server 3210 has the same hardware configuration as the hardware configuration of the server apparatus 120 (see FIG. 4B). A data verification program and a signature program are installed in the authenticity guarantee server 3210. Accordingly, the authenticity guarantee server 3210 functions as the data verification unit 121 and a signature unit 3211 by executing the data verification program and the signature program.

The functions of the data verification unit 121 of the authenticity guarantee server 3210 is the same as the functions of the data verification unit 121 of the server apparatus 120 of FIG. 8. Therefore, further description of the functions of the data verification unit 121 of the authenticity guarantee server 3210 is omitted.

The signature unit 3211 is an example of a second signature unit. The signature unit 3211 performs a signature process. More specifically, in a case where verification of the authenticity of the secret distributed data is a success according to the data verification by the data verification unit 121 (i.e., secret distributed data not being falsified), the signature unit 3211 calculates the hash value of the data unit ($D_i$) included in the secret distributed data.

Further, the signature unit 3211 generates the Digest by coupling the calculated hash values (Hash ($D_i$)). Further, the signature unit 3211 generates the signature value (T) by attaching a signature to the generated Digest by using the Sign algorithm illustrated in [Formula 11].

[Formula 11]

$$T = \text{Sign}(\text{Digest}, sk_{serv}) \quad \text{(Formula 11)}$$

Further, the signature unit 3211 functions as a second transmission unit. The signature unit 11 transmits a pair of the Digest and the signature value (T) (second pair) to the server apparatus 120.

Note that, although the secret distributed data generation unit 111 of the ninth embodiment is described to broadcast both the secret distributed data and the signature value (S), the secret distributed data generation unit 111 of the ninth embodiment may broadcast only the secret distributed data. In this case, the authenticity guarantee server 3210 does not perform the data verification process with the data verification unit 121 and performs only the signature process with the signature unit 3211.

<2. Signature Process of Authenticity Guarantee Server>

Figure 33:
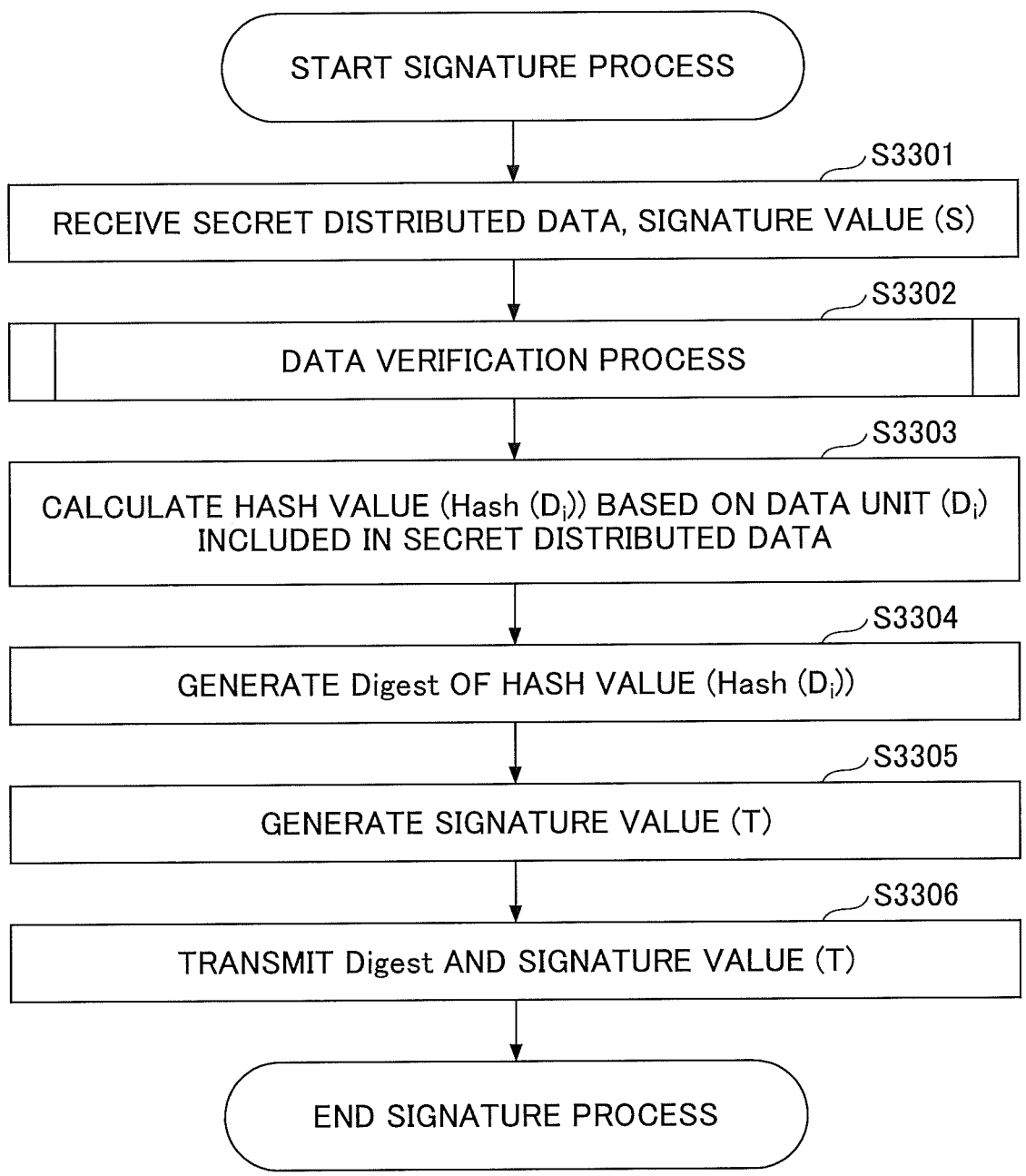
FIG. 33 is a flowchart illustrating the flow of a signature process according to the ninth embodiment of the present invention.

Next, the flow of the signature process of the authenticity guarantee server 3210 is described. FIG. 33 is a flowchart illustrating the flow of the signature process according to the ninth embodiment of the present invention. The processes illustrated in FIG. 33 are implemented by communicably connecting the authenticity guarantee server 3210 to the server apparatus 120 and the imaging apparatus 110.

In Step S3301, the data verification unit 121 receives the secret distributed data and the signature value (S) transmitted from the imaging apparatus 110.

In Step S3302, the data verification unit 121 performs the data verification process. Because the data verification process by the data verification unit 121 is described above with reference to FIG. 9, further description of the data verification process is omitted. The signature process of FIG. 33 is described assuming that verification of the authenticity of the secret distributed data received in Step S3301 is a success.

In Step S3303, the signature unit 3211 calculates the hash value (Hash ($D_i$)) of the data unit ($D_i$) included in the secret distributed data.

In Step S3304, the signature unit 3211 generates the Digest by coupling the calculated hash values (Hash ($D_i$)).

In Step S3305, the signature unit 3211 generates the signature value (T) by attaching a signature to the generated Digest by using the Sign algorithm.

In Step S3306, the signature unit 3211 transmits a pair of the generated Digest and the signature value (T) to the server apparatus 120.

Hence, according to the data verification unit 2620 of the server apparatus 120, the authenticity signature value verification part 3001 can perform signature verification on the Digest by using the signature value (T) received from the authenticity guarantee server 3210.

Further, in a case where the signature verification of the Digest is a success, the data authenticity verification part 3002 of the data verification unit 2620 can function as a forgery determination unit. More specifically, the data authenticity verification part 3002 can verify the authenticity of the data unit ($D_i$) included in the secret distributed data received from the imaging apparatus 110 (i.e., determine whether the data unit ($D_i$) is forged) by using the Digest whose signature verification is a success.

Hence, according to the data recording system 3200 of the ninth embodiment, the authenticity guarantee server generates the Digest of the hash values of the data units ($D_i$) included in the secret distributed data along with generating the signature value (T) by adding a signature to the generated Digest. Further, the authenticity guarantee server transmits the generated Digest and signature value (T) to the server apparatus.

Thus, similar to the above-described eighth embodiment, the data recording system of the ninth embodiment can also prevent forgery of the secret distributed data. Further, according to the data recording system of the ninth embodiment, the process load of the imaging apparatus 110 can be reduced compared to the data recording system of the eighth embodiment.

Tenth Embodiment

According to the above-described ninth embodiment, the authenticity guarantee server 3210 is provided in the data recording system 3200, and the server apparatus 120 verifies the authenticity of the data unit ($D_i$) included in the secret distributed data (determine that the data unit ($D_i$) is not forged).

However, according to the tenth embodiment, the server apparatus 120 determines the authenticity of both the data unit ($D_i$) included in the secret distributed data and the parameter information ($W_i$). Next, the tenth embodiment is described mainly on the difference with respect to the ninth embodiment.

<1. Configuration of Data Recording System>

Figure 34:
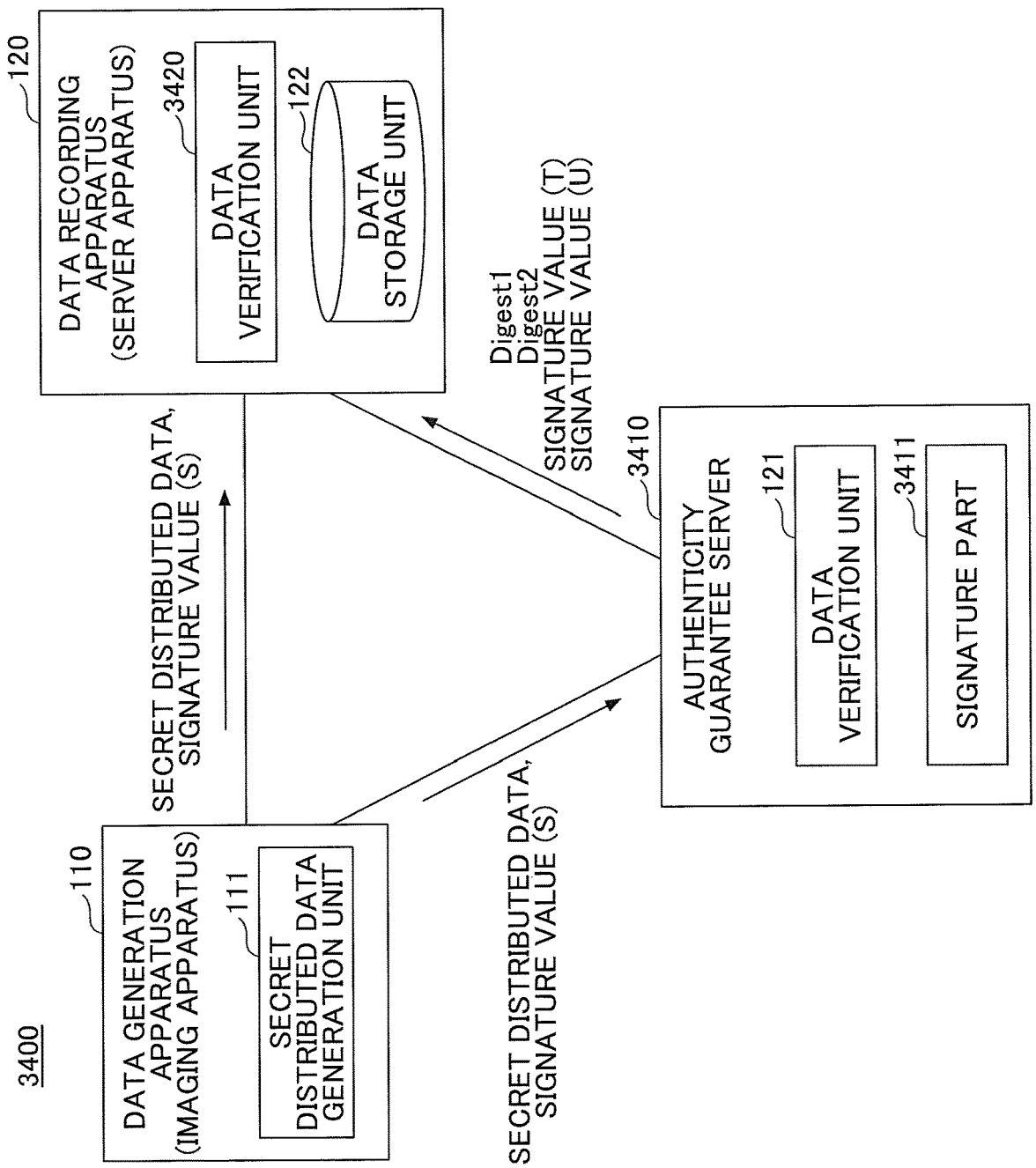
FIG. 34 is a schematic diagram illustrating a configuration of a data recording system according to the tenth embodiment of the present invention.

FIG. 34 is a schematic diagram illustrating a configuration of a data recording system 3400 according to the tenth embodiment of the present invention. The data recording system 3400 of FIG. 34 is different from the data recording system 3200 of FIG. 32 in that authenticity guarantee server includes a signature unit 3411 and a data verification unit 3420.

According to the data recording system 3400, the signature unit 3411 not only functions as a second signature unit but also functions as a third signature unit.

More specifically, in a case where the signature unit 3411 functions as the second signature unit, the signature unit 3411 calculates the hash value (Hash ($D_i$)) of the data unit ($D_i$) included in the secret distributed data transmitted from the imaging apparatus 110. Further, the signature unit 3411 generates a Digest1 by coupling the calculated hash values (Hash ($D_i$)). Further, the signature unit 3411 generates the signature value (T) by adding a signature to the generated Digest1.

In a case where the signature unit 3411 functions as the third signature unit, the signature unit 3411 obtains the parameter information ($W_i$) included in the secret distributed data transmitted from the imaging apparatus 110. Further, the signature unit 3411 generates a Digest2 by coupling the obtained parameter information ($W_i$). Further, the signature unit 3411 generates a signature value (U) by adding a signature to the generated Digest2.

In addition, the signature unit 3411 not only functions as a second transmission unit but also functions as a third transmission unit. More specifically, in a case where the signature unit 3411 functions as the second transmission unit, the signature unit 3411 transmits a second pair of data (including the Digest1 and the signature value (T)) to the server apparatus 120. Further, in a case where the signature unit 3411 functions as the third transmission unit, the signature unit 3411 transmits a third pair of data (including the Digest2 and the signature value (U)) to the server apparatus 120.

Further, according to the data recording system 3400, the data verification unit 3420 not only functions to verify the authenticity of the data unit ($D_i$) included in the secret distributed data but also verify the authenticity of the parameter information ($W_i$) (i.e., determine whether the parameter information ($W_i$) is forged).

More specifically, the authenticity signature value verification part 3001 of the data verification unit 3420 performs signature verification on the Digest2 by using the signature value (U) received from the authenticity guarantee server 3410.

Further, in a case where the signature verification of the Digest2 is a success, the data authenticity verification part 3002 of the data verification unit 3420 verifies the authenticity of the parameter information ($W_i$) included in the secret distributed data by using the Digest2 whose signature verification is determined as a success.

Thereby, the signature verification unit 3420 can verify the authenticity of the parameter information ($W_i$) included in the secret distributed data (determine that the parameter information ($W_i$) is not forged).

<2. Signature Process of Signature Unit>

Figure 35:
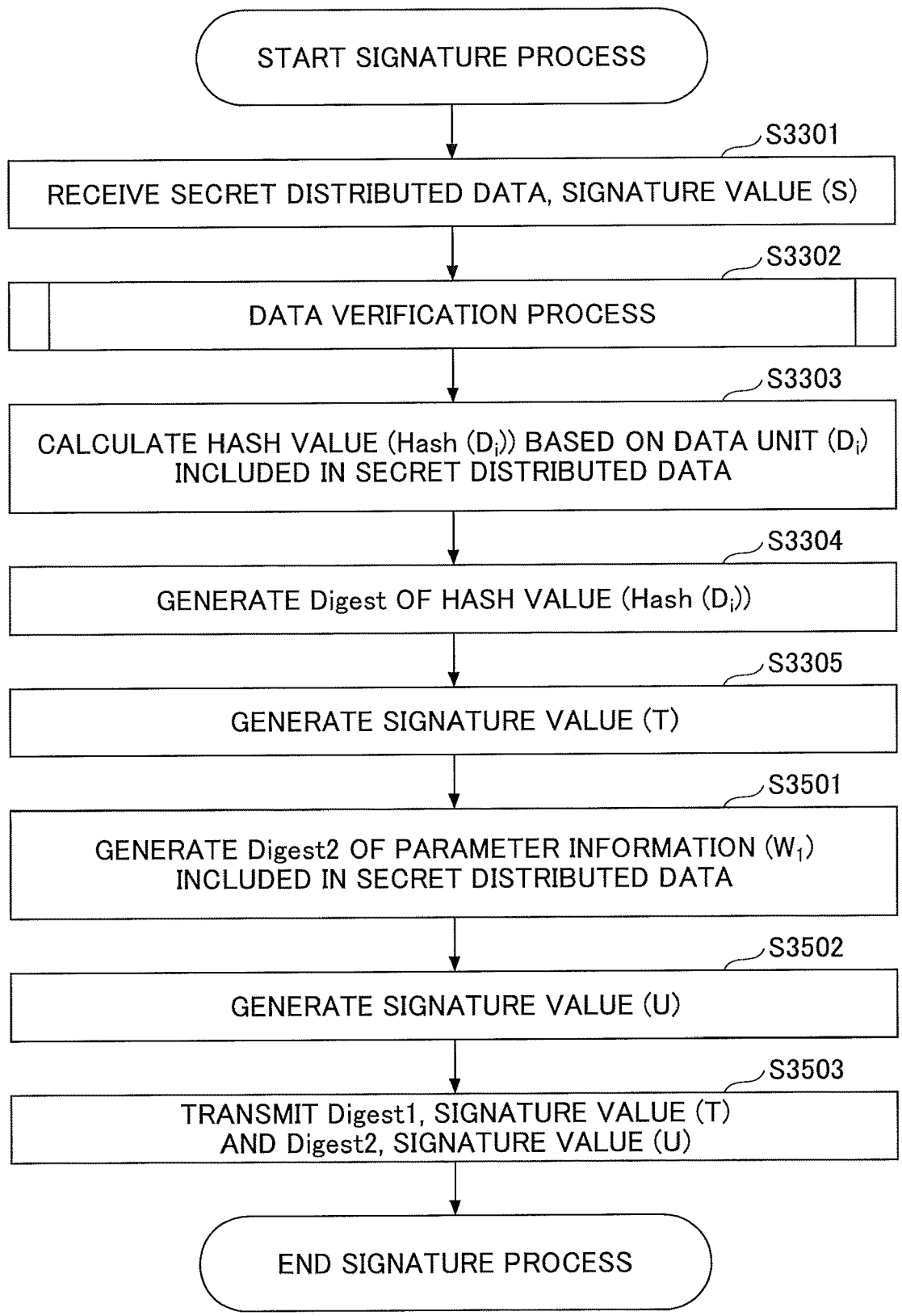
FIG. 35 is a flowchart illustrating a signature process according to the tenth embodiment of the present invention.

Next, the flow of a signature process of the signature unit 3411 of the authenticity guarantee server 3410 is described. FIG. 35 is a flowchart illustrating the signature process according to the tenth embodiment of the present invention. The flowchart of FIG. 35 is different from the flowchart of FIG. 33 in that the signature process of FIG. 35 includes the processes of Steps S3501 to S3503.

In Step S3501, the signature unit 3411 generates the Digest2 based on the parameter information ($W_i$) included in the secret distributed data.

In Step S3502, the signature unit 3411 generates the signature value (U) by adding a signature to the generated Digest2.

In Step S3503, the signature unit 3411 transmits the pair of data including the Digest1 and the signature value (T) generated in Steps S3304 and S3305 and the pair of data including the Digest2 and the signature value (U) generated in Steps S3502 and S3503 to the server apparatus 120.

<3. Data Verification Process (Verification of Forgery and Falsification) of Data Verification Unit>

Figure 36:
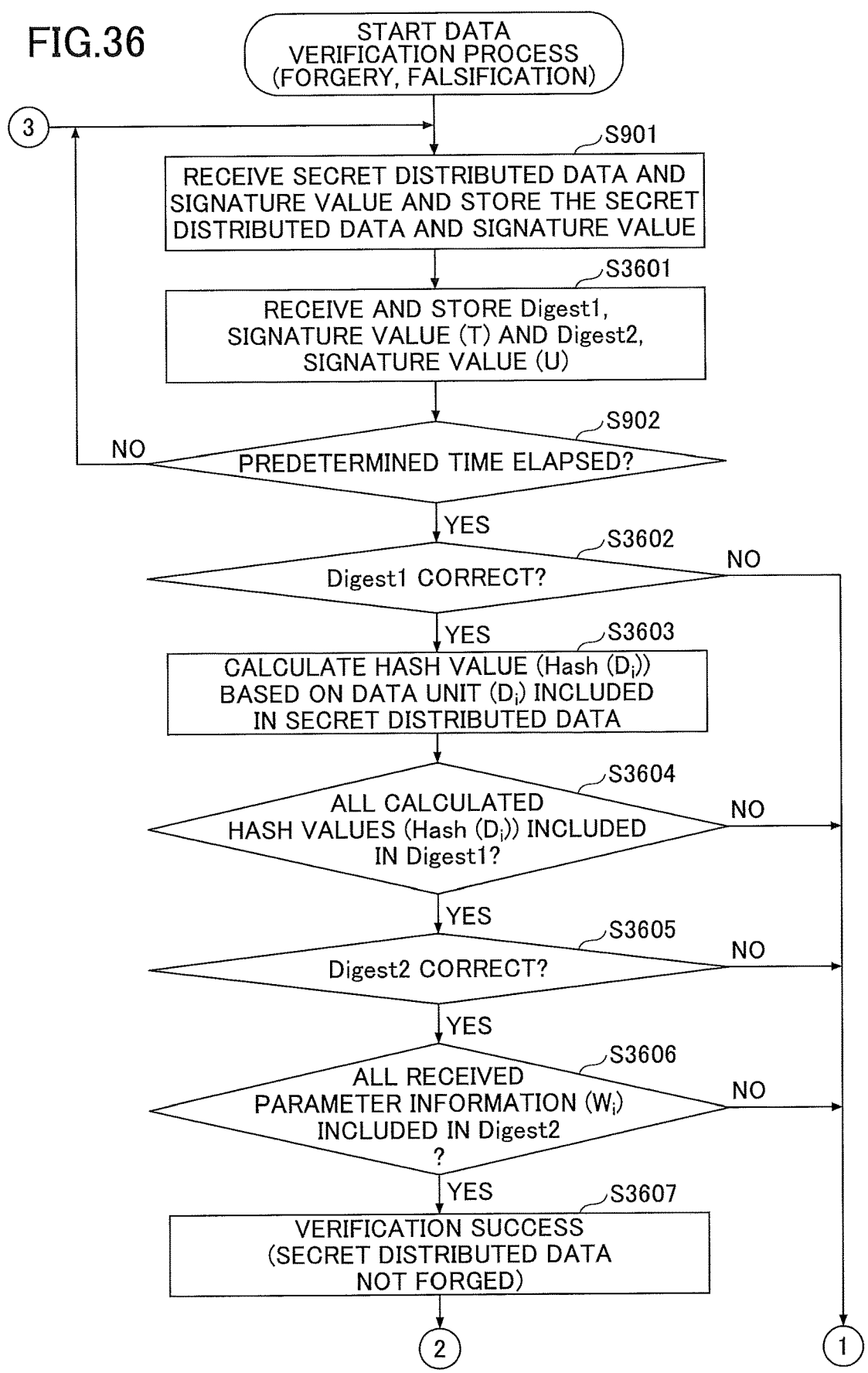
FIG. 36 is a flowchart illustrating the flow of a data verification process (verification of forgery and falsification) according to the tenth embodiment of the present invention.

Next, the flow of a data verification process (verification of forgery and falsification) of the data verification unit 3420 is described. FIG. 36 is a flowchart illustrating the flow of a data verification process (verification of forgery and falsification) according to the tenth embodiment of the present invention. The data verification process of the tenth embodiment is described mainly on the differences with the data verification process of FIG. 31. The data verification process of FIG. 36 is different from the data verification process of FIG. 31 in that data verification process of FIG. 36 includes the below-described processes of Steps S3602 to S3606.

In Step S3601, the data reception part 801 receives the pair of data including the Digest1 and signature value (T) and the pair of data including the Digest2 and the signature value (U) transmitted from the authenticity guarantee server 3210. Further, the storage process part 802 stores the received pair of data including the Digest1 and signature value (T) and pair of data including the Digest2 and the signature value (U) in the data storage unit 122.

In Step S3602, the authenticity signature value verification part 3001 performs signature verification on the Digest1 stored in the data storage unit 122 by using the signature value (T) stored in the storage part 122. More specifically, the authenticity signature value verification part 3001 determines whether the Digest1 calculated by using the vrfy algorithm with the signature value (T) matches the Digest1 stored in the data storage unit 122. Thereby, the authenticity signature value verification part 3001 determines whether the Digest1 stored in the data storage unit 122 is correct.

Figure 37:
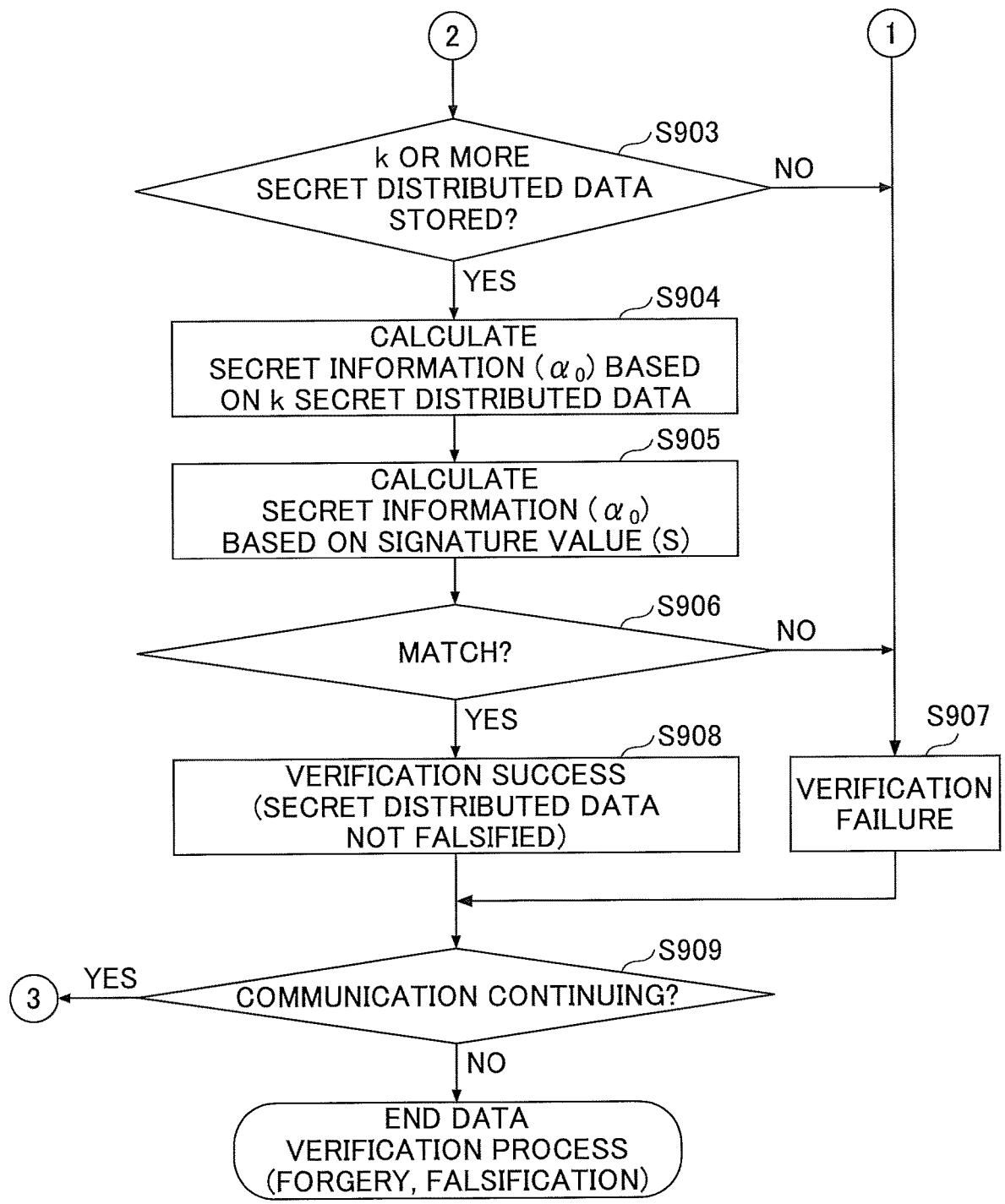
FIG. 37 is a flowchart illustrating the flow of the data verification process (verification of forgery and falsification) according to the tenth embodiment of the present invention.

In a case where the Digest1 stored in the data storage unit 122 is incorrect according to the determination results (No in Step S3602), the data verification process of the tenth embodiment proceeds to Step S907 of FIG. 37. In this case, the authenticity signature value verification part 3001 determines that the signature verification of the Digest1 read out from the data storage unit 122 is a failure.

On the other hand, in a case where the Digest1 stored in the data storage unit 122 is correct according to the determination results (Yes in Step S3602), the data verification process of the tenth embodiment proceeds to Step S3603 of FIG. 36.

In Step S3604, the data authenticity verification part 3002 compares the calculated hash value (Hash ($D_i$)) with the hash value (Hash ($D_i$)) included in the Digest1 whose signature verification is determined as a success by the authenticity signature value verification part 3001. In a case where a hash value included in the calculated hash values (Hash ($D_i$)) is not included in the Digest1 (No in Step S3604), the data verification process proceeds to Step S907 of FIG. 37. In this case, the data authenticity verification part 3002 determines that signature verification of the data unit ($D_i$) included in the secret distributed data read out from the data storage unit 122 has failed (i.e., determines that the data unit ($D_i$) included in the secret distributed data is forged).

On the other hand, in a case where all of the calculated hash values (Hash ($D_i$)) are included in the Digest1 (Yes in Step S3604), the data authenticity verification part 3002 proceeds to Step S3605.

In Step S3605, the authenticity signature data verification part 3001 performs signature verification on the Digest2 stored in the data storage unit 122 by using the signature value (U) stored in the data storage unit 122. More specifically, the authenticity signature value verification part 3001 determines whether the Digest2 calculated by using the vrfy algorithm with the signature value (U) matches the Digest2 stored in the data storage unit 122. Thereby, the authenticity signature value verification part 3001 determines whether the Digest2 stored in the data storage unit 122 is correct.

In a case where the authenticity signature value verification part 3001 determines that the Digest2 stored in the data storage unit 122 is incorrect as a result of the determination (No in Step S3605), the data verification process proceeds to Step S907 of FIG. 37. In this case, the authenticity signature value verification part 3001 determines that signature verification of the Digest2 read out from the data storage unit 122 has failed.

On the other hand, in a case where the authenticity signature value verification part 3001 determines that the Digest2 stored in the data storage unit 122 is correct as a result of the determination (Yes in Step S3605), the data verification process proceeds to Step S3606.

In Step S3606, the data authenticity verification part 3002 reads out the parameter information ($W_i$) included in the secret distributed data stored in the data storage unit 122, and compares the parameter information with the Digest2 whose signature verification is determined as a success by the authenticity signature value verification part 3001.

In a case where parameter information ($W_i$) included in the read out parameter information ($W_i$) is not included in the Digest2 as a result of the comparison (No in Step S3606), the data verification process proceeds to Step S907 of FIG. 37. In this case, the data authenticity verification part 3002 determines that signature verification of the parameter information ($W_i$) included in the secret distributed data read out from the data storage unit 122 has failed (i.e., determines that the parameter information ($W_i$) included in the secret distributed data is forged).

On the other hand, in a case where all of the read out parameter information ($W_i$) are included in the Digest2 (Yes in Step S3606), the data authenticity verification part 3002 proceeds to Step S3607.

In Step S3607, the data authenticity verification part 3002 determines that signature verification is a success (i.e., determines that neither the data unit ($D_i$) included in the secret distributed data nor the parameter information ($W_i$) are forged).

In the case where signature verification is determined as a success in Step S3607, the data verification process proceeds to Step S903 of FIG. 37. After Step S903, a signature verification process is performed for determining whether the secret distributed data is falsified. In a case where the signature verification is a success, the signature value verification part 804 determines that the secret distributed data has not been falsified in Step S908.

Hence, according to the tenth embodiment, the server apparatus 120 can verify the authenticity of both the data unit ($D_i$) included in the secret distributed data and the parameter information ($W_i$).

In the example illustrated in FIG. 36, the verification of the authenticity of the parameter information ($W_i$) is started after verifying the authenticity of all of the data units ($D_i$) included in the secret distributed data. However, the order for performing the verification of authenticity is not limited to the order of the example illustrated in FIG. 36. For example, the verification of the authenticity of the data units ($D_i$) may be started after verifying the authenticity of all of the parameter information ($W_i$). Alternatively, the verification of authenticity of the data units ($D_i$) and the verification of authenticity of parameter information ($W_i$) may be performed alternately.

Eleventh Embodiment

In the above-described ninth and tenth embodiments, the secret distributed data and the signature value (S) are broadcast by the imaging apparatus 110. According to the eleventh embodiment, a router apparatus is provided in the data recording system, so that the router apparatus can broadcast the secret distributed data and the signature value (S). Next, the eleventh embodiment is described.

Figure 38:
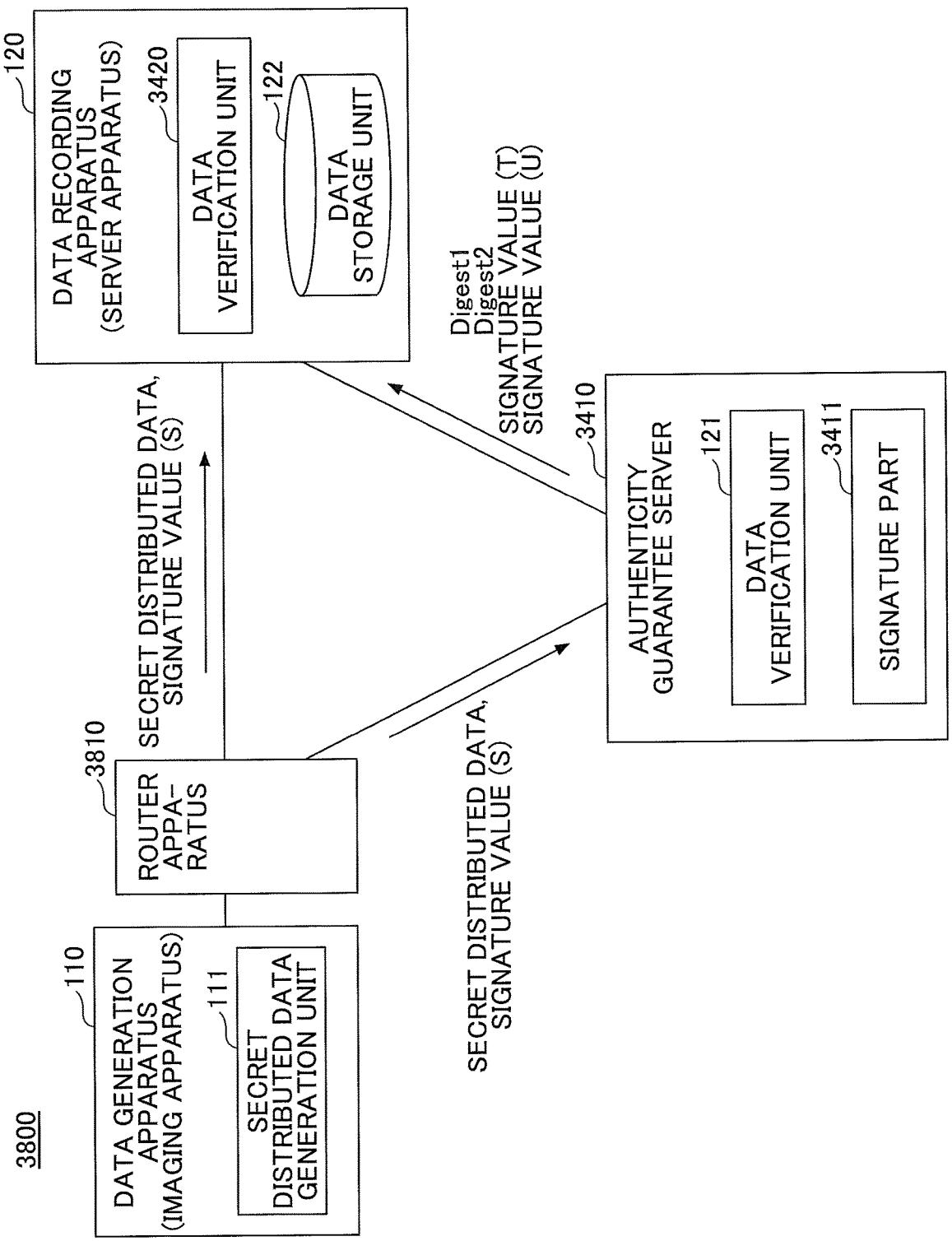
FIG. 38 is a schematic diagram illustrating a configuration of a data recording system according to the eleventh embodiment of the present invention.

FIG. 38 is a schematic diagram illustrating a configuration of the data recording system 3800 according to the eleventh embodiment of the present invention. The data recording system 3800 of FIG. 38 is different from the data recording system 3400 in that the data recording system 3800 of FIG. 38 includes a router apparatus 3810.

The router apparatus 3810 is connected to the imaging apparatus 110. The router apparatus 3810 broadcasts the secret distributed data and the signature value (S) transmitted from the imaging apparatus 110 to the server apparatus 120 and the authenticity guarantee server 3410 that are connected to a network.

Accordingly, the transmission load of the imaging apparatus 110 can be reduced by providing the router apparatus 3810 in the data recording system 3800.

Other Embodiments

According to the above-described first to eleventh embodiments, a secret distributed protocol is applied to motion image data generated in the imaging apparatus 110. However, the object to which the secret distributed protocol is applied is not limited to motion image data. For example, the secret distributed protocol may be applied to an arbitrary time-series data such as audio data or temperature data.

According to the above-described first to eleventh embodiments, the data counting part 504 is provided in the secret distributed data generation unit, so that the signature value (S) can be calculated with respect to each of a predetermined number (n) of data units ($D_i$). However, the timing for calculating the signature value (S) is not limited to the predetermined number (n) of data units ($D_i$). For example, the signature value (S) may be calculated with respect to a data unit ($D_i$) equivalent to a predetermined period of time. That is, calculation of the signature value (S) may be performed with respect to a data unit ($D_i$) of a predetermined time period of a given times-series data.

According to the above-described first to eleventh embodiments, the hash generation part 506 calculates the hash value of the data unit ($D_i$), and parameter information generation part 507 calculates the parameter information ($W_i$) based on the hash value calculated by the hash generation part 506. Alternatively, the parameter information generation part 507 may calculate the parameter information ($W_i$) directly from the data unit ($D_i$).

According to the above-described first to eleventh embodiments, the secret distributed data generation unit is implemented by executing the secret distribution data generation program with the CPU 402. Alternatively, the secret distributed data generation unit may be implemented by using, for example, a GPU (Graphic Processing Unit).

According to the above-described eighth embodiment, the secret distributed data generation unit 2610 transmits the Digest and the signature value (T). However, similar to the tenth embodiment, the secret distributed data generation unit 2610 may transmit the Digest 1 and the signature value (T) along with the Digest 2 and the signature value (U). In this case, the signature unit 2701 functions as second and third signature units, and the data transmission unit 510 functions as the first to third transmission units.

The present invention is not limited to the specifically disclosed embodiments, and variations and modifications may be made without departing from the scope of the present invention.

The present application is based on and claims the benefit of priority Japanese Priority Application Nos. 2016-049491 and 2016-150750 filed on Mar. 14, 2016 and Jul. 29, 2016, respectively, with the Japanese Patent Office, the entire contents of which are hereby incorporated by reference.

What is claimed is:

1. A data generation apparatus comprising:
a processor;
and a memory containing instructions that cause the processor to execute a data generation process that includes
obtaining target data sequentially from time-series data, the target data including n (n being an integer greater than or equal to 2) data items in a predetermined section of the time series data, calculating parameter information that satisfies a (k−1) order polynomial based on the target data, the (k−1) order polynomial including k random values, the k being an integer greater than or equal to 1 and less than n,
associating the target data to the parameter information,
outputting the target data and the parameter information associated to the target data,
attaching a first signature to secret information based on a secret distributed protocol, the secret information being calculable by using k pairs of data including the target data and the parameter information associated to the target data, and
outputting the secret information attached with the first signature, wherein the processor is further configured to transmit the target data, the parameter information associated to the target data, and the secret information attached with the first signature,
wherein the processor is further configured to attach a second signature to a hash value of the target data and output the hash value of the target data attached with the second signature, and wherein the processor is further configured to transmit the hash value of the target data and the hash value of the target data attached with the second signature.

2. The data generation apparatus as claimed in claim 1, wherein the processor is configured to execute the calculation of the parameter information based on a hash value of the target data.

3. The data generation apparatus as claimed in claim 1, wherein the processor is further configured to set a condition for calculating the parameter information.

4. The data generation apparatus as claimed in claim 1, wherein the memory is configured to store the target data, the parameter information associated to the target data, and the secret information attached with the first signature.

5. The data generation apparatus as claimed in claim 1, wherein the processor is further configured to determine an importance of the target data by calculating a number of the parameter information based on the target data, the number of the parameter information corresponding to the importance of the target data.

6. The data generation apparatus as claimed in claim 5, wherein in a case where the importance of the target data is greater than or equal to a predetermined number, the processor is configured to transmit the target data and the parameter information associated to the target data for a multiple number of times.

7. The data generation apparatus as claimed in claim 5, further comprising a storage device;
wherein in a case where the importance of the target data is greater than or equal to a predetermined number, the processor is configured to store the target data and the parameter information associated to the target data in the storage device, and
wherein in a case where the data generation apparatus receives a re-transmission request from a destination apparatus after transmitting the target data and the parameter information associated to the target data, the processor is configured to transmit the target data and the parameter information associated to the target data that are stored in the storage device.

8. A data recording system comprising: a data generation apparatus including
a processor; and
a memory containing instructions that cause the processor to execute a data generation process that includes
obtaining target data sequentially from time-series data, the target data including n (n being an integer greater than or equal to 2) data items in a predetermined section of the time-series data, calculating parameter information that satisfies a (k−1) order polynomial based on the target data, the (k−1) order polynomial including k random values, k being an integer greater than or equal to and less than n,
associating the target data to the parameter information, outputting the target data and the parameter information associated to the target data,
attaching a first signature to secret information based on a secret distributed protocol, the secret information being calculable by using k pairs of data including the target data and the parameter information associated to the target data, and
outputting the secret information attached with the first signature; and a data recording apparatus connected to the data generation apparatus, wherein the processor of the data generation apparatus is further configured to transmit the target data, the parameter information associated to the target data, and the secret information attached with the first signature,
wherein the data recording apparatus includes the processor, and the memory containing instructions that cause the processor to execute a process that includes receiving a first pair of data including the target data and the parameter information associated to the target data,
and determining whether a signature verification process is a success depending on whether a number of the received first pair is greater than or equal to k,
wherein the processor of the data generation apparatus is further configured to attach a second signature to a hash value of the target data and output the hash value of the target data attached with the second signature, and
wherein the processor of the data generation apparatus is further configured to transmit a second pair of data including the hash value of the target data and the hash value of the target data attached with the second signature.

9. The data recording system as claimed in claim 8,
wherein the processor of the data recording apparatus is further configured to receive the secret information attached with the first signature, and
wherein in a case where the number of the received first pair is greater than or equal to k, the processor of the data recording apparatus is further configured to determine whether a signature verification process is a success by comparing the received secret information with a secret information that is calculated based on k first pairs.

10. The data recording system as claimed in claim 8,
wherein the processor of the data recording apparatus is further configured to receive the second pair of data, and
wherein in a case where a signature verification process performed on the second pair of data is a success, the processor of the data recording apparatus is further configured to determine whether a signature verification process performed on the target data included in the first pair of data is a success by using the second pair of data.

11. The data recording system as claimed in claim 10, wherein the processor of the data recording apparatus is further configured to determine whether the signature verification process performed on the target data included in the first pair of data is a success by comparing the hash value of the target data included in the first pair of data with the hash value of the target data included in the second pair of data.

12. A non-transitory computer readable medium storing a program for causing a processor to execute a data generation process, the data generation process comprising:
obtaining target data sequentially from time-series data, the target data including n (n being an integer greater than or equal to 2) data items in a predetermined section of the time-series data,
calculating parameter information that satisfies a (k−1) order polynomial based on the target data, the (k−1) order polynomial including k random values, k being an integer greater than or equal to 1 and less than n,
associating the target data to the parameter information,
outputting the target data and the parameter information associated to the target data,
attaching a first signature to secret information based on a secret distributed protocol, the secret information being calculable by using k pairs of data including the target data and the parameter information associated to the target data, and
outputting the secret information attached with the first signature,
wherein the data generation process further comprises:
transmitting the target data, the parameter information associated to the target data, and the secret information attached with the first signature,
attaching a second signature to a hash value of the target data and output the hash value of the target data attached with the second signature, and
transmitting the hash value of the target data and the hash value of the target data attached with the second signature.

* * * * *